(12) United States Patent
Hu et al.

(10) Patent No.: US 11,982,866 B2
(45) Date of Patent: May 14, 2024

(54) OPTICAL ELEMENT DRIVING MECHANISM HAVING MOVABLE PORTION FOR HOLDING LENS

(71) Applicant: TDK TAIWAN CORP., Taoyuan (TW)

(72) Inventors: Chao-Chang Hu, Taoyuan (TW); Liang-Ting Ho, Taoyuan (TW); Chen-Er Hsu, Taoyuan (TW); Yi-Liang Chan, Taoyuan (TW); Fu-Lai Tseng, Taoyuan (TW); Fu-Yuan Wu, Taoyuan (TW); Chen-Chi Kuo, Taoyuan (TW); Ying-Jen Wang, Taoyuan (TW); Wei-Han Hsia, Taoyuan (TW); Yi-Hsin Tseng, Taoyuan (TW); Wen-Chang Lin, Taoyuan (TW); Chun-Chia Liao, Taoyuan (TW); Shou-Jen Liu, Taoyuan (TW); Chao-Chun Chang, Taoyuan (TW); Yi-Chieh Lin, Taoyuan (TW); Shang-Yu Hsu, Taoyuan (TW); Yu-Huai Liao, Taoyuan (TW); Shih-Wei Hung, Taoyuan (TW); Sin-Hong Lin, Taoyuan (TW); Kun-Shih Lin, Taoyuan (TW); Yu-Cheng Lin, Taoyuan (TW); Wen-Yen Huang, Taoyuan (TW); Wei-Jhe Shen, Taoyuan (TW); Chih-Shiang Wu, Taoyuan (TW); Sin-Jhong Song, Taoyuan (TW); Che-Hsiang Chiu, Taoyuan (TW); Sheng-Chang Lin, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 18/066,904

(22) Filed: Dec. 15, 2022

(65) Prior Publication Data
US 2023/0120771 A1 Apr. 20, 2023

Related U.S. Application Data

(63) Continuation of application No. 16/900,608, filed on Jun. 12, 2020, now Pat. No. 11,555,981.
(Continued)

(51) Int. Cl.
*G02B 7/09* (2021.01)
*G02B 27/64* (2006.01)
(Continued)

(52) U.S. Cl.
CPC ............. *G02B 7/09* (2013.01); *G02B 27/646* (2013.01); *H04N 23/55* (2023.01); *H04N 23/57* (2023.01)

(58) Field of Classification Search
CPC .......... G02B 7/09; G02B 27/646; G02B 7/08; H04N 23/55; H04N 23/57; H04N 23/687;
(Continued)

(56) References Cited

U.S. PATENT DOCUMENTS 9,438,801 B2 * 9/2016 Hwang ................ G02B 27/646
2016/0299350 A1 10/2016 Hu et al.
(Continued)

*Primary Examiner* — Padma Haliyur
(74) *Attorney, Agent, or Firm* — MUNCY, GEISSLER, OLDS & LOWE, PC

(57) ABSTRACT

An optical element driving mechanism is provided and includes a fixed assembly, a movable assembly, a driving assembly and a stopping assembly. The fixed assembly has a main axis. The movable assembly is configured to connect an optical element, and the movable assembly is movable relative to the fixed assembly. The driving assembly is configured to drive the movable assembly to move relative to the fixed assembly. The stopping assembly is configured
(Continued)

to limit the movement of the movable assembly relative to the fixed assembly within a range of motion.

9 Claims, 65 Drawing Sheets

Related U.S. Application Data

(60) Provisional application No. 63/017,313, filed on Apr. 29, 2020, provisional application No. 63/000,604, filed on Mar. 27, 2020, provisional application No. 62/899,423, filed on Sep. 12, 2019, provisional application No. 62/896,943, filed on Sep. 6, 2019, provisional application No. 62/894,295, filed on Aug. 30, 2019, provisional application No. 62/887,905, filed on Aug. 16, 2019, provisional application No. 62/861,440, filed on Jun. 14, 2019.

(51) Int. Cl.
*H04N 23/55* (2023.01)
*H04N 23/57* (2023.01)

(58) Field of Classification Search
CPC .. H01F 5/04; H01F 7/066; G03B 5/00; G03B 13/36
See application file for complete search history.

(56) References Cited

U.S. PATENT DOCUMENTS

| | | |
|---|---|---|
| 2017/0227783 A1 | 8/2017 | Hu et al. |
| 2018/0031854 A1 | 2/2018 | Hu et al. |
| 2018/0115715 A1* | 4/2018 | Jung .................... H04N 23/687 |
| 2018/0136482 A1 | 5/2018 | Kuo et al. |
| 2018/0172946 A1* | 6/2018 | Fuse ........................ G03B 5/04 |

* cited by examiner

OPTICAL ELEMENT DRIVING MECHANISM HAVING MOVABLE PORTION FOR HOLDING LENS

CROSS REFERENCE TO RELATED APPLICATIONS

This application is a Continuation of application Ser. No. 16/900,608, filed on Jun. 12, 2020, which claims the benefit of U.S. Provisional Application No. 62/861,440, filed Jun. 14, 2019, U.S. Provisional Application No. 62/894,295, filed Aug. 30, 2019, U.S. Provisional Application No. 62/896,943, filed Sep. 6, 2019, U.S. Provisional Application No. 62/899,423, filed Sep. 12, 2019, U.S. Provisional Application No. 62/887,905, filed Aug. 16, 2019, U.S. Provisional Application No. 63/017,313, filed Apr. 29, 2020, and U.S. Provisional Application No. 63/000,604, filed Mar. 27, 2020, the entirety of which are incorporated by reference herein.

BACKGROUND OF THE DISCLOSURE

Field of the Disclosure

The present disclosure relates to an optical element driving mechanism, and in particular it relates to an optical element driving mechanism having a miniaturized lens holder.

Description of the Related Art

As technology has developed, many of today's electronic devices (such as smartphones) have a camera or video functionality. Using the camera modules disposed on electronic devices, users can operate their electronic devices to capture photographs and record videos.

Today's design of electronic devices continues to follow the trend of miniaturization, meaning that the various components of the camera module or its structure must also be continuously reduced, so as to achieve miniaturization. In general, a driving mechanism in the camera module has a camera lens holder configured to hold a camera lens, and the driving mechanism can have the functions of auto focusing or optical image stabilization. However, although the existing driving mechanism can achieve the aforementioned functions of photographing or video recording, they still cannot meet all the needs of the users.

Therefore, how to design a camera module that can perform autofocus, optical image stabilization and achieve miniaturization is a topic nowadays that needs to be discussed and solved.

BRIEF SUMMARY OF THE DISCLOSURE

One objective of the present disclosure is to provide an optical element driving mechanism to solve the problems outlined above.

According to some embodiments of the disclosure, an optical element driving mechanism is provided that includes a fixed assembly, a movable assembly, a driving assembly and a stopping assembly. The fixed assembly has a main axis. The movable assembly is configured to be connected to an optical element, and the movable assembly is movable relative to the fixed assembly. The driving assembly is configured to drive the movable assembly to move relative to the fixed assembly. The stopping assembly is configured to limit the movement of the movable assembly relative to the fixed assembly within a range of motion.

According to some embodiments, when viewed along the main axis, the fixed assembly includes a first side, a second side, a third side and a fourth side. The first side extends in a first direction. The second side extends in a second direction. The first side and the third side are respectively located on two sides of the movable assembly. The second side and the fourth side are respectively located on two sides of the movable assembly.

According to some embodiments, the driving assembly includes a driving coil, and a winding axis of the driving coil is parallel to the main axis. The driving coil includes a first segment, a second segment, a third segment and a fourth segment. The first segment is parallel to the first side. The second segment is not parallel to the first side and the second side. The third segment is not parallel to the first side and the second side. The second segment is connected to the third segment via the fourth segment, and the fourth segment is parallel to the second side. The driving assembly further includes a magnetic element corresponding to the first segment. The magnetic element has a long strip-shaped structure and extends in the first direction. The driving assembly does not have a magnetic element corresponding to the second segment and the third segment. The driving assembly does not have a magnetic element corresponding to the fourth segment.

According to some embodiments, the movable assembly includes an electrical connection portion, a first stopping element, and a second stopping element. A leading wire of the driving coil is disposed on the electrical connection portion. When viewed along the main axis, the first stopping element is located on the second side. When viewed along the main axis, the second stopping element is located on the second side. A shortest distance between the first stopping element and the second stopping element is not zero in the main axis. When viewed along the main axis, the first stopping element overlaps at least a part of the second stopping element. A shortest distance between the first stopping element and a casing of the fixed assembly is different from a shortest distance between the second stopping element and the casing.

According to some embodiments, the movable assembly further includes a fixed surface and a receiving portion, wherein the fixed surface faces the driving coil. The fixed surface is directly in contact with the driving coil. The receiving portion is located on the fixed surface and is configured to receive at least a part of the leading wire. The receiving portion corresponds to the electrical connection portion. The optical element driving mechanism further includes a first adhesive element disposed in the receiving portion. The first adhesive element directly contacts the movable assembly and the leading wire. The first adhesive element directly contacts the driving coil. The first adhesive element directly contacts the second segment. The receiving portion includes a concave structure or an opening structure. The movable assembly further includes a support surface which is not parallel to the fixed surface. The support surface directly contacts the driving coil. The support surface directly contacts the second segment. The movable assembly further includes a guiding structure which is disposed on the support surface. At least a part of the first adhesive element is located in the guiding structure. The guiding structure is adjacent to the receiving portion. The guiding structure includes a concave structure or an opening structure. The movable assembly further includes a skirt portion, and a portion of the fixed surface is located at the skirt portion. The skirt portion extends in a direction that is not parallel to the winding axis. The skirt portion has a tapered structure, tapered in a direction which is not parallel to the winding axis.

According to some embodiments, the fixed assembly includes a base, the base includes a bottom plate and a base side wall, and the base side wall protrudes from an edge of the bottom plate. When viewed along the main axis, the base side wall is located on the second side. When viewed along the main axis, the electrical connection portion is located on the second side. When viewed in the first direction, the base side wall overlaps at least a portion of the third segment. When viewed in the first direction, the base side wall overlaps at least a portion of the second segment. When viewed in the first direction, the base side wall overlaps at least a portion of the fourth segment. When the movable assembly moves to a limit position and when viewed in the second direction, the base side wall overlaps at least a part of the electrical connection portion. When viewed in the first direction, the base side wall does not overlap the electrical connection portion. When viewed in the first direction, the base side wall overlaps at least a portion of the second stopping element.

According to some embodiments, when viewed along the main axis, a casing side wall of the casing is located on the second side and corresponds to the base side wall. When viewed in the first direction, the first stopping element overlaps at least a part of the casing side wall.

According to some embodiments, the fixed assembly further includes an adhesive strengthening structure which is disposed on the base side wall or the casing side wall. The adhesive strengthening structure includes a trench. The adhesive strengthening structure includes a plurality of trenches. These trenches are parallel to each other.

According to some embodiments, the stopping assembly includes the first stopping element, the second stopping element, the casing side wall and the base side wall. A shortest distance between the first stopping element and the casing side wall is substantially equal a shortest distance between the second stopping element and the base side wall.

According to some embodiments, the optical element driving mechanism further includes a first elastic member and a second elastic member, and the movable assembly is movably connected to the fixed assembly via the first elastic member and the second elastic member. The first elastic member includes a first fixed part, a first movable part, and a first elastic portion. The first fixed part is configured to be fixed to the fixed assembly. The first movable part is configured to be fixed to the movable assembly. The first movable part is movably connected to the first fixed part via the first elastic portion. The first elastic portion intersects the first fixed part at a first intersection. The first elastic portion intersects the first movable part at a second intersection. The second intersection and the first intersection are arranged in sequence in a third direction. The second elastic member includes a second fixed part, a second movable part, and a second elastic portion. The second fixed part is configured to be fixed to the fixed assembly. The second movable part is configured to be fixed to the movable assembly. The second movable part is movably connected to the second fixed part via the second elastic portion. The second elastic portion intersects the second fixed part at a third intersection. The second elastic portion intersects the second movable part at a fourth intersection. The fourth intersection and the third intersection are arranged in sequence in a fourth direction. An angle between the third direction and the fourth direction is less than or equal to 90 degrees. When viewed along the main axis, the first elastic portion overlaps at least a portion of the second elastic portion.

The present disclosure provides an optical element driving mechanism, which has a miniaturized lens holder capable of holding a larger lens, and a portion of each side of the lens holder is reduced toward the inside so as to receive the leading wire with a large diameter. Therefore, the design of the optical element driving mechanism of the present disclosure can achieve the advantages of miniaturization, holding a larger lens, and high driving efficiency at the same time.

Furthermore, at least one base side wall is disposed on the base of the present disclosure, and a plurality of adhesive strengthening structures are disposed on the base side wall to increase the adhesive strength between the base side wall and the casing side wall. In addition, the electrical connection portion of the lens holder can serve as a bobbin of the driving coil, and the electrical connection portion is staggered from the base side wall, so that when the lens holder moves, the electrical connection portion does not collide with the base side wall and cause damage.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
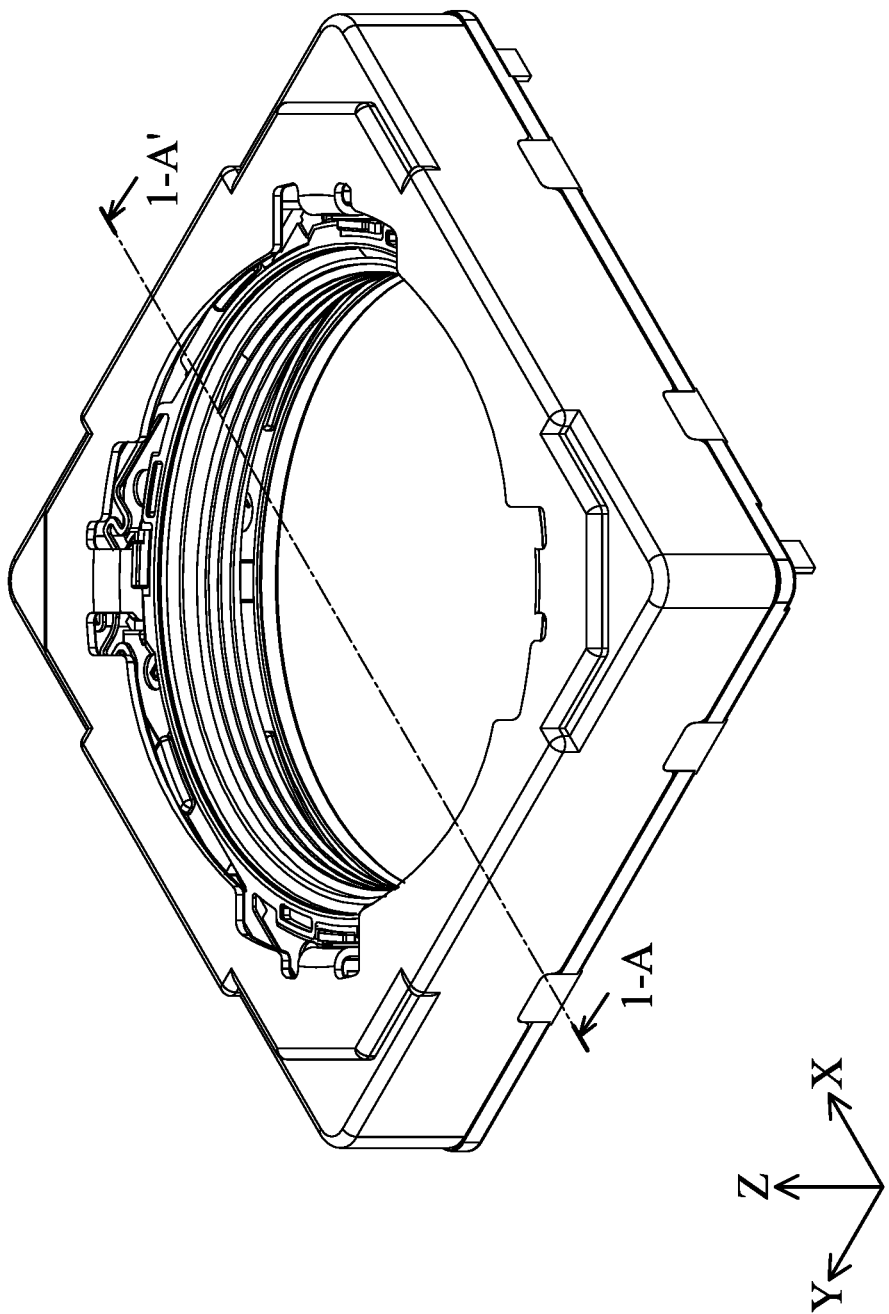
FIG. 1 is a schematic diagram of an optical element driving mechanism 1-100 according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

The First Embodiment Group.

Figure 2:
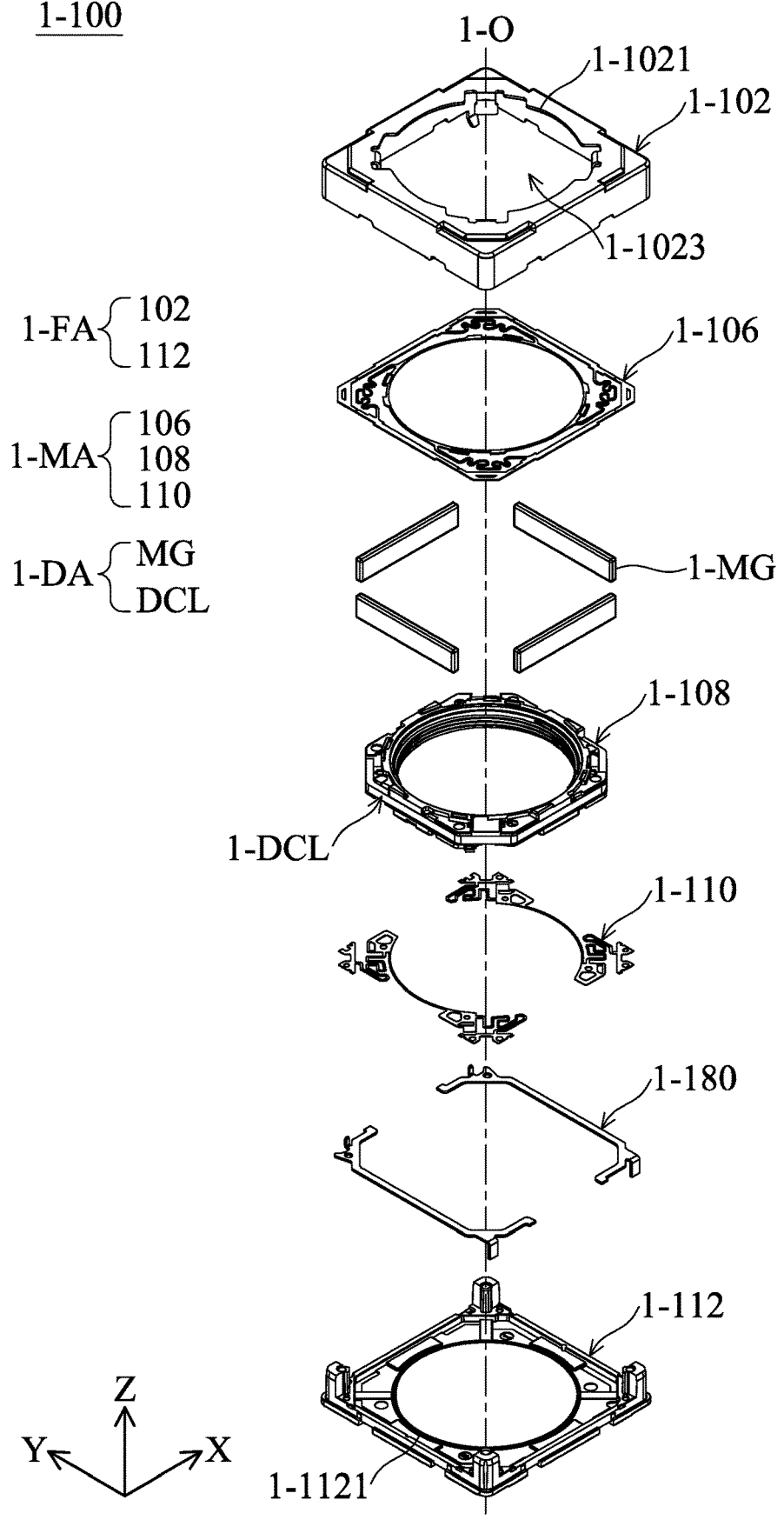
FIG. 2 is an exploded diagram of the optical element driving mechanism 1-100 according to an embodiment of the present disclosure.
Figure 3:
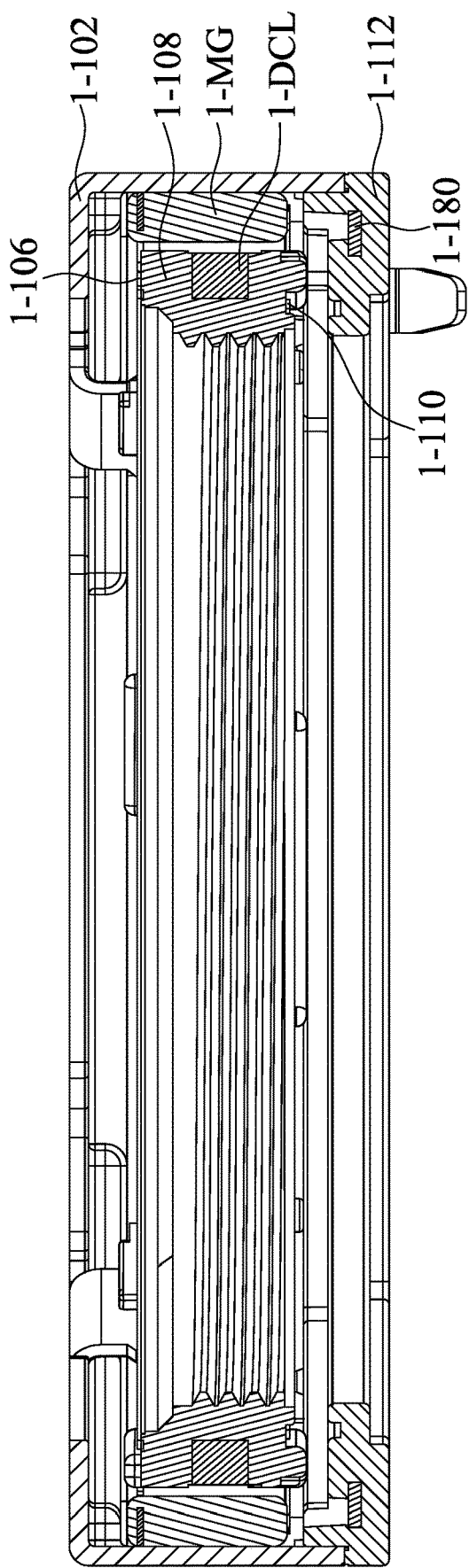
FIG. 3 is a cross-sectional view of the optical element driving mechanism 1-100 along line 1-A-1-A' in FIG. 3 according to an embodiment of the present disclosure.

Please refer to FIG. 1 to FIG. 3. FIG. 1 is a schematic diagram of an optical element driving mechanism 1-100 according to an embodiment of the present disclosure. FIG. 2 is an exploded diagram of the optical element driving mechanism 1-100 according to an embodiment of the present disclosure, and FIG. 3 is a cross-sectional view of the optical element driving mechanism 1-100 along line 1-A-1-A' in FIG. 3 according to an embodiment of the present disclosure. The optical element driving mechanism 1-100 can be an optical camera module configured to hold an optical element. The optical element driving mechanism 1-100 can be installed in various electronic devices or portable electronic devices, such as a smartphone, for allowing a user to perform the image capturing function. In this embodiment, the optical element driving mechanism 1-100 can be a voice coil motor (VCM) with an auto-focusing (AF) function, but it is not limited thereto. In other embodiments, the optical element driving mechanism 1-100 can also perform the functions of auto-focusing and optical image stabilization (OIS).

In the present embodiment, the optical element driving mechanism 1-100 can include a fixed assembly 1-FA, a movable assembly 1-MA, and a driving assembly 1-DA. The movable assembly 1-MA is movably connected to the fixed assembly 1-FA, and the movable assembly 1-MA is configured to hold the optical element (not shown in the figures). The driving assembly 1-DA is configured to drive the movable assembly 1-MA to move relative to the fixed assembly 1-FA.

In this embodiment, as shown in FIG. 2, the fixed assembly 1-FA includes a casing 1-102 and a base 1-112. The movable assembly 1-MA includes a lens holder 1-108 and the aforementioned optical element, and the lens holder 1-108 is configured to hold the optical element.

As shown in FIG. 2, the casing 1-102 has a hollow structure, and a casing opening 1-1021 is formed thereon, and a base opening 1-1121 is formed on the base 1-112. The center of the casing opening 1-1021 corresponds to the optical axis 1-O of the optical element, and the base opening 1-1121 corresponds to a photosensitive element (not shown) disposed under the base 1-112. The external light can enter the casing 1-102 from the casing opening 1-1021 to be received by the photosensitive element after passing through the optical element and the base opening 1-1121 so as to generate a digital image signal.

Furthermore, the casing 1-102 is disposed on the base 1-112 and may have an accommodating space 1-1023 for accommodating the movable assembly 1-MA (including the aforementioned optical element and the lens holder 1-108) and the driving assembly 1-DA.

The movable assembly 1-MA may further include a first elastic member 1-106 and a second elastic member 1-110. The outer portion (the outer ring portion) of the first elastic member 1-106 is fixed to an inner wall surface of the casing 1-102, the outer portion (the outer ring portion) of the second elastic member 1-110 is fixed to the base 1-112, and the inner portions (the inner ring portions) of the first elastic member 1-106 and the second elastic member 1-110 are respectively connected to the upper and lower sides of the lens holder 1-108, so that the lens holder 1-108 can be suspended in the accommodating space 1-1023.

In this embodiment, the driving assembly 1-DA may include a plurality of driving magnets 1-MG and a driving coil 1-DCL. The driving coil 1-DCL is disposed on the lens holder 1-108, and the plurality of driving magnets 1-MG respectively correspond to the driving coil 1-DCL and are disposed on the inner wall surface of the casing 1-102.

In this embodiment, the driving coil 1-DCL may be a wound coil and be disposed on the lens holder 1-108, and a winding axis of the driving coil 1-DCL may be parallel to the optical axis 1-O. When the driving coil 1-DCL is provided with electricity, the driving coil 1-DCL acts with the driving magnets 1-MG to generate an electromagnetic force, so as to drive the lens holder 1-108 and the held optical element to move relative to the base 1-112 along the optical axis 1-O (the Z-axis).

Furthermore, the optical element driving mechanism 1-100 of the present disclosure further includes a circuit assembly 1-180 electrically connected to the driving assembly 1-DA. The circuit assembly 1-180 may be further to be electrically connected to an external circuit, such as a main circuit board of an external electronic device, so that the driving assembly 1-DA can operate according to the signal of the external electronic device.

Furthermore, in this embodiment, the circuit assembly 1-180 is disposed inside the base 1-112. For example, the base 1-112 is made of plastic material, and the circuit assembly 1-180 is formed in the base 1-112 by the molded interconnect device (MID) technology.

Figure 4:
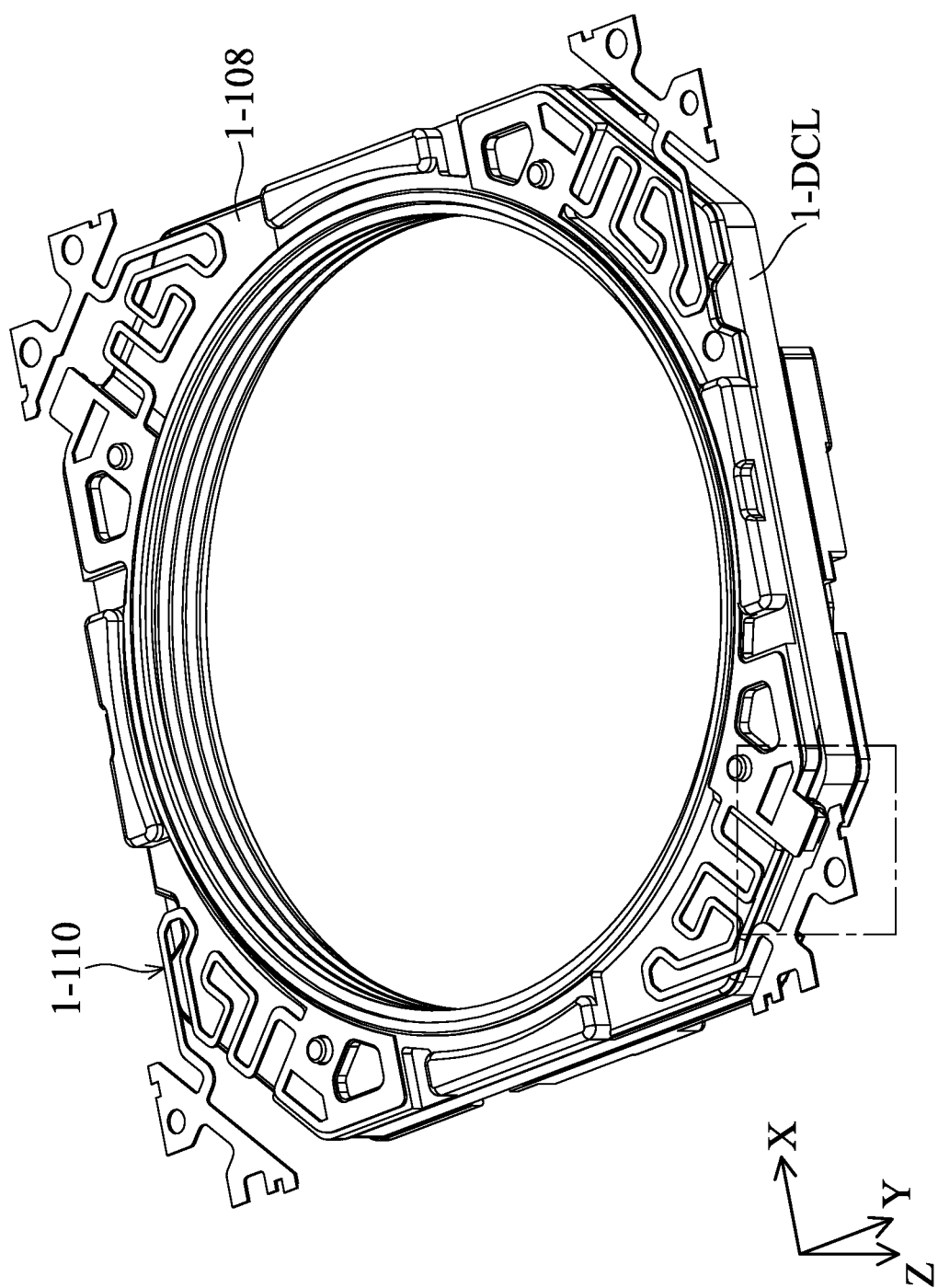
FIG. 4 is a schematic bottom view of the second elastic member 1-110 and the lens holder 1-108 according to an embodiment of the present disclosure.
Figure 5:
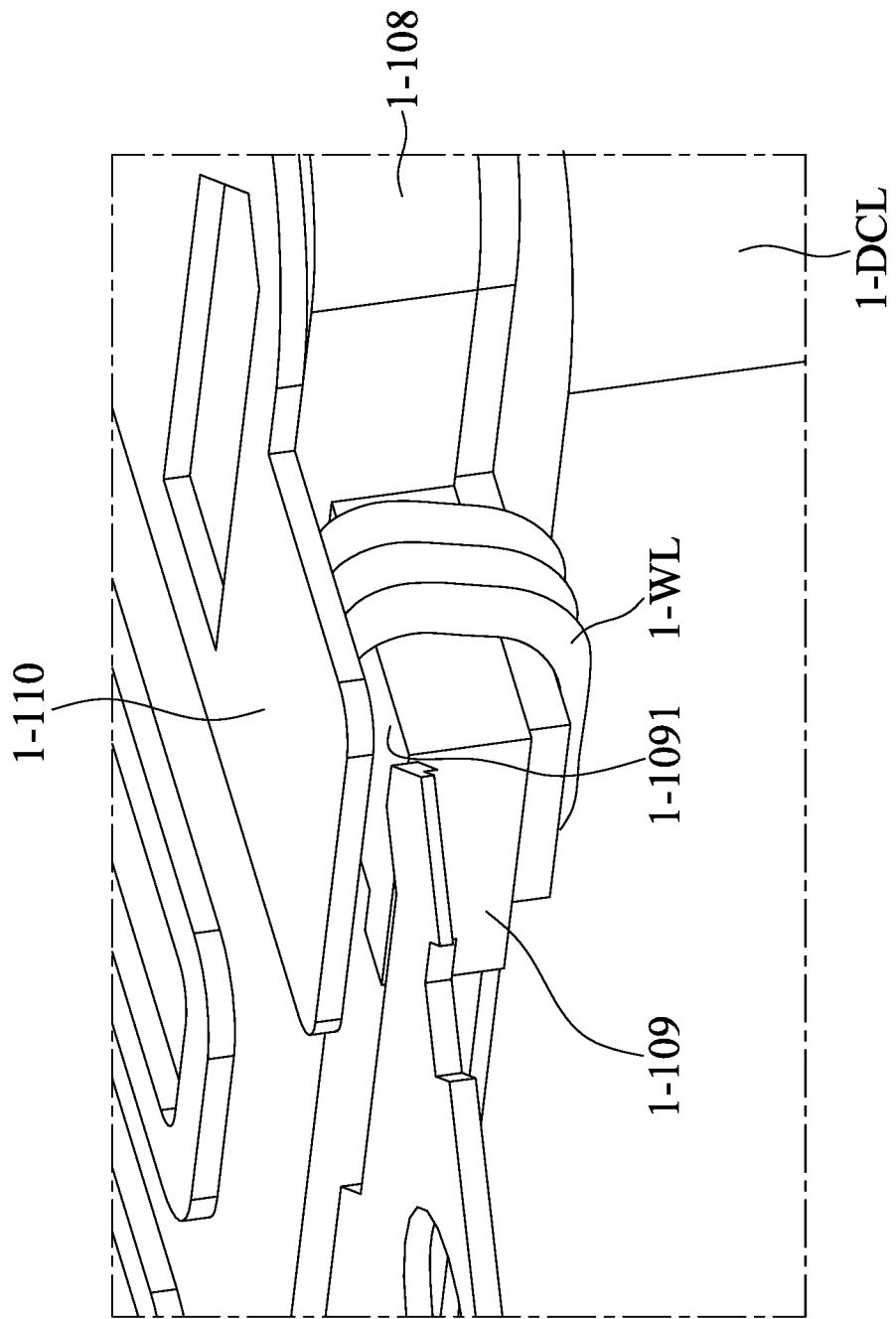
FIG. 5 is a partial enlarged diagram of FIG. 4 according to an embodiment of the present disclosure.
Figure 6:
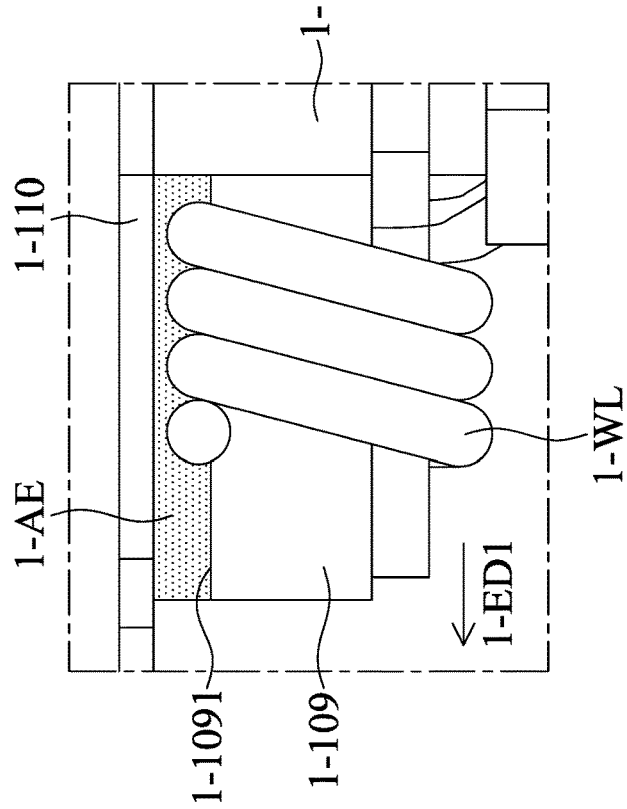
FIG. 6 is a side view of a partial structure of the second elastic member 1-110 and the lens holder 1-108 according to an embodiment of the present disclosure.

Please refer to FIG. 4 to FIG. 6. FIG. 4 is a schematic bottom view of the second elastic member 1-110 and the lens holder 1-108 according to an embodiment of the present disclosure, FIG. 5 is a partial enlarged diagram of FIG. 4 according to an embodiment of the present disclosure, and FIG. 6 is a side view of a partial structure of the second elastic member 1-110 and the lens holder 1-108 according to an embodiment of the present disclosure. In this embodiment, the second elastic member 1-110 and the first elastic member 1-106 can be referred to as a metal assembly, the lens holder 1-108 of the movable assembly 1-MA further includes a winding member 1-109, and a leading wire 1-WL of the driving coil 1-DCL is disposed on a winding member surface 1-1091 of the winding member 1-109.

In addition, as shown in FIG. 6, the circuit assembly 1-180 may further include an electrical connection element 1-AE, the electrical connection element 1-AE may be a conductive glue, which may contain a conductive material, for example silver or resin material, but it not limited to. The electrical connection element 1-AE is disposed between the second elastic member 1-110 and the winding member 1-109, so that the driving coil 1-DCL is electrically connected to the second elastic member 1-110 via the leading wire 1-WL.

In this embodiment, as shown in FIG. 4, the second elastic member 1-110 has a plate-shaped structure and defines an extending direction, the extending direction may be parallel to the XY plane, and the extending direction is perpendicular to the optical axis 1-O. When viewed along the optical axis 1-O (the Z-axis), at least 80% of the total area of the winding member surface 1-1091 is covered by the second elastic member 1-110. As shown in FIG. 6, the second elastic member 1-110 covers all the winding member surface 1-1091.

In addition, it is worth noting that an extending direction 1-ED1 of the winding member 1-109 is parallel to an extending direction of the second elastic member 1-110. As shown in FIG. 6, both the winding member 1-109 and the second elastic member 1-110 extend leftward (along the XY plane).

Figure 7:
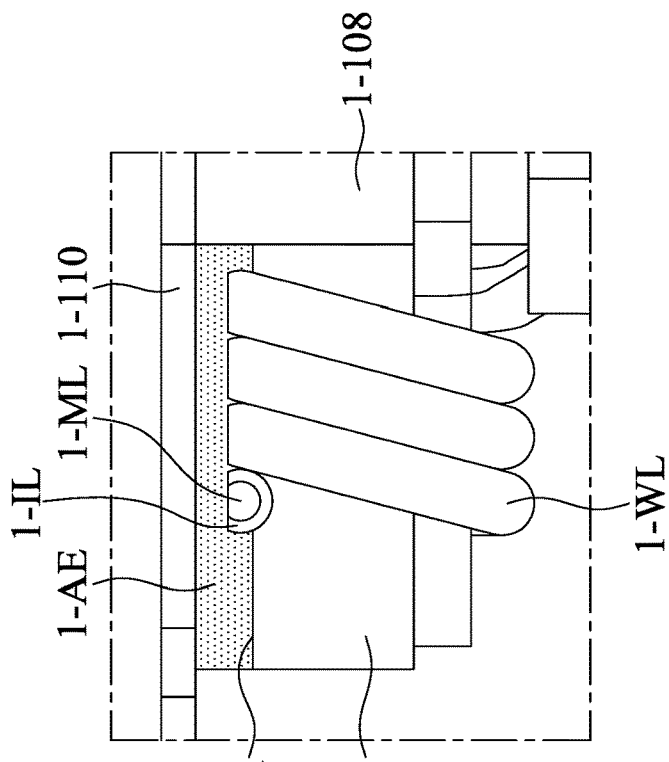
FIG. 7 is a side view of a partial structure of the second elastic member 1-110 and the lens holder 1-108 according to another embodiment of the present disclosure.

Please refer to FIG. 7, which is a side view of a partial structure of the second elastic member 1-110 and the lens holder 1-108 according to another embodiment of the present disclosure. In this embodiment, the leading wire 1-WL may include a metal layer 1-ML and an insulating layer 1-IL. Before the second elastic member 1-110 is installed on the lens holder 1-108, part of the insulating layer 1-IL can be removed using a laser to expose the metal layer 1-ML, and then the leading wire 1-WL can be electrically connected to the second elastic member 1-110 by the electrical connection element 1-AE. It should be noted that in this embodiment, the laser only removes the insulating layer 1-IL at upper side of the metal layer 1-ML, but in other embodiments, the insulating layer 1-IL at both sides (the upper and lower sides) of the metal layer 1-ML can also be removed.

Figure 8:
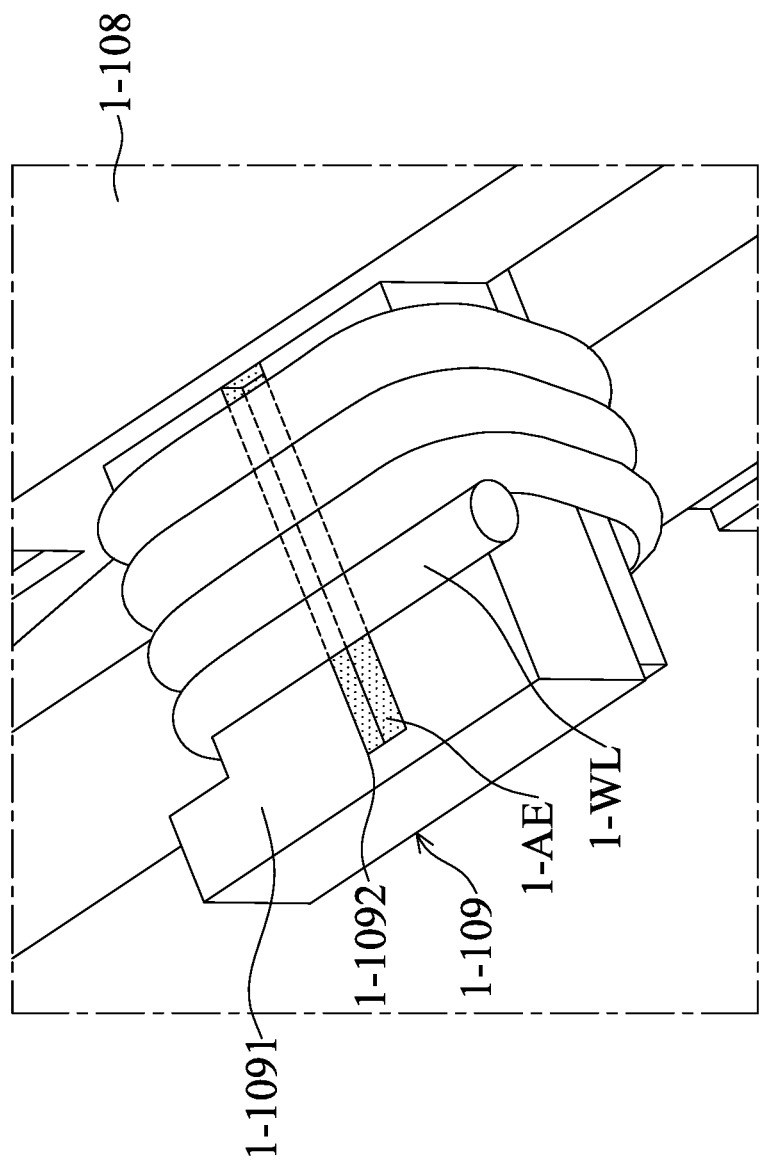
FIG. 8 is a schematic diagram of a partial structure of the lens holder 1-108 according to another embodiment of the present disclosure.

Please refer to FIG. 8, which is a schematic diagram of a partial structure of the lens holder 1-108 according to another embodiment of the present disclosure. In this embodiment, the winding member 1-109 also has a glue receiving groove 1-1092 formed by the winding member surface 1-1091, and the glue receiving groove 1-1092 is configured to receive at least part of the electrical connection element 1-AE. Based on the design of the glue receiving groove 1-1092 of this embodiment, the bonding strength between the winding member 1-109 and the leading wire 1-WL can be increased.

Figure 9:
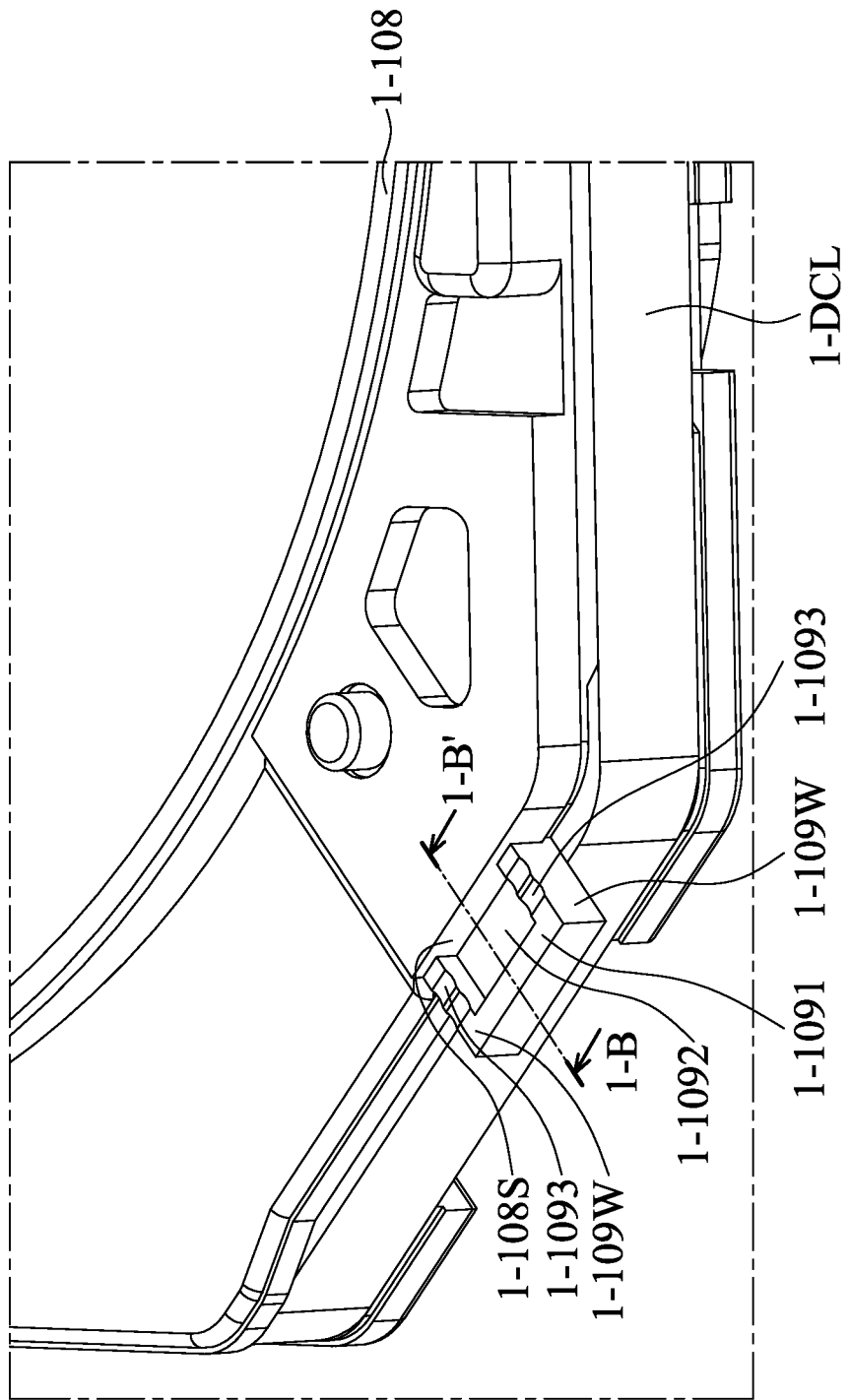
FIG. 9 is a schematic diagram of a partial structure of the lens holder 1-108 according to another embodiment of the present disclosure.

Please refer to FIG. 9, which is a schematic diagram of a partial structure of the lens holder 1-108 according to another embodiment of the present disclosure. In this embodiment, the winding member 1-109 has two side walls 1-109W, and the glue receiving groove 1-1092 is formed between the two side walls 1-109W. A plurality of positioning grooves 1-1093 may be formed on the two side walls 1-109W, for example, formed by the winding member surface 1-1091. These positioning grooves 1-1093 are configured to position the leading wire 1-WL.

Figure 10:
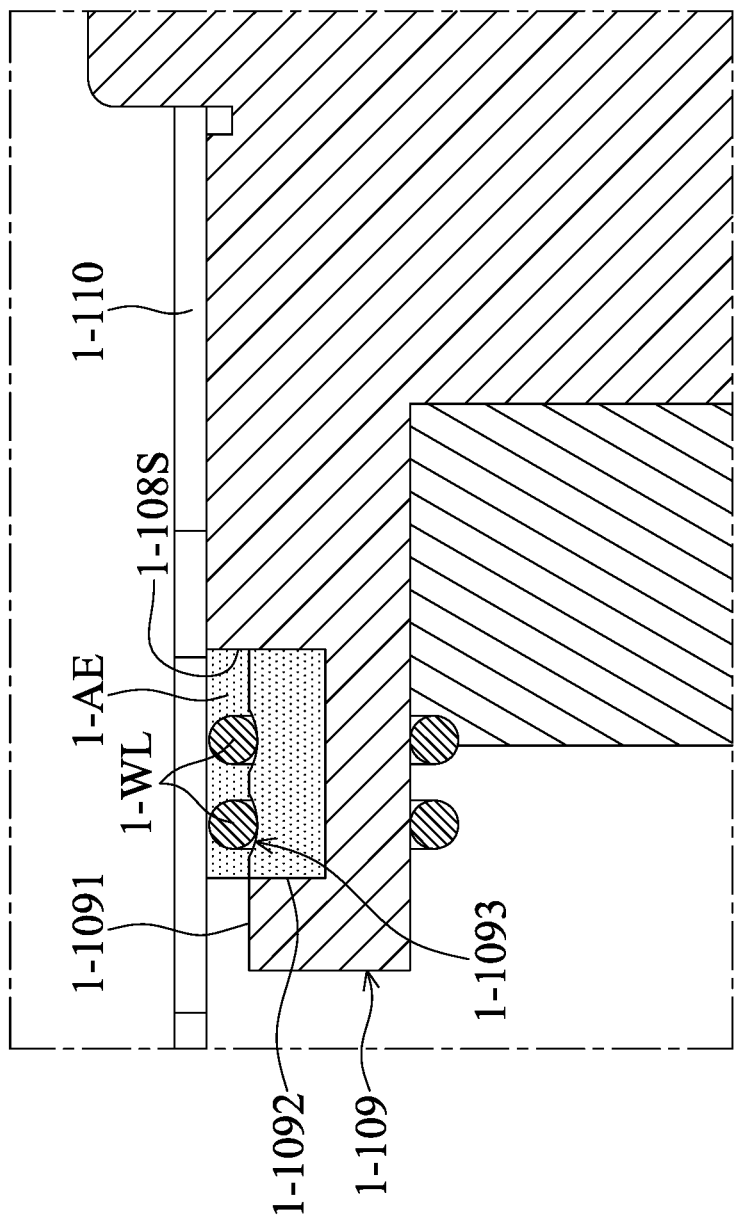
FIG. 10 is a cross-sectional view along line 1-B-1-B' of FIG. 9 according to an embodiment of the present disclosure.

Please refer to FIG. 9 and FIG. 10. FIG. 10 is a cross-sectional view along line 1-B-1-B' of FIG. 9 according to an embodiment of the present disclosure. As shown in FIG. 10, the positioning grooves 1-1093 can separate the two adjacent leading wires 1-WL, so that when the electrical connection element 1-AE is provided, the electrical connection element 1-AE can flow to the glue receiving groove 1-1092 through the gap between the two leading wires 1-WL. Based on the design of the positioning grooves 1-1093 of this embodiment, the adhesive area of the winding member 1-109 and the electrical connection element 1-AE can be increased, thereby increasing the bonding strength.

In addition, as shown in FIG. 9 and FIG. 10, the lens holder 1-108 of the movable assembly 1-MA further includes a movable assembly surface 1-108S, which is not parallel to the winding member surface 1-1091, and the electrical connection element 1-AE is in direct contact with the movable assembly surface 1-108S. That is, the electrical connection element 1-AE can fill up the glue receiving groove 1-1092.

Figure 11:
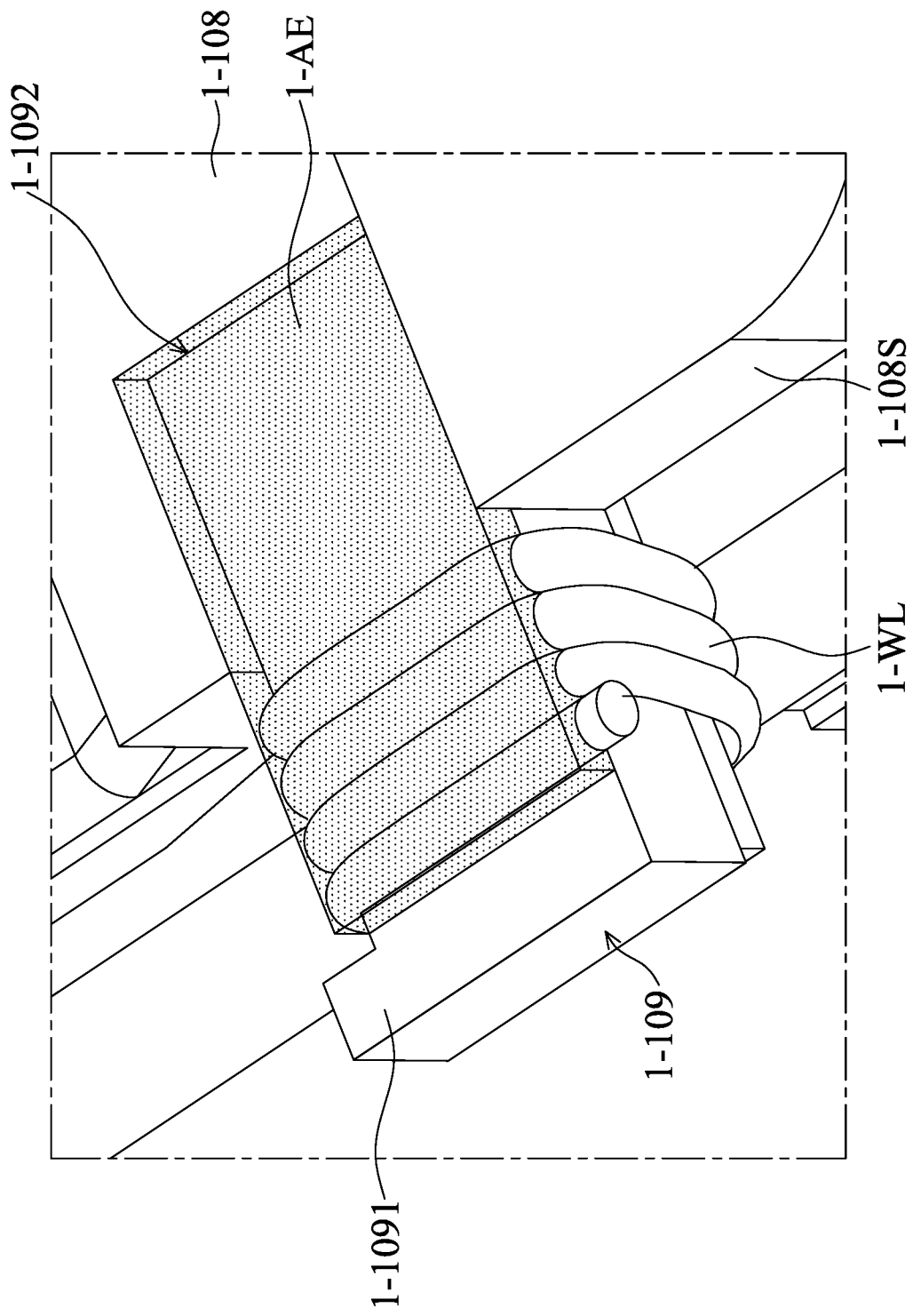
FIG. 11 is a schematic diagram of a partial structure of the lens holder 1-108 according to another embodiment of the present disclosure.

Please refer to FIG. 11, which is a schematic diagram of a partial structure of the lens holder 1-108 according to another embodiment of the present disclosure. As shown in FIG. 11, in this embodiment, the glue receiving groove 1-1092 is formed by the movable assembly surface 1-108S toward the optical axis 1-O, and the glue receiving groove 1-1092 is connected to the winding member 1-109 and configured to receive at least part of the electrical connection element 1-AE. Based on the structural configuration of this embodiment, the contact area of the electrical connection element 1-AE and the leading wire 1-WL can be increased, and the accuracy of setting the electrical connection element 1-AE can be increased.

Figure 12:
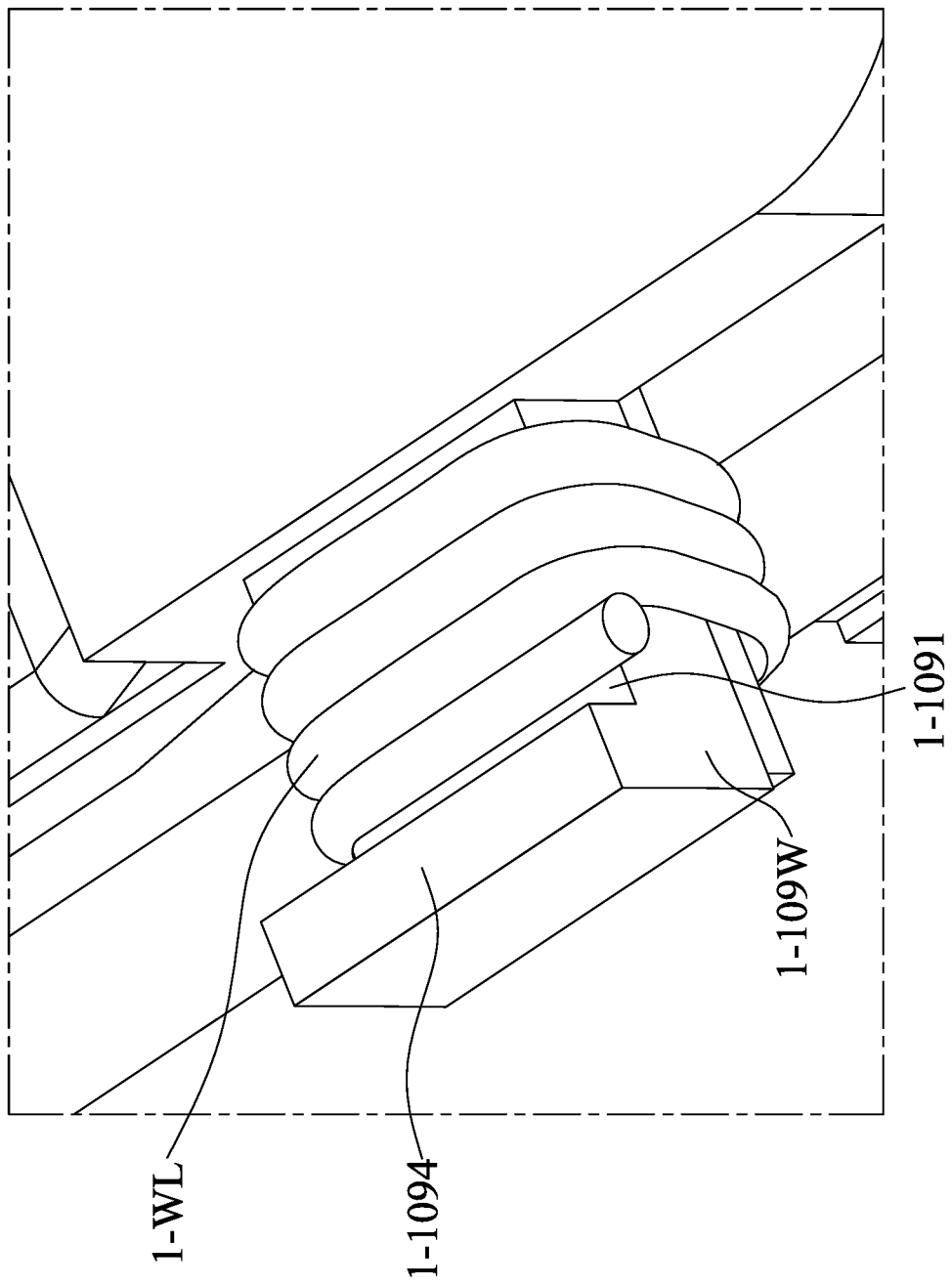
FIG. 12 is a schematic diagram of a partial structure of the lens holder 1-108 according to another embodiment of the present disclosure.
Figure 13:
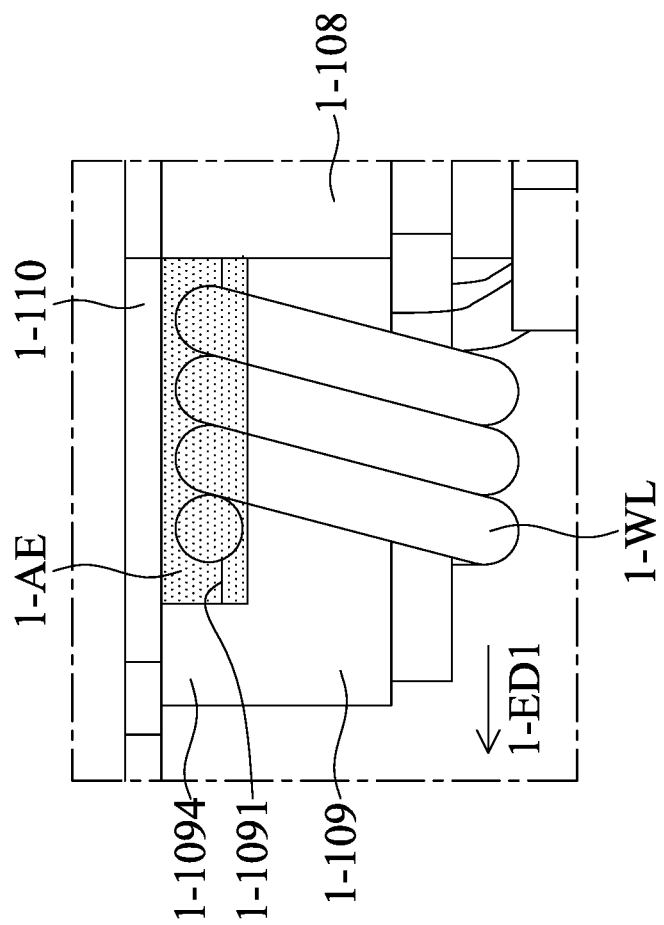
FIG. 13 is a side view of a partial structure of the lens holder 1-108 according to another embodiment of the present disclosure.

Please refer to FIG. 12 and FIG. 13. FIG. 12 is a schematic diagram of a partial structure of the lens holder 1-108 according to another embodiment of the present disclosure, and FIG. 13 is a side view of a partial structure of the lens holder 1-108 according to another embodiment of the present disclosure. In this embodiment, the winding member 1-109 may have a blocking wall 1-1094 protruding from the winding member surface 1-1091. The blocking wall 1-1094 is configured to limit the movement of the electrical connection element 1-AE in the extending direction 1-ED1 of the winding member 1-109.

Based on the structural configuration of this embodiment, the electrical connection element 1-AE can overflow from the winding member surface 1-1091 toward the side walls 1-109W on both sides so as to increase the contact area between the electrical connection element 1-AE and leading wire 1-WL.

Figure 15:
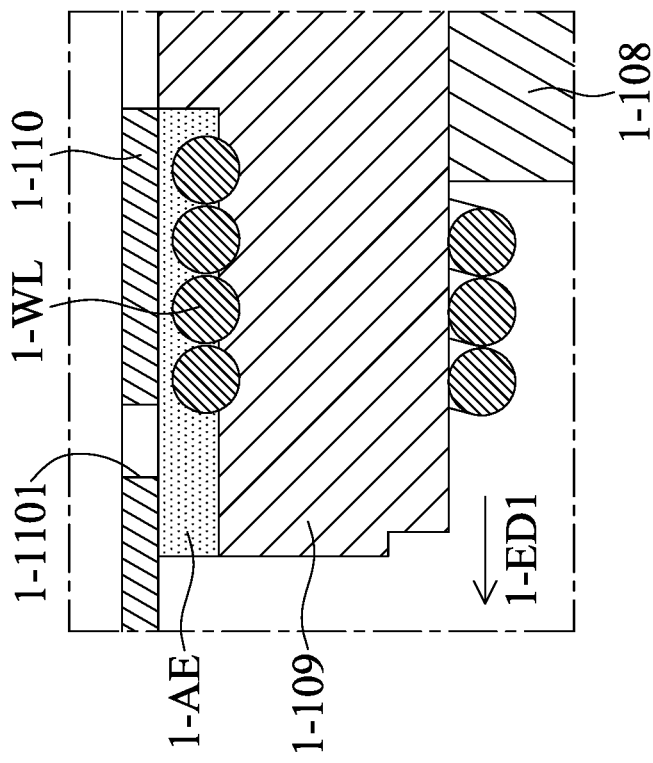
FIG. 15 is a cross-sectional view along the line 1-C-1-C' in FIG. 14 according to another embodiment of the present disclosure.
Figure 14:
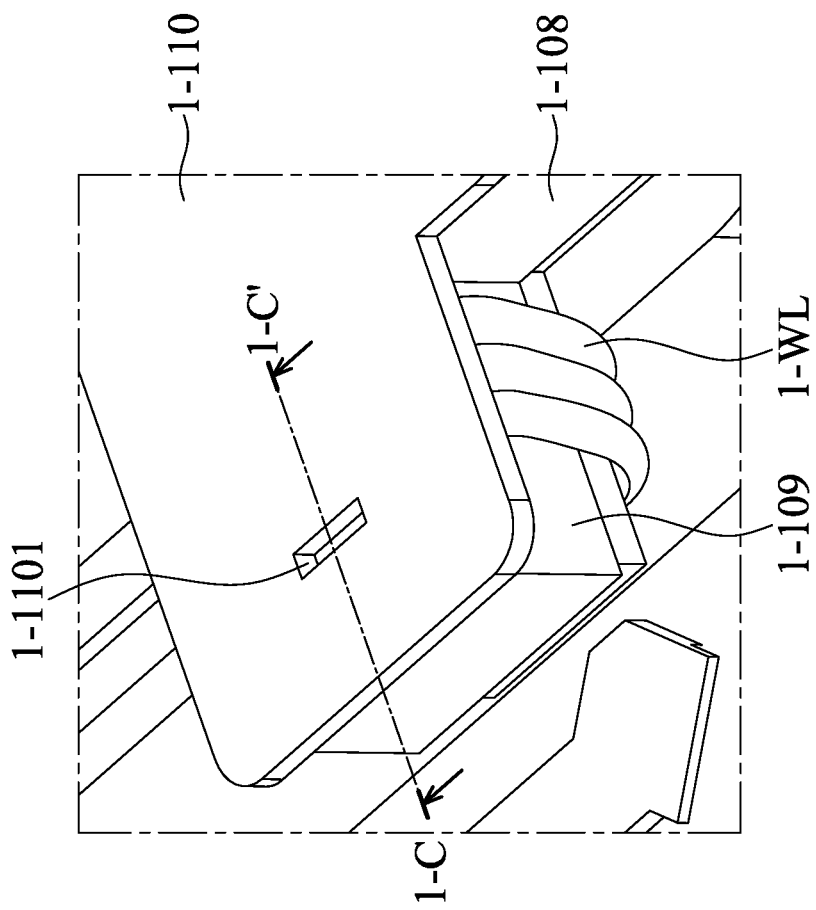
FIG. 14 is a schematic diagram of a partial structure of the lens holder 1-108 according to another embodiment of the present disclosure.

Please refer to FIG. 14 and FIG. 15. FIG. 14 is a schematic diagram of a partial structure of the lens holder 1-108 according to another embodiment of the present disclosure, and FIG. 15 is a cross-sectional view along the line 1-C-1-C' in FIG. 14 according to another embodiment of the present disclosure. In this embodiment, the second elastic member 1-110 further has a through hole 1-1101, and when viewed in a direction (such as the Z-axis) perpendicular to the extending direction 1-ED1, the electrical connection element 1-AE and part of the winding member 1-109 can be seen through the through hole 1-1101.

Based on the design of the through hole 1-1101 of the present disclosure, the operator can easily observe the state of connection between the electrical connection element 1-AE and the winding member 1-109 and between the electrical connection element 1-AE and the leading wire 1-WL.

Figure 16:
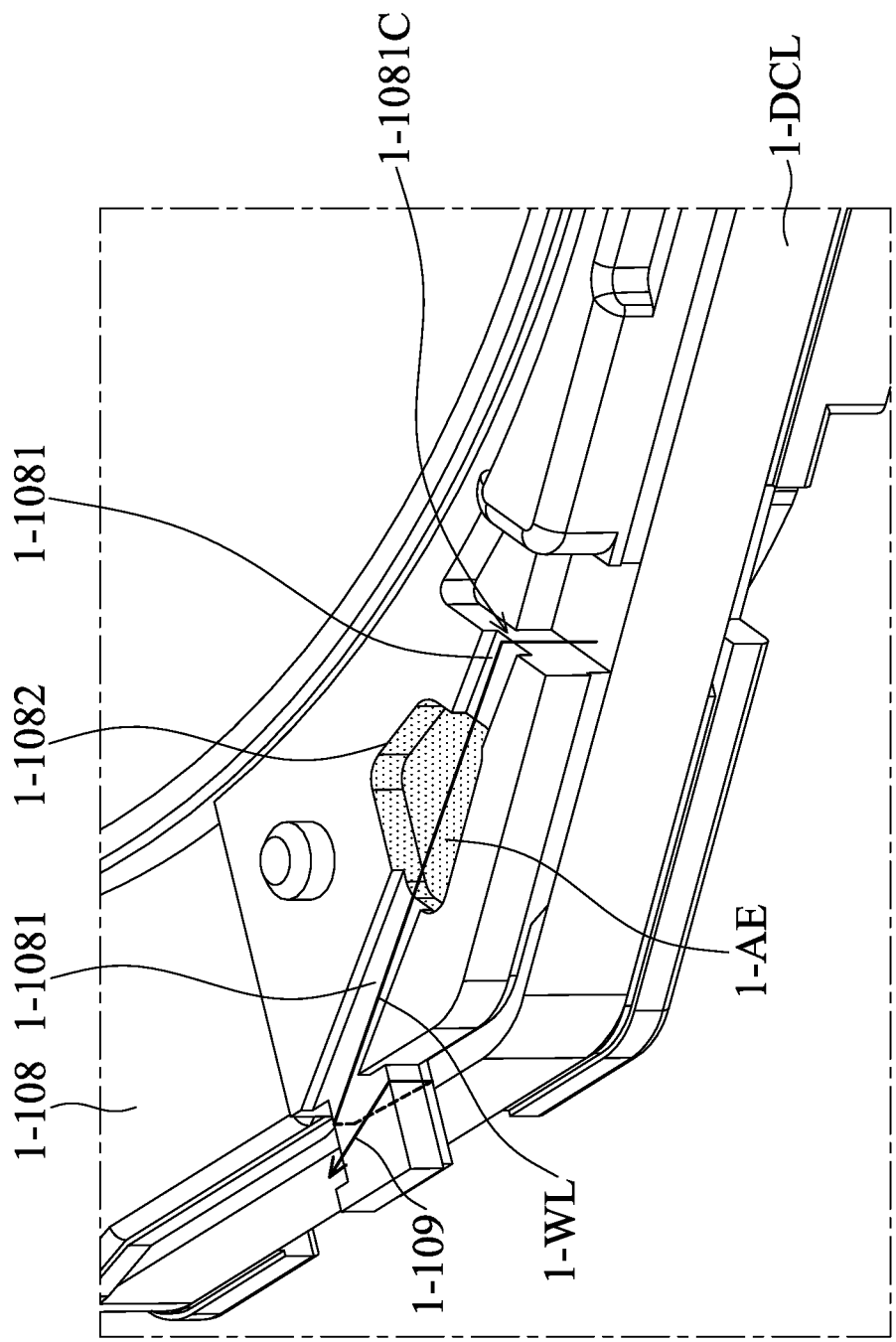
FIG. 16 is a schematic diagram of a partial structure of the lens holder 1-108 according to another embodiment of the present disclosure.

Please refer to FIG. 16, which is a schematic diagram of a partial structure of the lens holder 1-108 according to another embodiment of the present disclosure. In this embodiment, the lens holder 1-108 of the movable assembly 1-MA has a groove 1-1081 and a concave groove 1-1082. The groove 1-1081 is connected to the winding member 1-109 and configured to accommodate the leading wire 1-WL. The winding direction of the leading wire 1-WL can be indicated by the arrow in FIG. 16. The concave groove 1-1082 is disposed in the groove 1-1081 and configured to accommodate the electrical connection element 1-AE, and the groove 1-1081 and the concave groove 1-1082 have different depths. For example, the depth of the concave groove 1-1082 in the Z-axis is greater than the depth of the groove 1-1081, so that the electrical connection element 1-AE can be easily disposed in the concave groove 1-1082.

It is worth noting that, in this embodiment, the insulating layer of the leading wire 1-WL located at (and/or adjacent to) the concave groove 1-1082 is removed, so that the leading wire 1-WL is electrically connected to the second elastic member 1-110 through the electrical connection element 1-AE in the concave groove 1-1082. In this embodiment, the insulating layer of the leading wire 1-WL located on the winding member 1-109 is not removed.

As shown in FIG. 16, the groove 1-1081 further has a bending receiving portion 1-1081C, and part of the leading wire 1-WL is located at the bending receiving portion 1-1081C. Specifically, the bending receiving portion 1-1081C may be a corner structure, and the insulating layer of the leading wire 1-WL on the corner structure is not removed to avoid the problem of easy breakage caused by the bending of the leading wire 1-WL.

Figure 17:
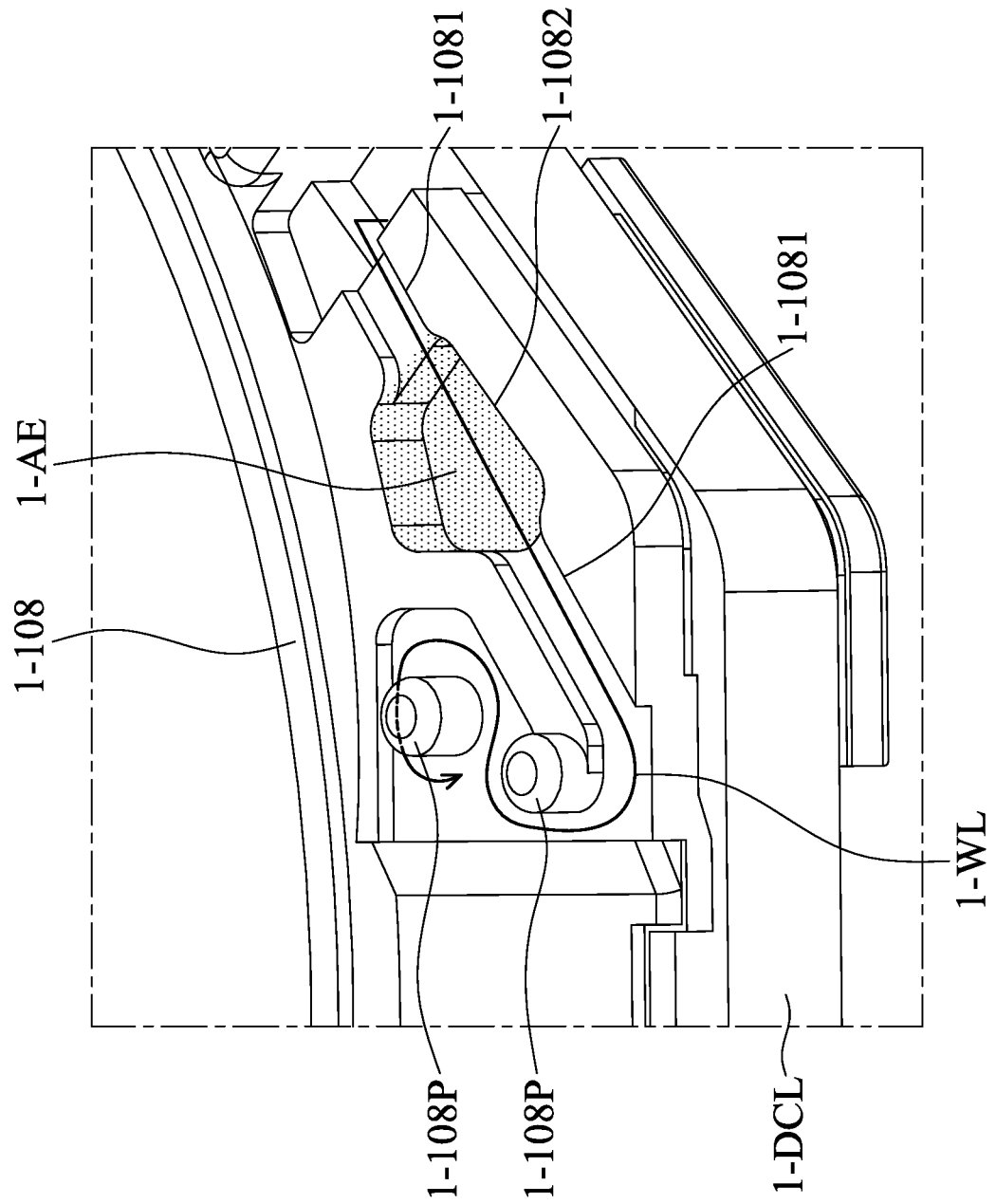
FIG. 17 is a schematic diagram of a partial structure of the lens holder 1-108 according to another embodiment of the present disclosure.

Please refer to FIG. 17, which is a schematic diagram of a partial structure of the lens holder 1-108 according to another embodiment of the present disclosure. In this embodiment, the optical element driving mechanism 1-100 further includes two protruding posts 1-108P, which are disposed on the lens holder 1-108 of the movable assembly 1-MA, and the leading wire 1-WL of the driving coil 1-DCL can be wound on the protruding post 1-108P in a direction of the arrow in FIG. 17. In this embodiment, the protruding post 1-108P extends in a direction (for example, the Z-axis) parallel to a winding axis of the driving coil 1-DCL.

Similar to the previous embodiment, the lens holder 1-108 also has a groove 1-1081 and a concave groove 1-1082. The groove 1-1081 is configured to accommodate the leading wire 1-WL, and the concave groove 1-1082 is disposed in the groove 1-1081 and is configured to accommodate the electrical connection element 1-AE. It is worth noting that the protruding post 1-108P is not disposed in the concave groove 1-1082. Because the winding member 1-109 is omitted, the lens holder 1-108 can be further miniaturized.

The assembly procedure of the lens holder 1-108, the driving coil 1-DCL and the second elastic member 1-110 can be described as follows: winding the leading wire 1-WL around the protruding post 1-108P in the direction of the arrow in FIG. 17, setting the electrical connection element 1-AE in the concave groove 1-1082, then using the protruding posts 1-108P to position the second elastic member 1-110 on the lens holder 1-108, and finally connecting the second elastic member 1-110 to the lens holder 1-108 by hot rivet. After the hot rivet process, the height of the protruding posts 1-108P are decreased.

Figure 18:
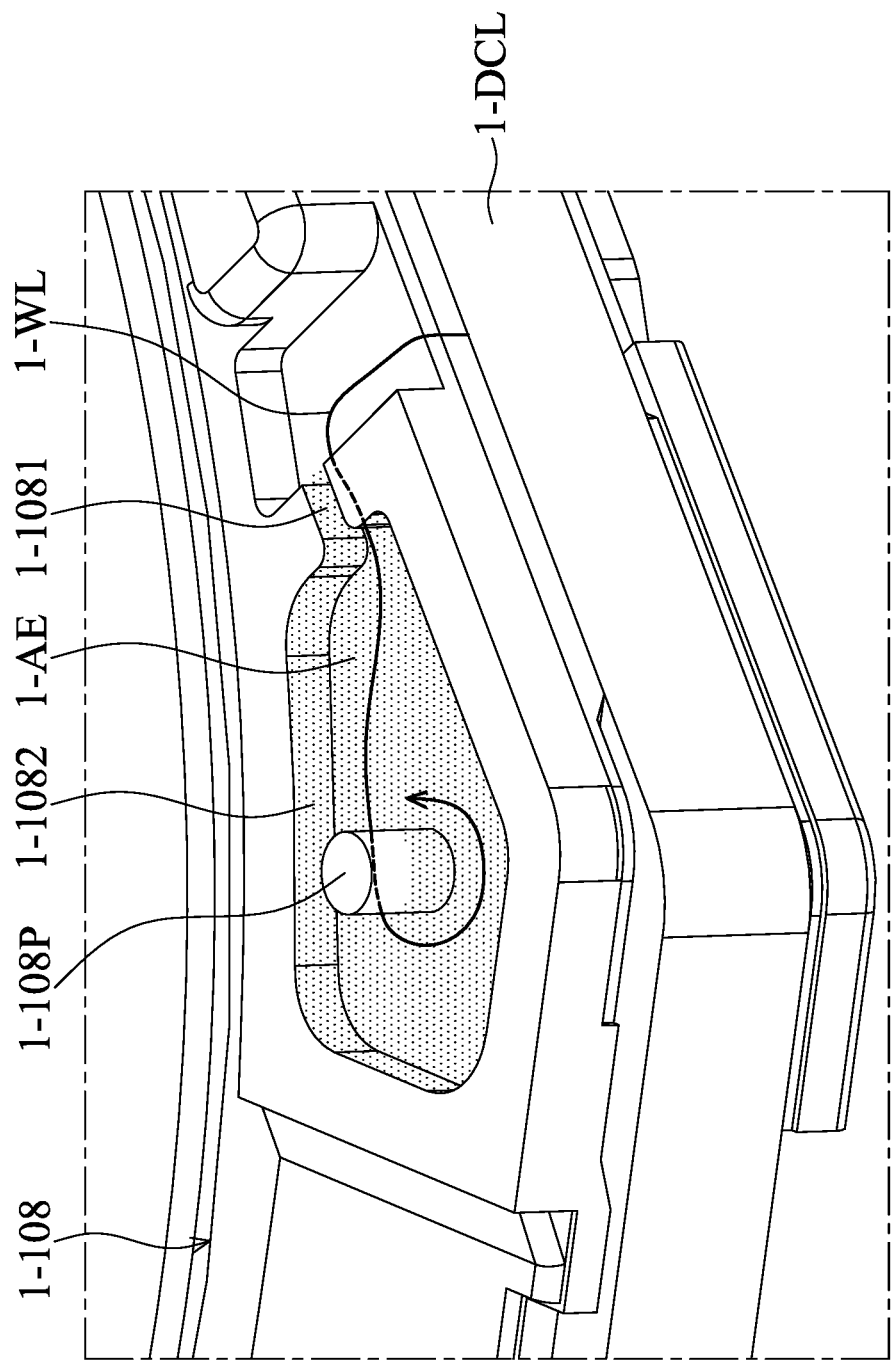
FIG. 18 is a schematic diagram of a partial structure of the lens holder 1-108 according to another embodiment of the present disclosure.

Please refer to FIG. 18, which is a schematic diagram of a partial structure of the lens holder 1-108 according to another embodiment of the present disclosure. Similar to the previous embodiment, the lens holder 1-108 also has a groove 1-1081 and a concave groove 1-1082. The groove 1-1081 is configured to accommodate the leading wire 1-WL, and the concave groove 1-1082 is connected to the groove 1-1081 and configured to accommodate the electrical connection element 1-AE.

Specifically, in this embodiment, the groove 1-1081 and the concave groove 1-1082 may have the same depth, and the protruding post 1-108P is disposed in the concave groove 1-1082. Similar to the previous embodiment, after the hot rivet process, the height of the protruding post 1-108P is reduced, for example, to be approximately equal to the depth of the concave groove 1-1082.

Based on the structural configuration of this embodiment, the electrical connection element 1-AE can be covered by the second elastic member 1-110 without overflowing the concave groove 1-1082, thereby increasing the convenience in the manufacturing process.

Figure 19:
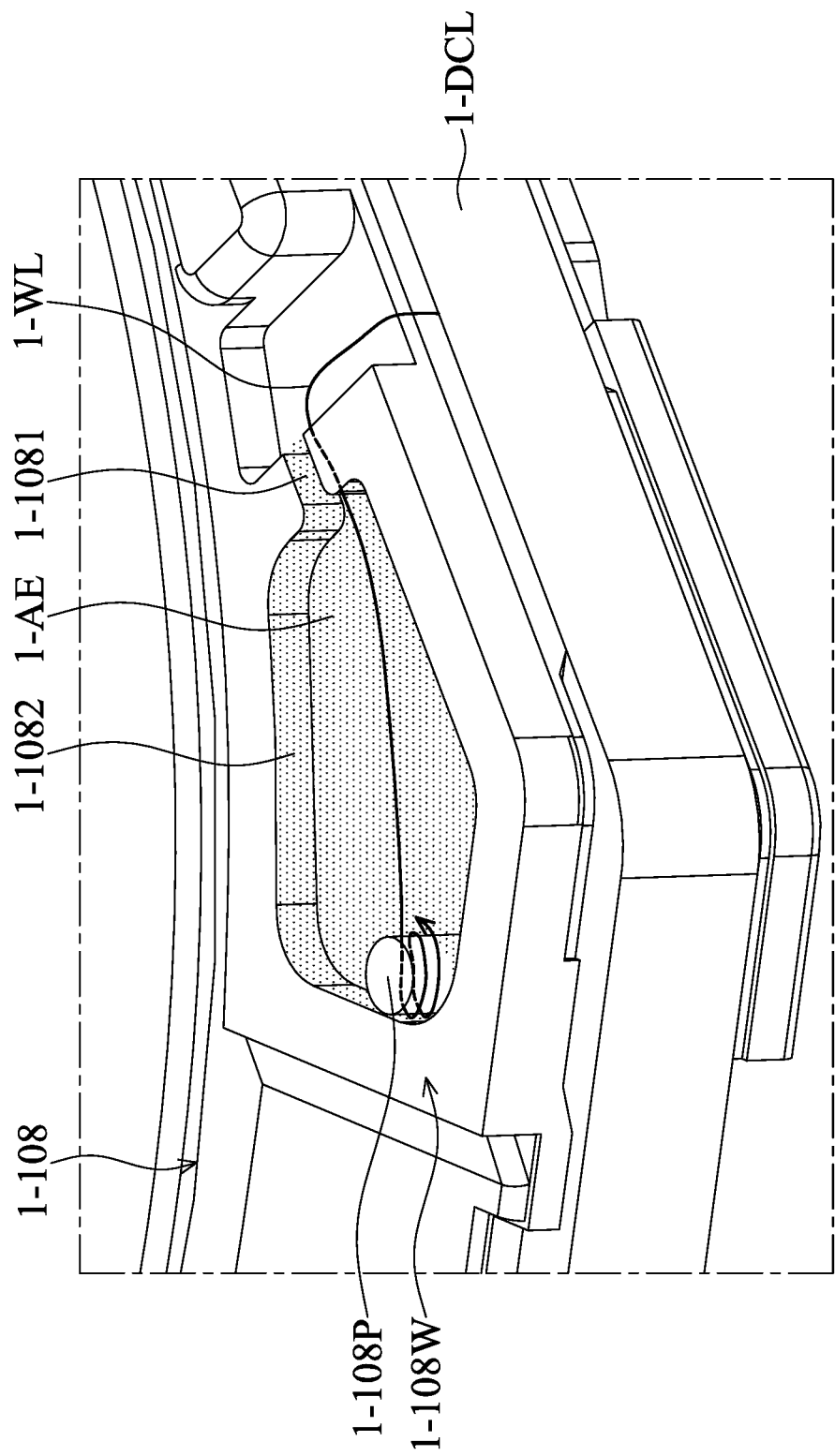
FIG. 19 is a schematic diagram of a partial structure of the lens holder 1-108 according to another embodiment of the present disclosure.

Please refer to FIG. 19, which is a schematic diagram of a partial structure of the lens holder 1-108 according to another embodiment of the present disclosure. In this embodiment, the concave groove 1-1082 is formed by a side wall 1-108W of the lens holder 1-108, and the protruding post 1-108P is disposed adjacent to the side wall 1-108W. Based on the structural configuration of this embodiment, the leading wire 1-WL can be more easily wound on the protruding post 1-108P.

Similar to the foregoing embodiment, the second elastic member 1-110 is thermally riveted to the protruding post 1-108P after the electrical connection element 1-AE is disposed in the concave groove 1-1082. In various embodiments of the present disclosure, the protruding post 1-108P can be configured to position the second elastic member 1-110.

Figure 20:
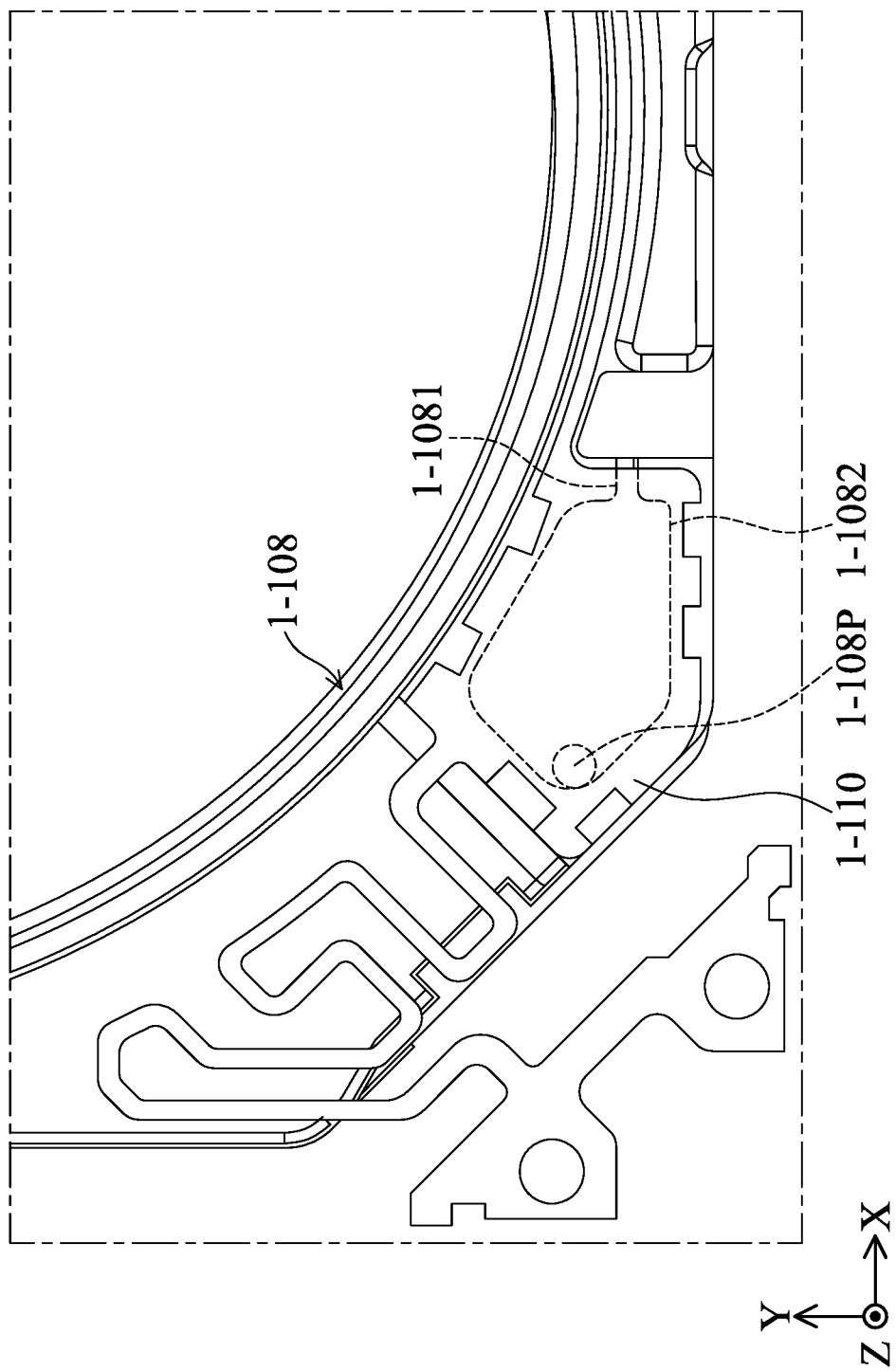
FIG. 20 is a bottom view of the lens holder 1-108 and the second elastic member 1-110 after the process of hot rivet according to another embodiment of the present disclosure.
Figure 21:
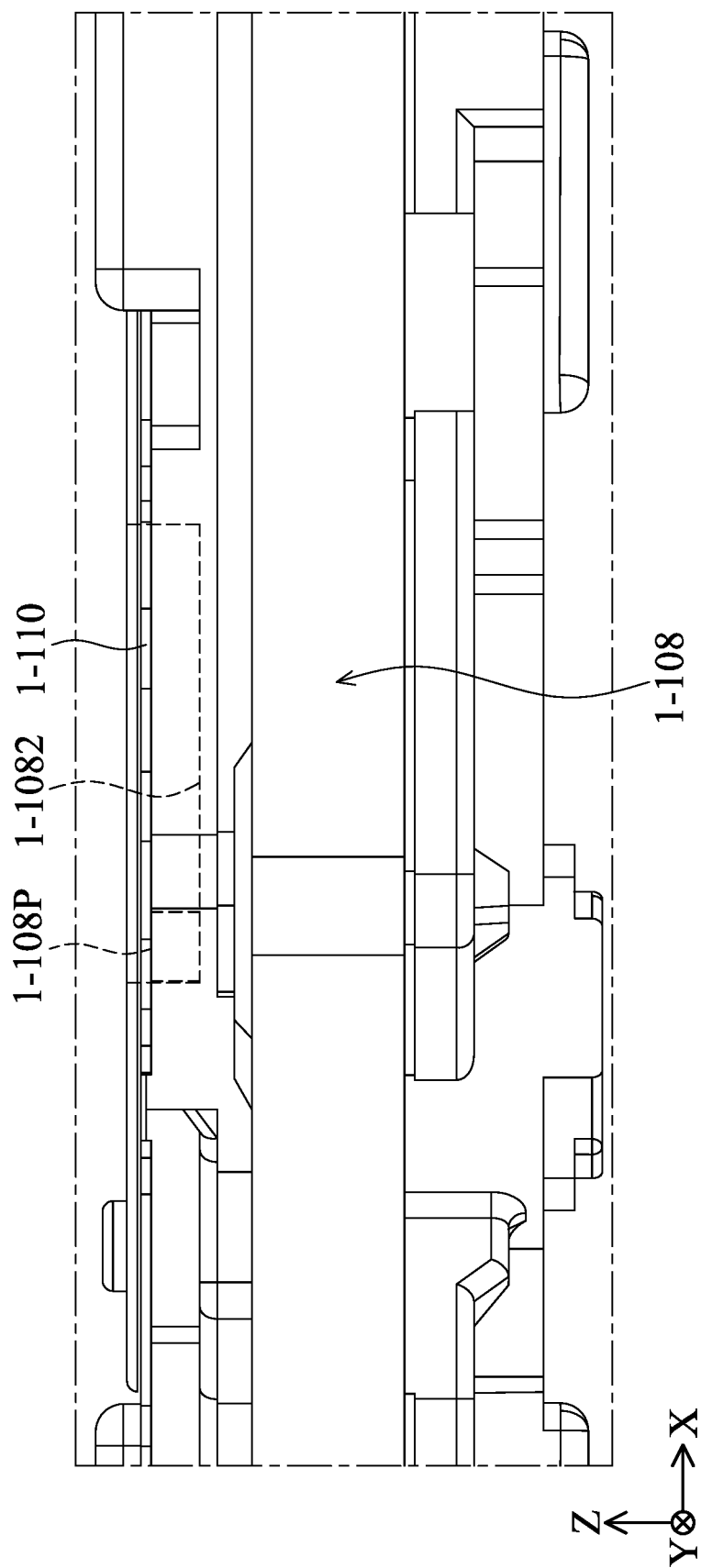
FIG. 21 is a schematic side view of the lens holder 1-108 and the second elastic member 1-110 after the process of hot rivet according to an embodiment of the present disclosure.

Please refer to FIG. 20 and FIG. 21. FIG. 20 is a bottom view of the lens holder 1-108 and the second elastic member 1-110 after the process of hot rivet according to another embodiment of the present disclosure, and FIG. 21 is a schematic side view of the lens holder 1-108 and the second elastic member 1-110 after the process of hot rivet according to an embodiment of the present disclosure. As shown in FIG. 20, when viewed along the optical axis 1-O (the Z-axis), the protruding post 1-108P overlaps at least part of the lens holder 1-108 and overlaps at least part of the second elastic member 1-110. Specifically, the protruding post 1-108P is covered by the second elastic member 1-110 without being exposed.

As shown in FIG. 21, when viewed in a direction (for example, the Y-axis) perpendicular to the optical axis 1-O, the protruding post 1-108P is located between the second elastic member 1-110 and the lens holder 1-108. The protruding post 1-108P is covered by the lens holder 1-108 without being exposed.

The present disclosure provides an optical element driving mechanism 1-100. In some embodiments, two winding members 1-109 may be disposed on the lens holder 1-108 and may serve as an initial end and a finished end of the driving coil 1-DCL, respectively. After the leading wire 1-WL of the driving coil 1-DCL is wound around the two winding members 1-109, the electrical connection element 1-AE can be disposed between the winding members 1-109 and the second elastic member 1-110, so that the leading wire 1-WL is electrically connected to the second elastic member 1-110.

Based on the structural design of the present disclosure, in the manufacturing process of the optical element driving mechanism 1-100, the electrical connection element 1-AE can be automatically set to achieve the electrical connection, and there is no need to connect the leading wire 1-WL and the second elastic member 1-110 by welding through the operator, so that the purpose of reducing process complexity and improving process efficiency can be achieved.

The Second Embodiment Group.

Figure 22:
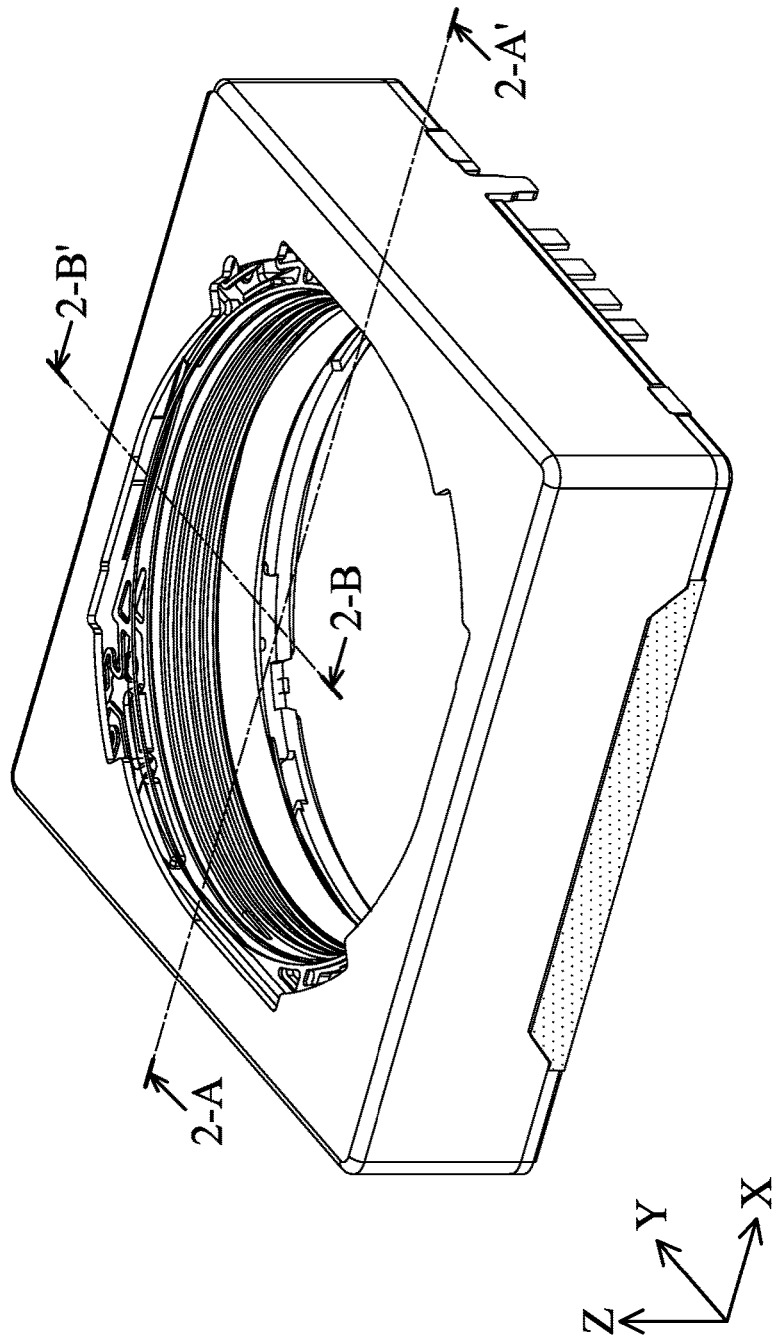
FIG. 22 is a schematic diagram of an optical element driving mechanism 2-100 according to an embodiment of the present disclosure.
Figure 23:
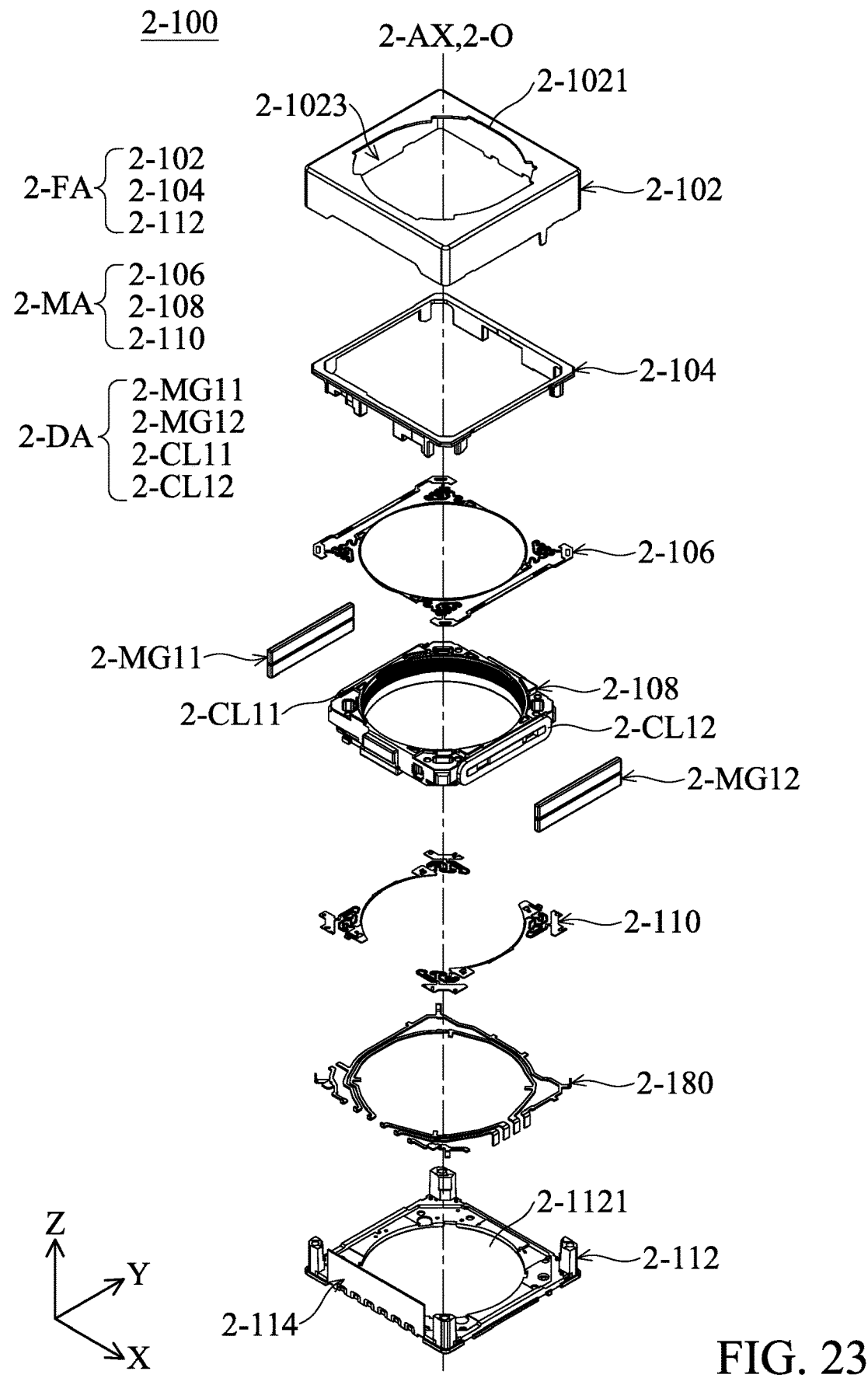
FIG. 23 is an exploded diagram of the optical element driving mechanism 2-100 according to an embodiment of the present disclosure.
Figure 24:
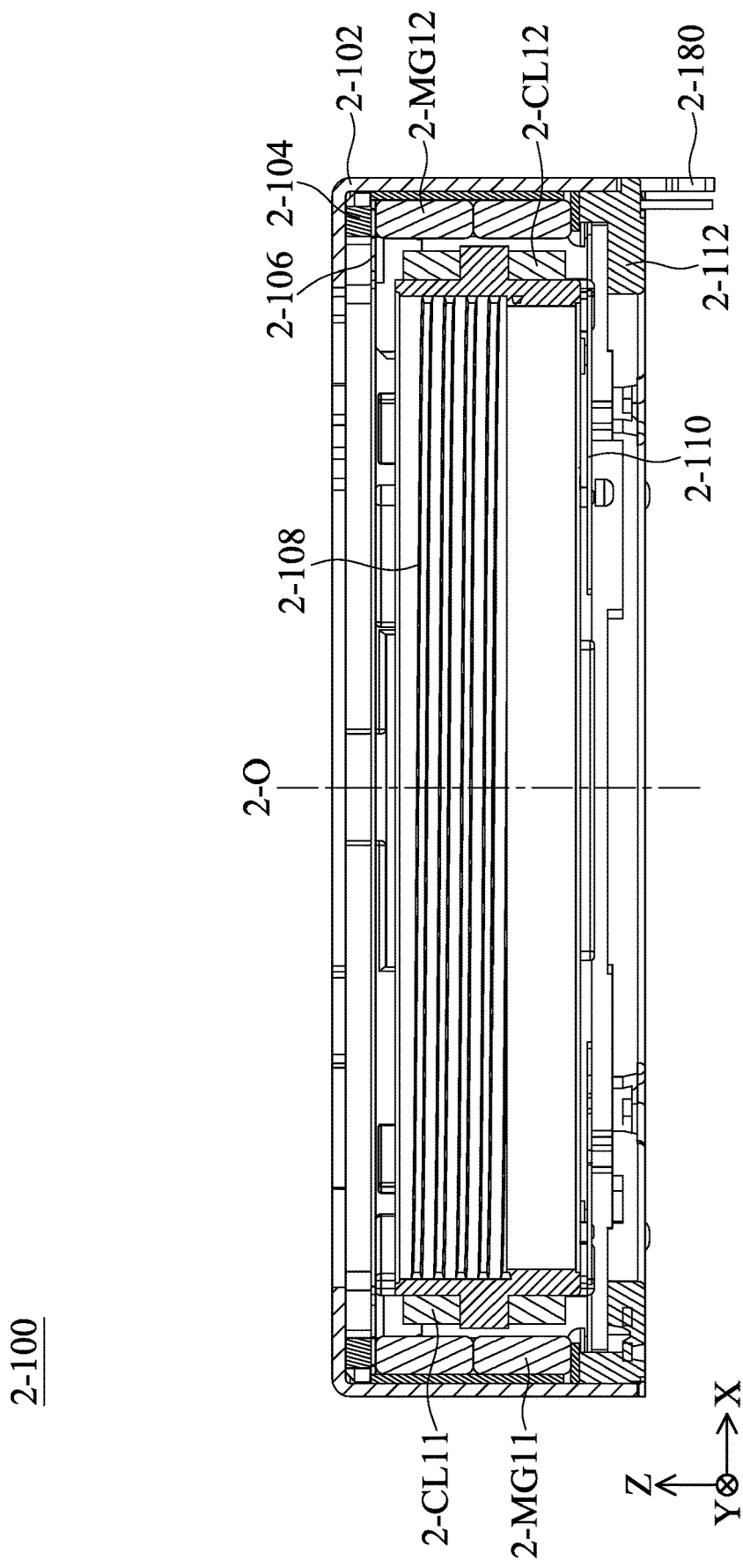
FIG. 24 is a cross-sectional view of the optical element driving mechanism 2-100 along line 2-A-2-A' in FIG. 24 according to an embodiment of the present disclosure.

Please refer to FIG. 22 to FIG. 24. FIG. 22 is a schematic diagram of an optical element driving mechanism 2-100 according to an embodiment of the present disclosure. FIG. 23 is an exploded diagram of the optical element driving mechanism 2-100 according to an embodiment of the present disclosure, and FIG. 24 is a cross-sectional view of the optical element driving mechanism 2-100 along line 2-A-2-A' in FIG. 24 according to an embodiment of the present disclosure. The optical element driving mechanism 2-100 can be an optical camera module configured to hold an optical element. The optical element driving mechanism 2-100 can be installed in various electronic devices or portable electronic devices, such as a smartphone, for allowing a user to perform the image capturing function. In this embodiment, the optical element driving mechanism 2-100 can be a voice coil motor (VCM) with an auto-focusing (AF) function, but it is not limited thereto. In other embodiments, the optical element driving mechanism 2-100 can also perform the functions of auto-focusing and optical image stabilization (OIS).

In the present embodiment, the optical element driving mechanism 2-100 can include a fixed assembly 2-FA, a movable assembly 2-MA, and a driving assembly 2-DA. The movable assembly 2-MA is movably connected to the fixed assembly 2-FA, and the movable assembly 2-MA is configured to hold the optical element (not shown in the figures). The driving assembly 2-DA is configured to drive the movable assembly 2-MA to move relative to the fixed assembly 2-FA.

In this embodiment, as shown in FIG. 23, the fixed assembly 2-FA includes a casing 2-102, a frame 2-104 and a base 2-112. The movable assembly 2-MA includes a lens holder 2-108 and the aforementioned optical element, and the lens holder 2-108 is used for holding the optical element. A main axis 2-AX can be defined by the fixed assembly 2-FA, and an optical axis 2-O can be defined by the optical element. The main axis 2-AX may, for example, overlap the optical axis 2-O, but it is not limited thereto.

As shown in FIG. 23, the casing 2-102 has a hollow structure, and a casing opening 2-1021 is formed thereon, and a base opening 2-1121 is formed on the base 2-112. The center of the casing opening 2-1021 corresponds to the optical axis 2-O of the optical element, and the base opening 2-1121 corresponds to a photosensitive element (not shown) disposed under the base 2-112. The external light can enter the casing 2-102 from the casing opening 2-1021 to be received by the photosensitive element after passing through the optical element and the base opening 2-1121 so as to generate a digital image signal. In this embodiment, a light-incident end and a light-exiting end may be defined by the optical element driving mechanism 2-100, and the light-incident end may be a light emitting source above the optical element driving mechanism 2-100 in FIG. 24, and the light-exiting end may be a light receiving end under the optical element driving mechanism 2-100 in FIG. 24.

Furthermore, the casing 2-102 is disposed on the base 2-112 and may have an accommodating space 2-1023 for accommodating the movable assembly 2-MA (including the aforementioned optical element and the lens holder 2-108) and the driving assembly 2-DA. The frame 2-104 is fixed to the casing 2-102 and disposed in the accommodating space 2-1023.

The movable assembly 2-MA may further include a first elastic member 2-106 and a second elastic member 2-110. The outer portion (the outer ring portion) of the first elastic member 2-106 is fixed to the frame 2-104, the outer portion (the outer ring portion) of the second elastic member 2-110 is fixed to the base 2-112, and the inner portions (the inner ring portions) of the first elastic member 2-106 and the second elastic member 2-110 are respectively connected to the upper and lower sides of the lens holder 2-108, so that the lens holder 2-108 can be suspended in the accommodating space 2-1023. That is, the elastic elements are elastically connected to the movable assembly 2-MA and the fixed assembly 2-FA.

In this embodiment, the driving assembly 2-DA may include a first magnet 2-MG11, a second magnet 2-MG12, a first coil 2-CL11, and a second coil 2-CL12. The first coil 2-CL11 and the second coil 2-CL12 are disposed on the lens holder 2-108, and the first magnet 2-MG11 and the second magnet 2-MG12 are disposed on the inner wall surface of the casing 2-102 respectively corresponding to the first coil 2-CL11 and the second coil 2-CL12.

In this embodiment, the first coil 2-CL11 and the second coil 2-CL12 may be wound coils (oval coils) and be disposed on opposite sides of the lens holder 2-108. When the first coil 2-CL11 and the second coil 2-CL12 are provided with electricity, the first coil 2-CL11 and the second coil 2-CL12 respectively act with the first magnet 2-MG11 and the second magnet 2-MG12 to generate an electromagnetic force, so as to drive the lens holder 2-108 and the held optical element to move relative to the base 2-112 along the optical axis 2-O (the Z-axis).

Furthermore, the optical element driving mechanism 2-100 of the present disclosure further includes a circuit assembly 2-114 and the circuit member 2-180 configured to be electrically connected to the driving assembly 2-DA. The circuit assembly 2-114 may be a circuit board configured to be electrically connected to an external circuit, such as a main circuit board of an external electronic device, so that the driving assembly 2-DA can operate according to the signal of the external electronic device.

Furthermore, in this embodiment, the circuit member 2-180 is disposed inside the base 2-112. For example, the base 2-112 is made of plastic material, and the circuit member 2-180 is formed in the base 2-112 by the molded interconnect device (MID) technology.

Figure 25:
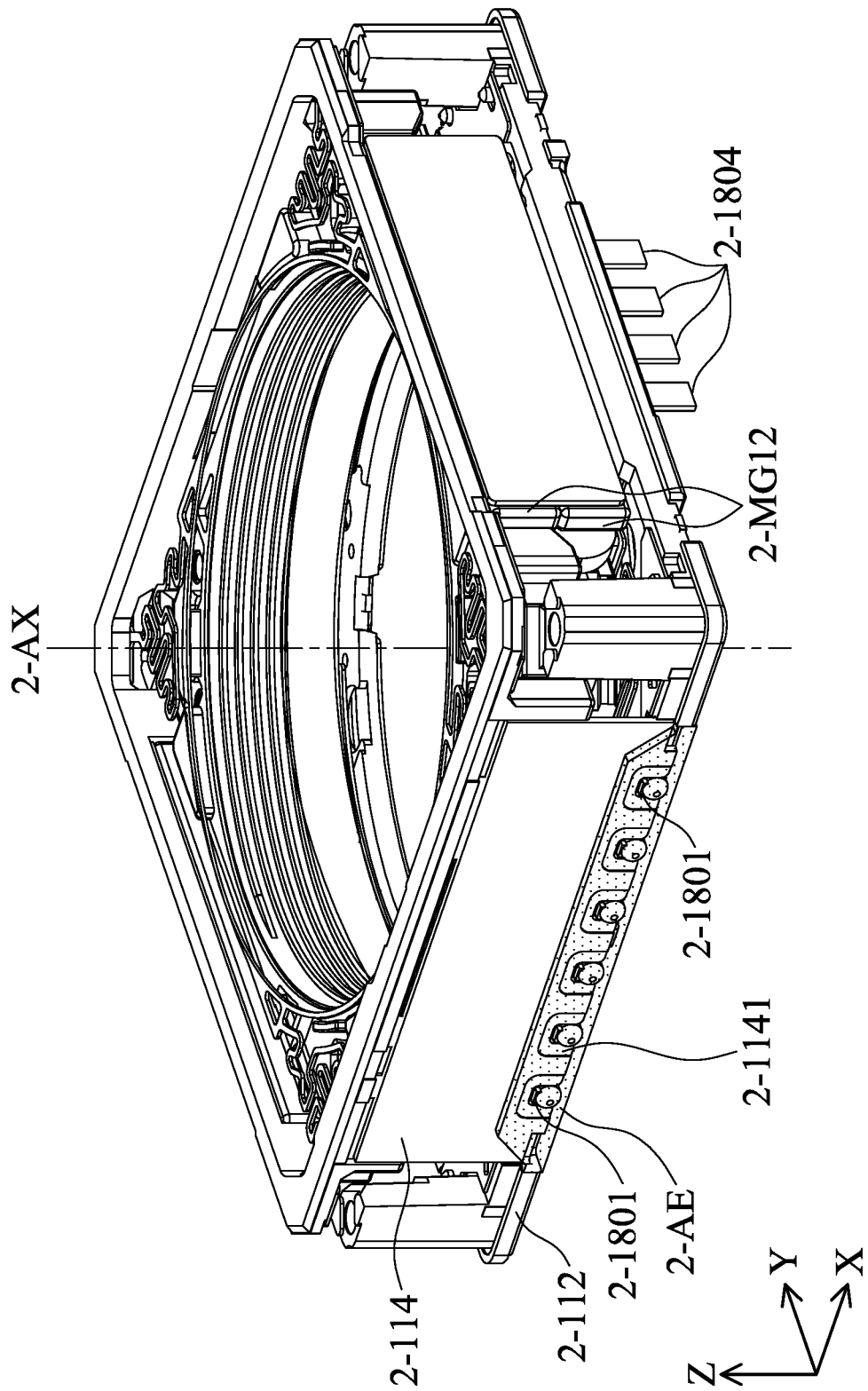
FIG. 25 is a perspective view of the optical element driving mechanism 2-100 after removing the casing 2-102 according to an embodiment of the present disclosure.
Figure 26:
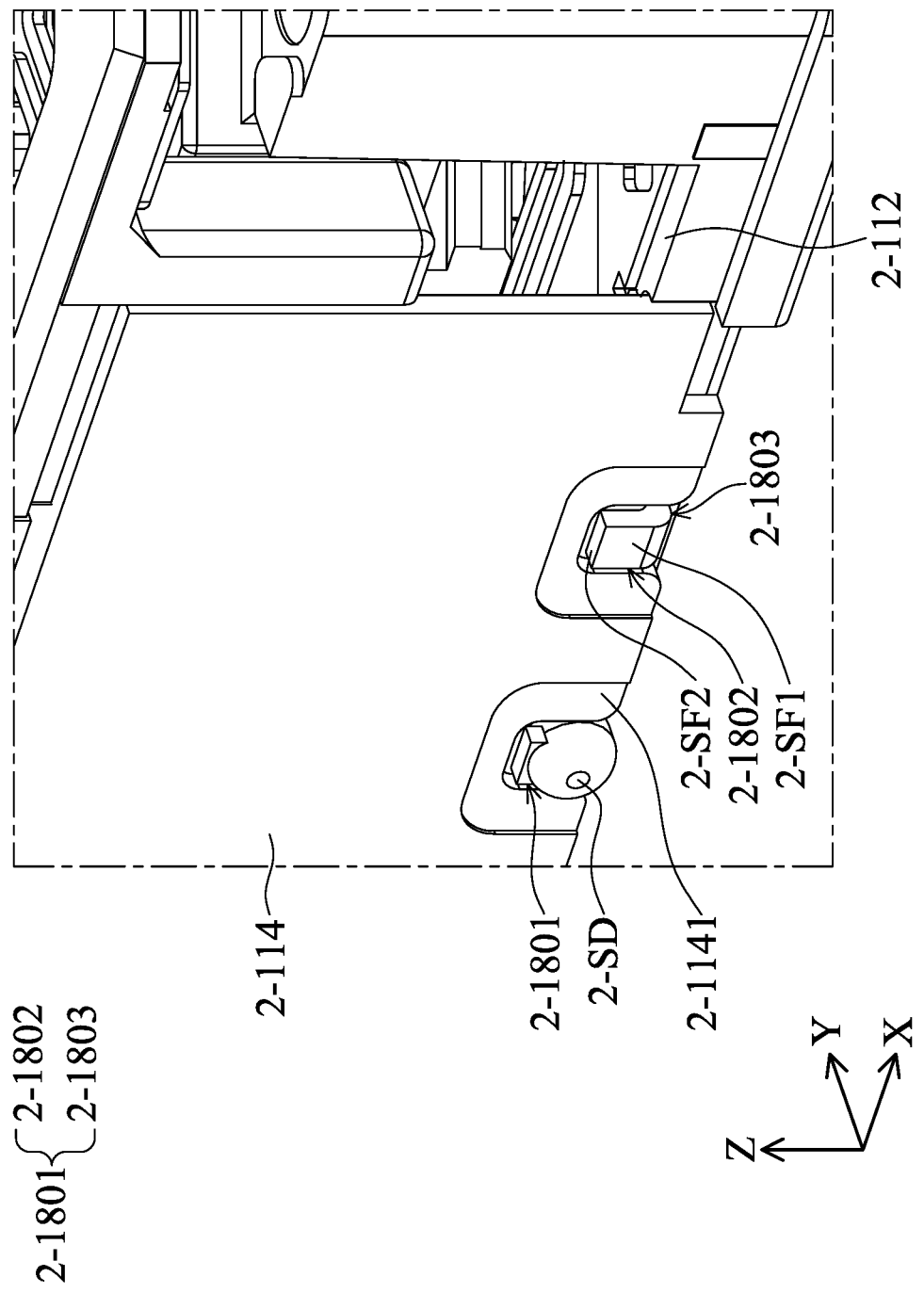
FIG. 26 is a partial enlarged diagram of the optical element driving mechanism 2-100 according to an embodiment of the present disclosure.

Please refer to FIG. 25 to FIG. 26. FIG. 25 is a perspective view of the optical element driving mechanism 2-100 after removing the casing 2-102 according to an embodiment of the present disclosure, and FIG. 26 is a partial enlarged diagram of the optical element driving mechanism 2-100 according to an embodiment of the present disclosure. In this embodiment, the circuit member 2-180 has a plurality of electrical connection terminals 2-1801, protruding from the base 2-112, and each of the electrical connection terminals 2-1801 may include a straight portion 2-1802 and a bent portion 2-1803.

When viewed in a direction perpendicular to the main axis 2-AX (for example, in the Y-axis), the straight portion 2-1802 is closer to the light-incident end of the optical element driving mechanism 2-100 than the bent portion 2-1803. Specifically, the straight portion 2-1802 extends in the +Z-axis from the bent portion 2-1803, and the straight portion 2-1802 may be parallel to the optical axis 2-O, for example, but it is not limited thereto.

In other embodiments of the present disclosure, the straight portion 2-1802 extends in the —Z-axis from the bent portion 2-1803. Therefore, when viewed in the direction perpendicular to the main axis 2-AX (the Y-axis), the straight portion 2-1802 is closer to the light-exiting end of the optical element driving mechanism 2-100 than the bent portion 2-1803.

As shown in FIG. 26, the straight portion 2-1802 has a first surface 2-SF1 parallel to the main axis 2-AX and a second surface 2-SF2 perpendicular to the main axis 2-AX, and the first surface 2-SF1 is made of a different material than the second surface 2-SF2.

As shown in FIG. 26, the circuit assembly 2-114 may include a plurality of electrical connection portions 2-1141, the electrical connection portion 2-1141 is configured to be electrically connected to the corresponding straight portion 2-1802 and/or the bent portion 2-1803. The electrical connection portion 2-1141 can be a solder pad configured to be connected to the corresponding electrical connection terminal 2-1801 by solder 2-SD.

In this embodiment, the electrical connection terminals 2-1801 protrude from the circuit assembly 2-114, and when viewed along the main axis 2-AX, the electrical connection portion 2-1141 overlaps at least one portion of the second surface 2-SF2 of the corresponding straight portion 2-1802.

As shown in FIG. 25, the optical element driving mechanism 2-100 may further include an adhesive element 2-AE, and the adhesive element 2-AE may be glue, which is disposed between the bent portion 2-1803 and the electrical connection portion 2-1141. The adhesive element 2-AE can completely cover and protect the electrical connection terminals 2-1801 and the electrical connection portions 2-1141. The adhesive element 2-AE and the solder 2-SD may be collectively referred to as an adhesive assembly.

Furthermore, as shown in FIG. 25, the circuit member 2-180 may further include a plurality of external electrical connection portions 2-1804 configured to be electrically connected to an external circuit, and the external electrical connection portions 2-1804 and the electrical connection terminals 2-1801 extend in opposite directions. Specifically, the external electrical connection portion 2-1804 extends in the —Z-axis, and the electrical connection terminal 2-1801 extends in the +Z-axis.

As shown in FIG. 22 and FIG. 25, when viewed along the main axis 2-AX, the optical element driving mechanism 2-100 has a rectangular structure, and the electrical connection terminals 2-1801 and the external electrical connection portions 2-1804 are located on different sides of the optical element driving mechanism 2-100.

In this embodiment, the first magnet 2-MG11 and the second magnet 2-MG12 may be referred to as driving magnetic elements, and when viewed along the main axis 2-AX, the second magnet 2-MG12 and the external electrical connection portions 2-1804 are located on the same side of the optical element driving mechanism 2-100.

Figure 27:
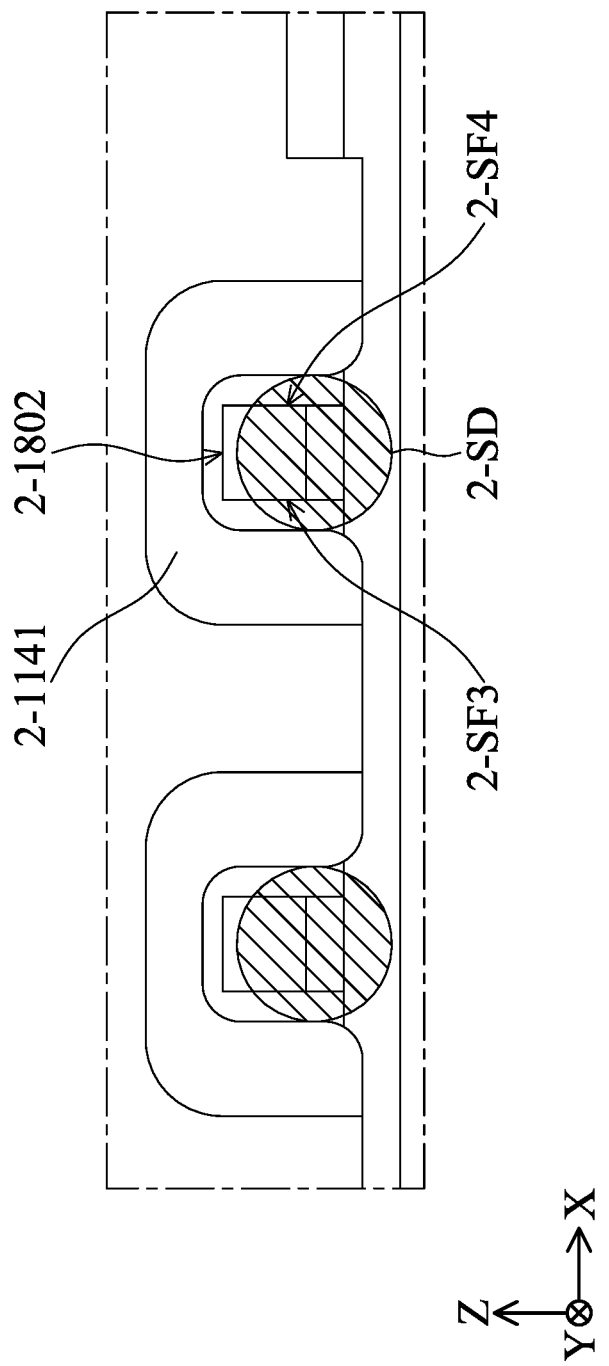
FIG. 27 is a partial structural diagram of the optical element driving mechanism 2-100 according to an embodiment of the present disclosure.

Please refer to FIG. 27, which is a partial structural diagram of the optical element driving mechanism 2-100 according to an embodiment of the present disclosure. When viewed along a direction (such as the Y-axis) perpendicular to the main axis 2-AX, the straight portion 2-1802 further has a third surface 2-SF3 and a fourth surface 2-SF4, and both the third surface 2-SF3 and the fourth surface 2-SF4 are parallel to the main axis 2-AX (the Z-axis). The electrical connection portion 2-1141 may have a U-shaped structure, and the third surface 2-SF3 and the fourth surface 2-SF4 both correspond to the electrical connection portion 2-1141.

Figure 28:
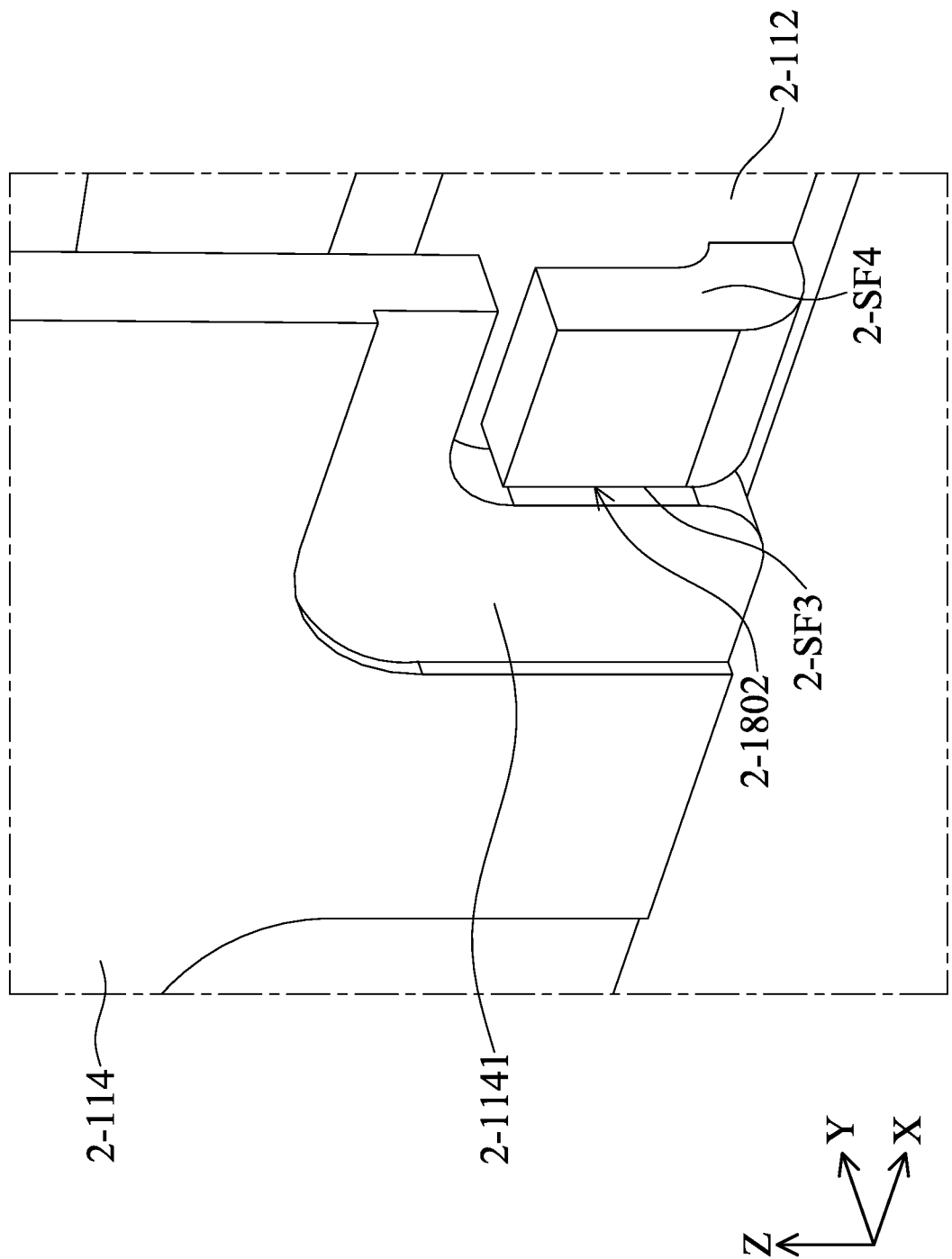
FIG. 28 is a partial structural diagram of the optical element driving mechanism 2-100 according to an embodiment of the present disclosure.

Please refer to FIG. 28, which is a partial structural diagram of the optical element driving mechanism 2-100 according to an embodiment of the present disclosure. In this embodiment, when viewed in a direction perpendicular to the main axis 2-AX (for example, the Y-axis), the electrical connection portion 2-1141 may have an L-shape structure, and only one of the third surface 2-SF3 or the fourth surface 2-SF4 corresponds to the electrical connection portion 2-1141.

Figure 29:
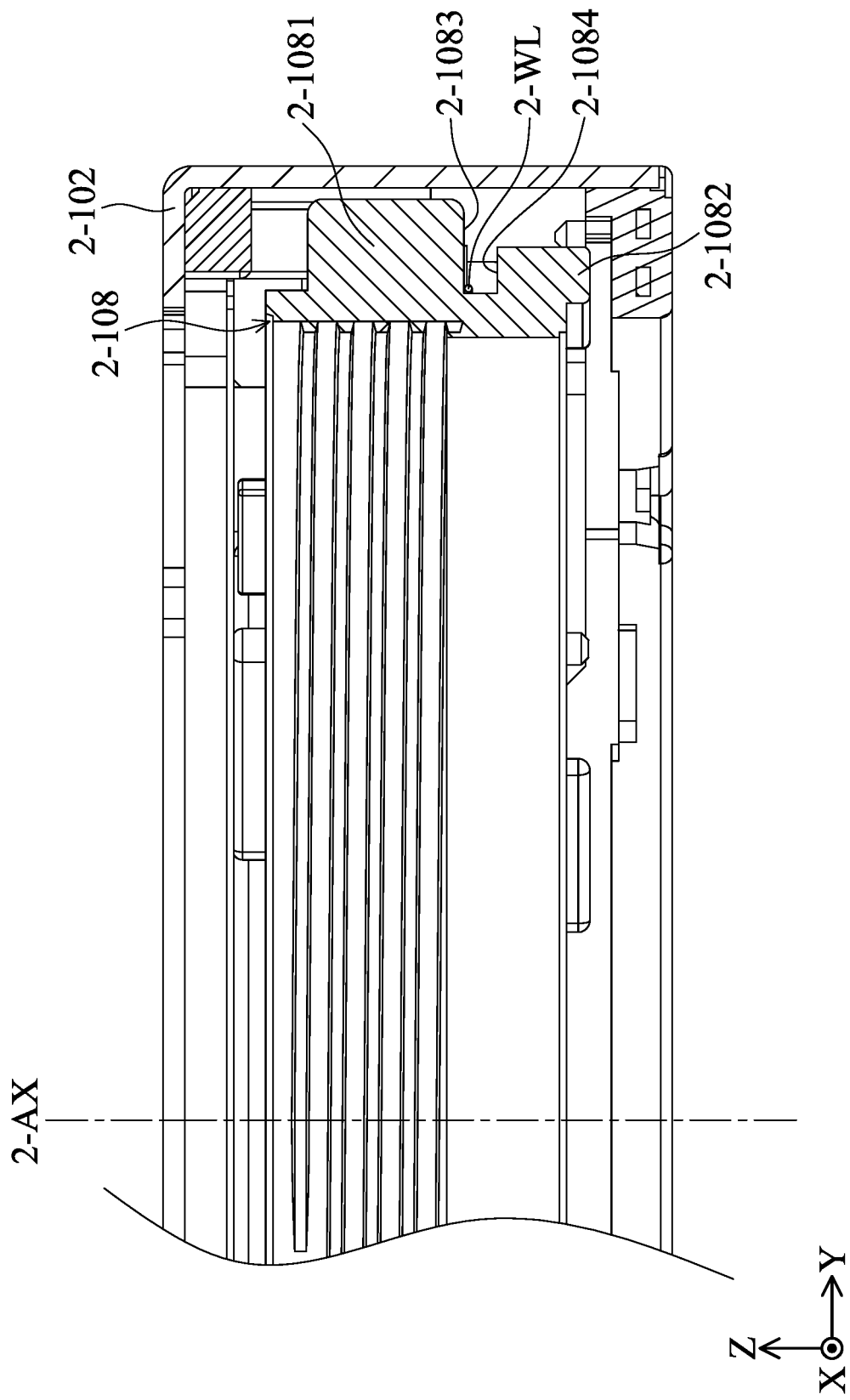
FIG. 29 is a cross-sectional view of the optical element driving mechanism 2-100 along the line 2-B-2-B' in FIG. 22 according to an embodiment of the present disclosure.

Please refer to FIG. 29, which is a cross-sectional view of the optical element driving mechanism 2-100 along the line 2-B-2-B' in FIG. 22 according to an embodiment of the present disclosure. In this embodiment, the lens holder 2-108 has a first convex portion 2-1081 and a second convex portion 2-1082, the first convex portion 2-1081 extends in a direction perpendicular to the main axis 2-AX (such as the Y-axis), the second convex portion 2-1082 extends along the main axis 2-AX, and a first convex surface 2-1083 of the first convex portion 2-1081 faces a second convex surface 2-1084 of the second convex portion 2-1082.

In addition, the first coil 2-CL11 (or the second coil 2-CL12) is formed by a wire 2-WL, and at least a part of the wire 2-WL is disposed between the first convex surface 2-1083 and the second convex surface 2-1084.

Figure 30:
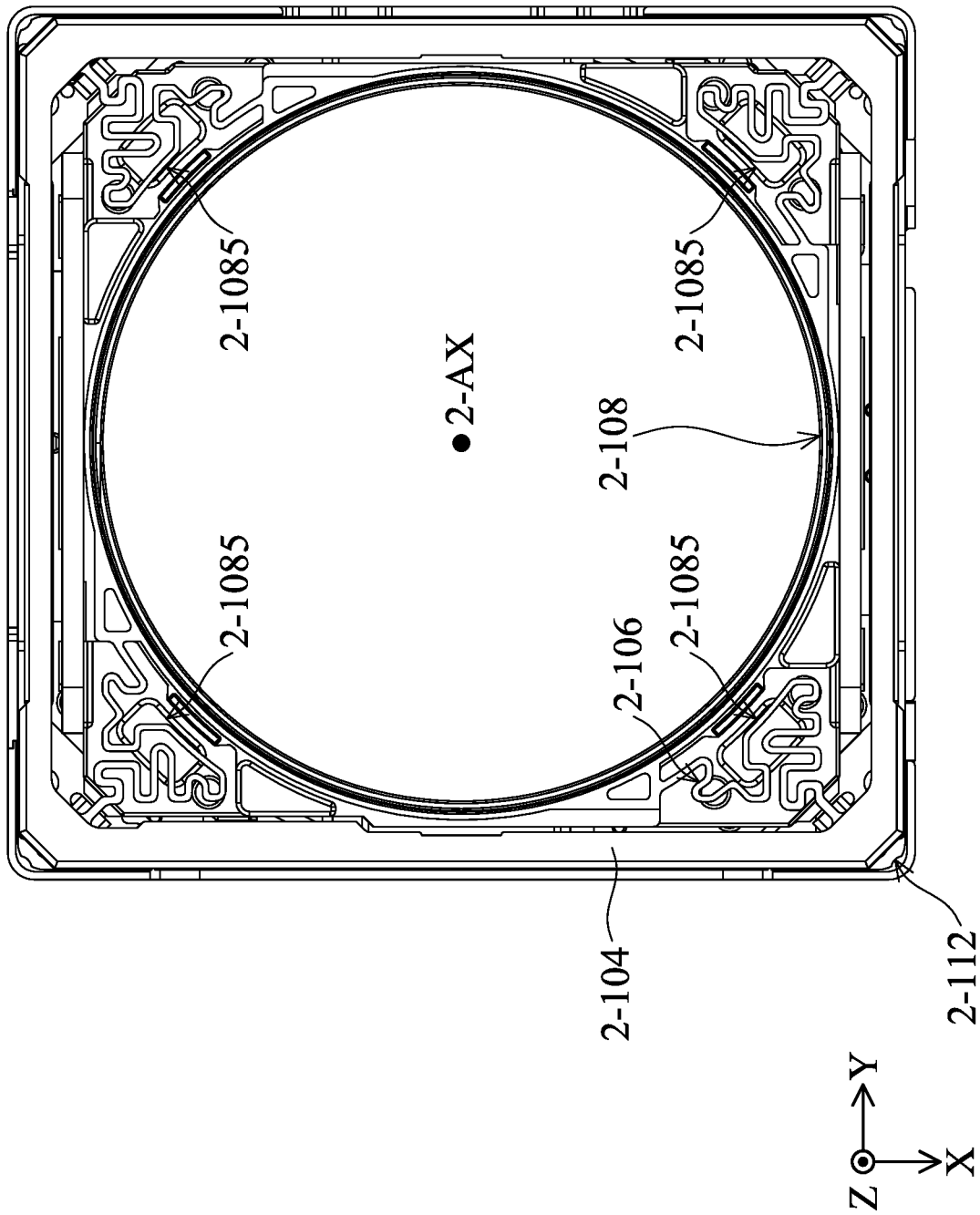
FIG. 30 is a top view of the optical element driving mechanism 2-100 after removing the casing 2-102 according to an embodiment of the present disclosure.

Please refer to FIG. 30, which is a top view of the optical element driving mechanism 2-100 after removing the casing 2-102 according to an embodiment of the present disclosure. In this embodiment, the lens holder 2-108 may include a plurality of recesses 2-1085 formed facing the base 2-112, and when viewed along the main axis 2-AX, the first elastic element 2-106 partially overlaps the recesses 2-1085. Based on the configuration of the recesses 2-1085, the weight of the optical element driving mechanism 2-100 can be further reduced.

Figure 31:
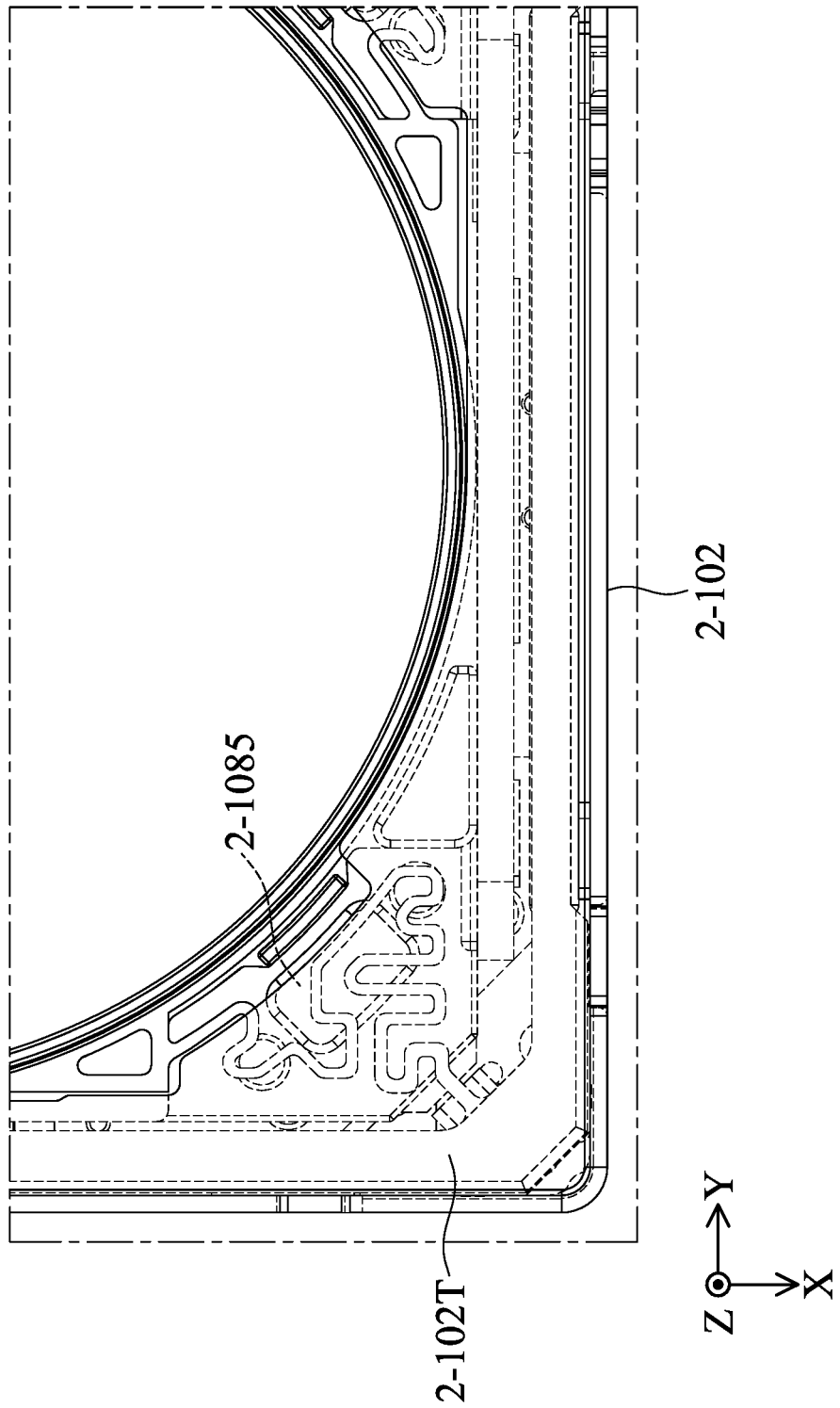
FIG. 31 is a top view of a partial structure of the optical element driving mechanism 2-100 according to an embodiment of the present disclosure.

Please refer to FIG. 31, which is a top view of a partial structure of the optical element driving mechanism 2-100 according to an embodiment of the present disclosure. In this embodiment, the casing 2-102 has a top wall 2-102T that is perpendicular to the main axis 2-AX, and when viewed along the main axis 2-AX, the top wall 2-102T completely overlaps the recess 2-1085.

The present disclosure provides an optical element driving mechanism 2-100 having a circuit assembly 2-114 and the circuit member 2-180, and the circuit member 2-180 has a plurality of electrical connection terminals 2-1801, corresponding to the plurality of electrical connection portions 2-1141 of the circuit assembly 2-114. The electrical connection terminal 2-1801 protrudes from the base 2-112. The electrical connection terminal 2-1801 may include a straight portion 2-1802 and a bent portion 2-1803, and the straight portion 2-1802 extends in the optical axis 2-O from the bent portion 2-1803.

Furthermore, the electrical connection terminal 2-1801 is electrically connected to the electrical connection portion 2-1141 by the solder 2-SD. Based on the design of the circuit member 2-180 of the present disclosure, the contact area between the solder 2-SD and the electrical connection terminal 2-1801 can be increased, thereby increasing the structural strength between the circuit member 2-180 and circuit assembly 2-114.

The Third Embodiment Group.

Figure 32:
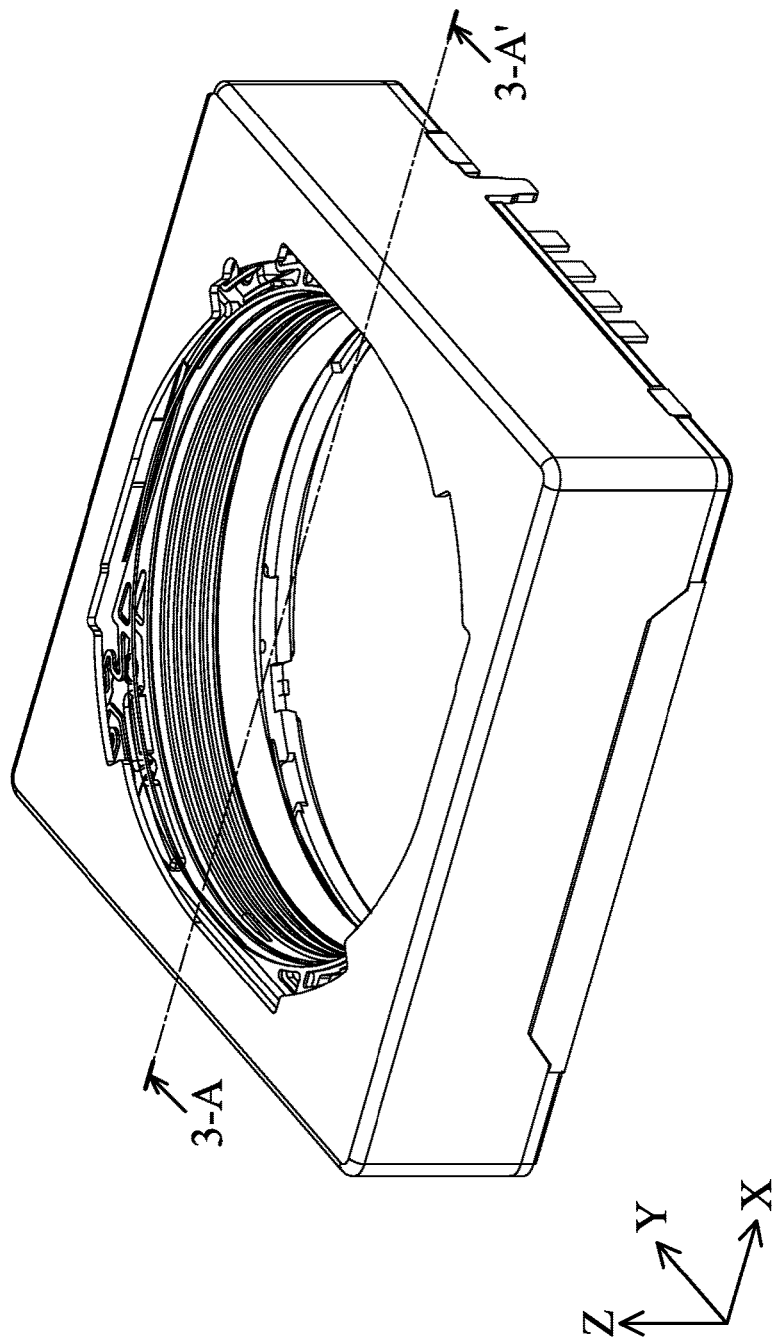
FIG. 32 is a schematic diagram of an optical element driving mechanism 3-100 according to an embodiment of the present disclosure.
Figure 33:
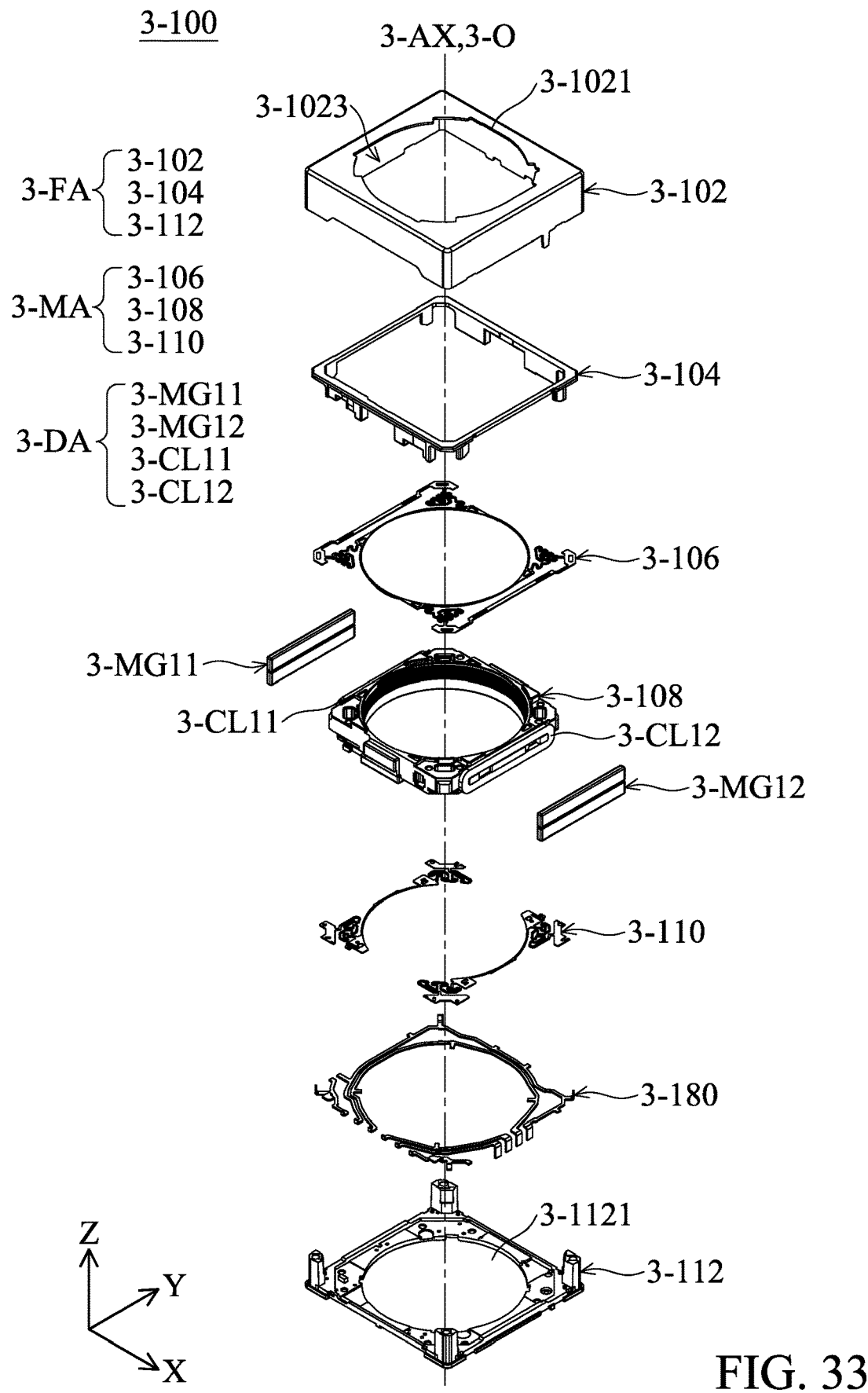
FIG. 33 is an exploded diagram of the optical element driving mechanism 3-100 according to an embodiment of the present disclosure.
Figure 34:
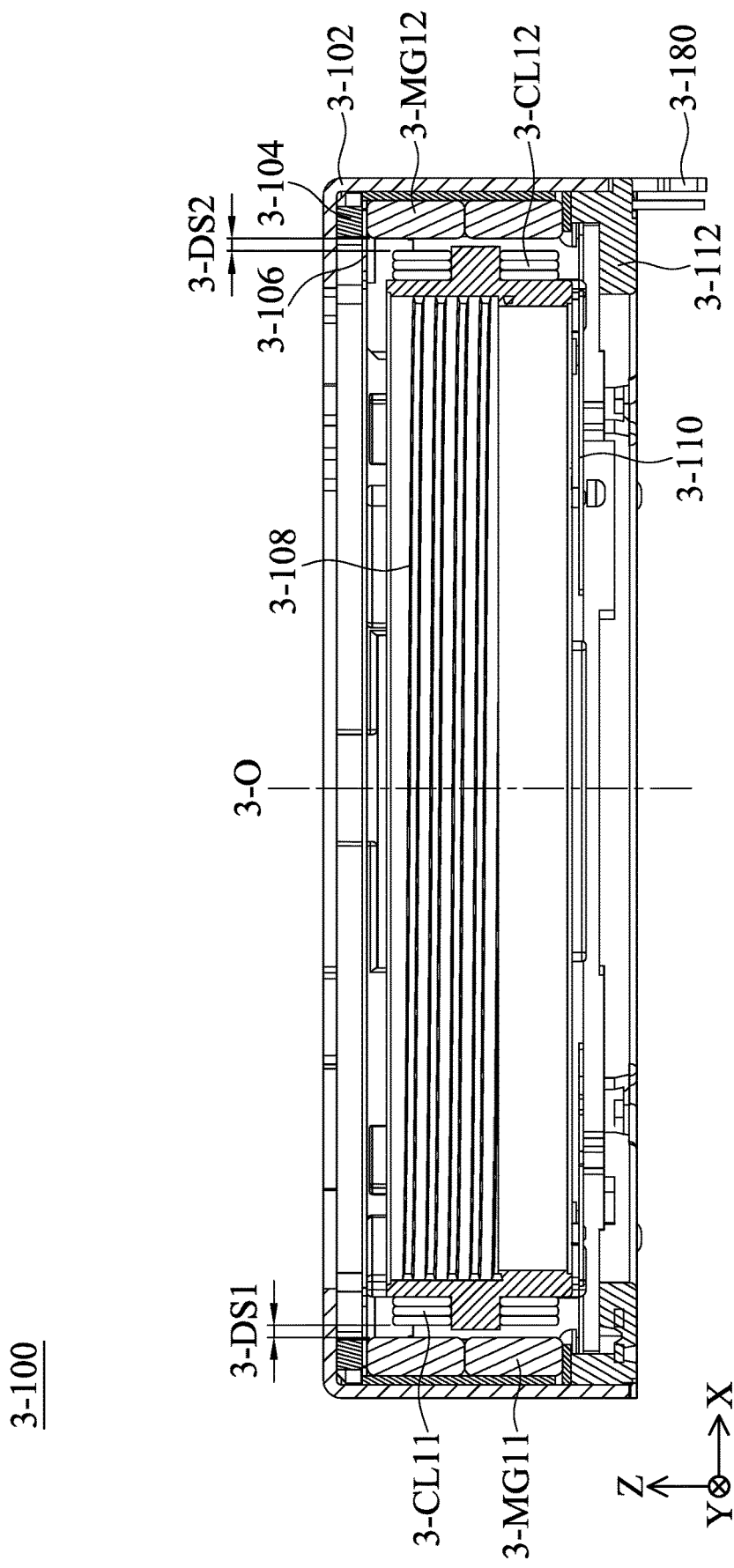
FIG. 34 is a cross-sectional view of the optical element driving mechanism 3-100 along line 3-A-3-A' in FIG. 34 according to an embodiment of the present disclosure.

Please refer to FIG. 32 to FIG. 34. FIG. 32 is a schematic diagram of an optical element driving mechanism 3-100 according to an embodiment of the present disclosure. FIG. 33 is an exploded diagram of the optical element driving mechanism 3-100 according to an embodiment of the present disclosure, and FIG. 34 is a cross-sectional view of the optical element driving mechanism 3-100 along line 3-A-3-A' in FIG. 34 according to an embodiment of the present disclosure. The optical element driving mechanism 3-100 can be an optical camera module configured to hold an optical element. The optical element driving mechanism 3-100 can be installed in various electronic devices or portable electronic devices, such as a smartphone, for allowing a user to perform the image capturing function. In this embodiment, the optical element driving mechanism 3-100 can be a voice coil motor (VCM) with an auto-focusing (AF) function, but it is not limited thereto. In other embodiments, the optical element driving mechanism 3-100 can also perform the functions of auto-focusing and optical image stabilization (OIS).

In the present embodiment, the optical element driving mechanism 3-100 can include a fixed assembly 3-FA, a movable assembly 3-MA, and a driving assembly 3-DA. The movable assembly 3-MA is movably connected to the fixed assembly 3-FA, and the movable assembly 3-MA is configured to hold the optical element (not shown in the figures). The driving assembly 3-DA is configured to drive the movable assembly 3-MA to move relative to the fixed assembly 3-FA.

In this embodiment, as shown in FIG. 33, the fixed assembly 3-FA includes a casing 3-102, a frame 3-104 and a base 3-112. The movable assembly 3-MA includes a lens holder 3-108 and the aforementioned optical element, and the lens holder 3-108 is used for holding the optical element. A main axis 3-AX can be defined by the fixed assembly 3-FA, and an optical axis 3-O can be defined by the optical element. The main axis 3-AX may, for example, overlap the optical axis 3-O, but it is not limited thereto.

As shown in FIG. 33, the casing 3-102 has a hollow structure, and a casing opening 3-1021 is formed thereon, and a base opening 3-1121 is formed on the base 3-112. The center of the casing opening 3-1021 corresponds to the optical axis 3-O of the optical element, and the base opening 3-1121 corresponds to a photosensitive element (not shown) disposed under the base 3-112. The external light can enter the casing 3-102 from the casing opening 3-1021 to be received by the photosensitive element after passing through the optical element and the base opening 3-1121 so as to generate a digital image signal.

Furthermore, the casing 3-102 is disposed on the base 3-112 and may have an accommodating space 3-1023 for accommodating the movable assembly 3-MA (including the aforementioned optical element and the lens holder 3-108) and the driving assembly 3-DA. The frame 3-104 is fixed to the casing 3-102 and disposed in the accommodating space 3-1023.

The movable assembly 3-MA may further include a first elastic member 3-106 and a second elastic member 3-110. The outer portion (the outer ring portion) of the first elastic member 3-106 is fixed to the frame 3-104, the outer portion (the outer ring portion) of the second elastic member 3-110 is fixed to the base 3-112, and the inner portions (the inner ring portions) of the first elastic member 3-106 and the second elastic member 3-110 are respectively connected to the upper and lower sides of the lens holder 3-108, so that the lens holder 3-108 can be suspended in the accommodating space 3-1023.

In this embodiment, the driving assembly 3-DA may include a first magnet 3-MG11, a second magnet 3-MG12, a first coil 3-CL11, and a second coil 3-CL12. The first coil 3-CL11 and the second coil 3-CL12 are disposed on the lens holder 3-108, and the first magnet 3-MG11 and the second magnet 3-MG12 are disposed on the inner wall surface of the casing 3-102 respectively corresponding to the first coil 3-CL11 and the second coil 3-CL12.

In this embodiment, the first coil 3-CL11 and the second coil 3-CL12 may be wound coils (oval coils) and be disposed on opposite sides of the lens holder 3-108. When the first coil 3-CL11 and the second coil 3-CL12 are provided with electricity, the first coil 3-CL11 and the second coil 3-CL12 respectively act with the first magnet 3-MG11 and the second magnet 3-MG12 to generate an electromagnetic force, so as to drive the lens holder 3-108 and the held optical element to move relative to the base 3-112 along the optical axis 3-O (the Z-axis).

Furthermore, the optical element driving mechanism 3-100 of the present disclosure further includes a circuit member 3-180 configured to be electrically connected to the driving assembly 3-DA. In this embodiment, the circuit member 3-180 is disposed inside the base 3-112. For example, the base 3-112 is made of plastic material, and the circuit member 3-180 is formed in the base 3-112 by the molded interconnect device (MID) technology.

As shown in FIG. 34, in this embodiment, the first coil 3-CL11 and the second coil 3-CL12 are disposed on the lens holder 3-108 of the movable assembly 3-MA, and the first magnet 3-MG11 (the first magnetic element) and the second magnet 3-MG12 (the second magnetic element) are disposed on the inner wall surface of the casing 3-102 of the fixed assembly 3-FA. However, in other embodiments, the positions of the aforementioned coils and magnets may be interchangeable.

Furthermore, it is worth noting that, as shown in FIG. 34, a shortest distance 3-DS1 between the first coil 3-CL11 and the first magnet 3-MG11 and a shortest distance 3-DS2 between the second coil 3-CL12 and the second magnets 3-MG12 are the same.

Figure 35:
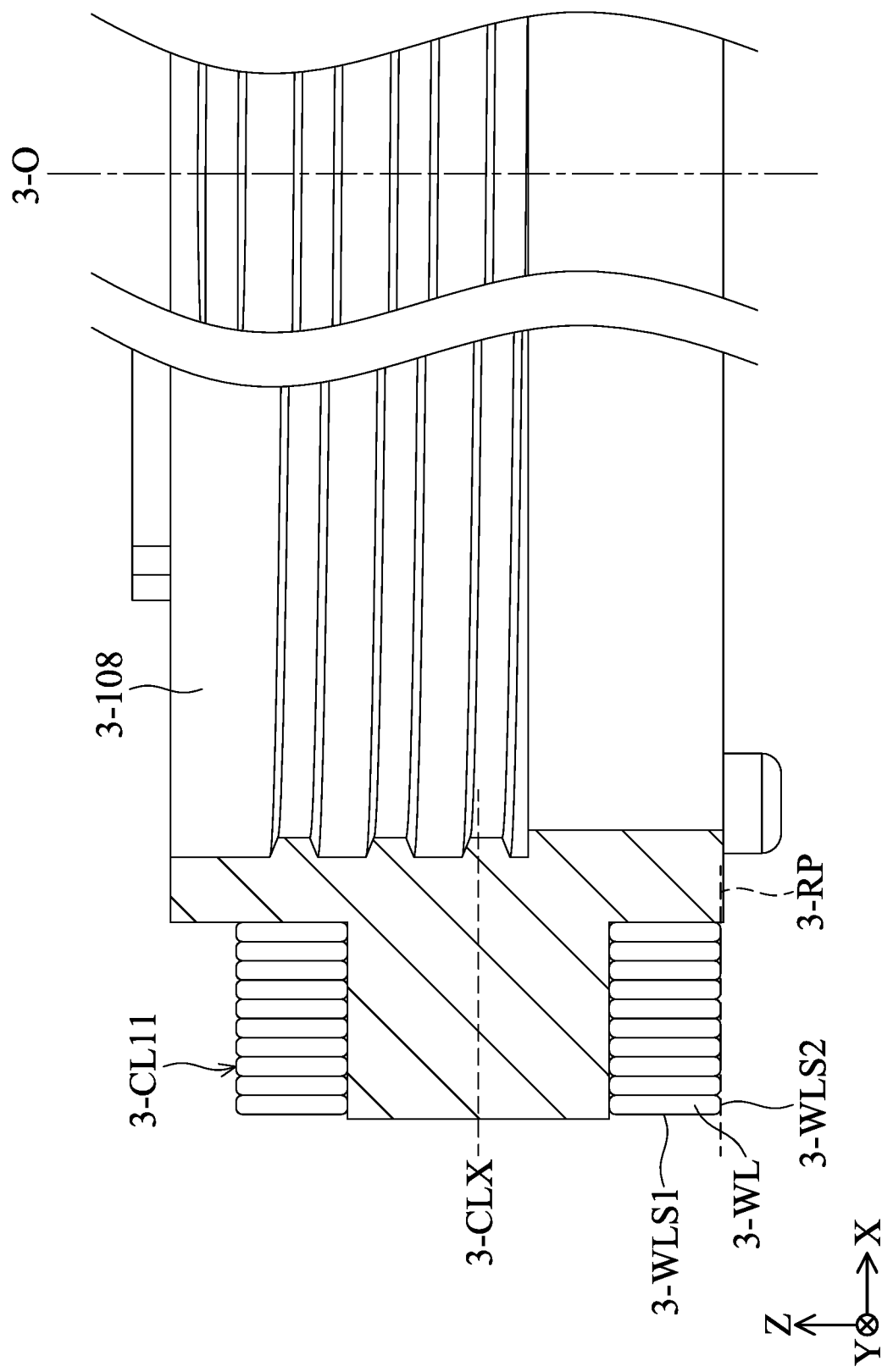
FIG. 35 is a cross-sectional view of the lens holder 3-108 and the first coil 3-CL11 according to an embodiment of the present disclosure.

Please refer to FIG. 35, which is a cross-sectional view of the lens holder 3-108 and the first coil 3-CL11 according to an embodiment of the present disclosure. As shown in FIG. 35, the first coil 3-CL11 is wound by a wire 3-WL. The wire 3-WL has a rectangular structure, and the rectangular structure has two first sides 3-WLS1 and two second sides 3-WLS2. In addition, the extending direction of the first side 3-WLS1 is different from the extending direction of the second side 3-WLS2. Specifically, the first side 3-WLS1 extends along the Z-axis, and the second side 3-WLS2 extends along the X-axis.

The length of the first side 3-WLS1 is different from the length of the second side 3-WLS2. Specifically, the length of the first side 3-WLS1 is greater than the length of the second side 3-WLS2. In addition, a winding axis 3-CLX of the first coil 3-CL11 is not parallel to the optical axis 3-O. For example, the winding axis 3-CLX may be perpendicular to the optical axis 3-O.

Furthermore, the first coil 3-CL11 has a plurality of turns, the adjacent first sides 3-WLS1 of the turn are close to each other, and the second side 3-WLS2 of each turn is located on a plane 3-RP. Specifically, those turns are aligned with each other.

It should be noted that only the configuration of the first coil 3-CL11 is shown in FIG. 35, and the configuration of the second coil 3-CL12 may also be the same as that of the first coil 3-CL11.

Figure 36:
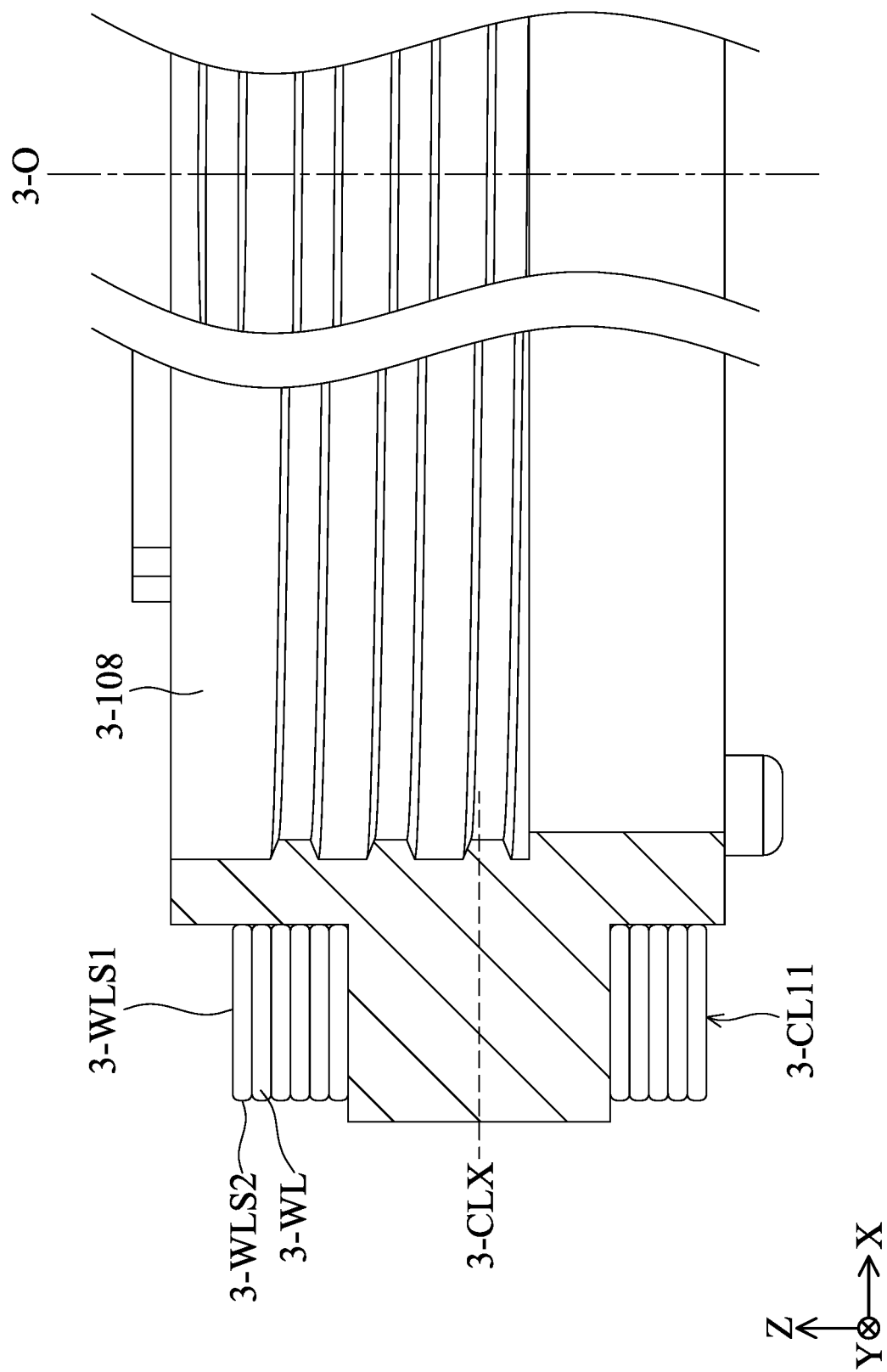
FIG. 36 is a cross-sectional view of the lens holder 3-108 and the first coil 3-CL11 according to another embodiment of the present disclosure.

Please refer to FIG. 36, which is a cross-sectional view of the lens holder 3-108 and the first coil 3-CL11 according to another embodiment of the present disclosure. In this embodiment, the winding axis 3-CLX of the first coil 3-CL11 is perpendicular to the optical axis 3-O, and the wire 3-WL of the first coil 3-CL11 is stacked along the Z-axis. That is, the adjacent first sides 3-WLS1 of each turn are close to each other and are arranged in a stack along the Z-axis.

Figure 37:
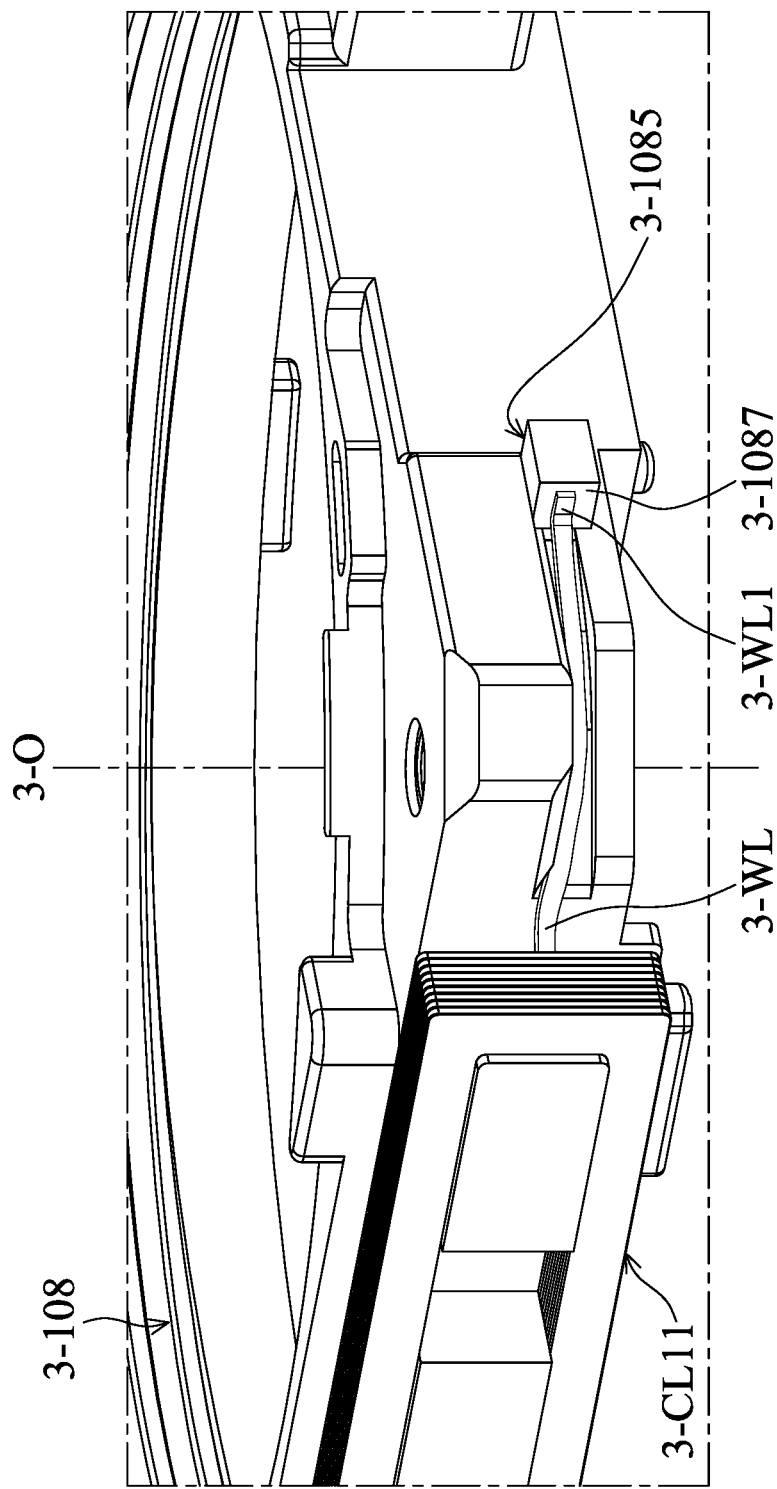
FIG. 37 is a partial structural diagram of the lens holder 3-108 and the first coil 3-CL11 according to another embodiment of the present disclosure.

Please refer to FIG. 37, which is a partial structural diagram of the lens holder 3-108 and the first coil 3-CL11 according to another embodiment of the present disclosure. As shown in FIG. 37, the wire 3-WL of the first coil 3-CL11 has a leading end 3-WL1, the lens holder 3-108 has a fixing element 3-1085, and the fixing element 3-1085 has a contact surface 3-1087. The leading end 3-WL1 is configured to be fixedly connected to the contact surface 3-1087 (for example, by glue), and the contact surface 3-1087 is parallel to the optical axis 3-O.

Figure 38:
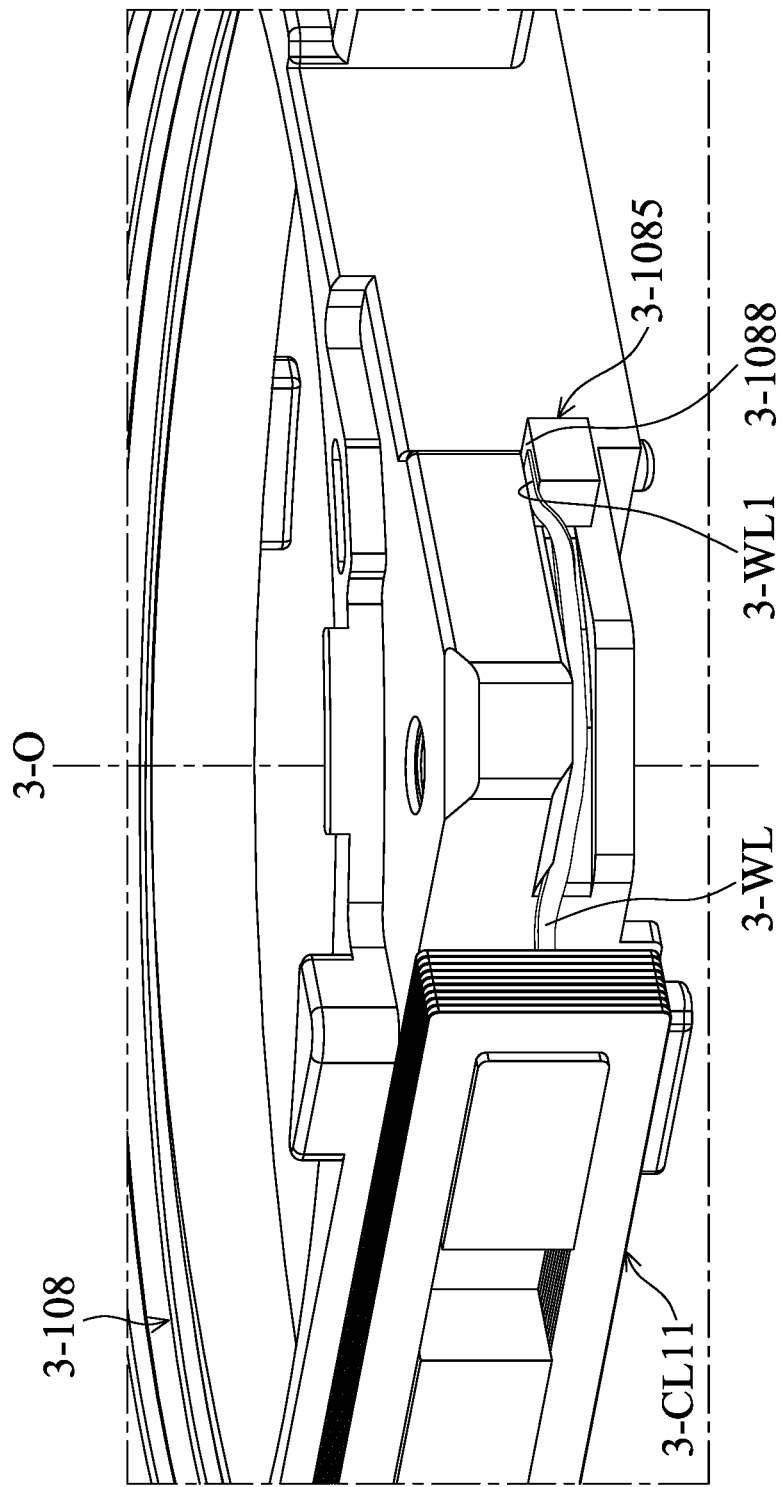
FIG. 38 is a partial structural diagram of the lens holder 3-108 and the first coil 3-CL11 according to another embodiment of the present disclosure.

Please refer to FIG. 38, which is a partial structural diagram of the lens holder 3-108 and the first coil 3-CL11 according to another embodiment of the present disclosure. Similar to the previous embodiment, the lens holder 3-108 has the fixing element 3-1085, the fixing element 3-1085 has another contact surface 3-1088, the leading end 3-WL1 is configured to be connected to the contact surface 3-1088, and the contact surface 3-1088 is perpendicular to the optical axis 3-O.

Figure 39:
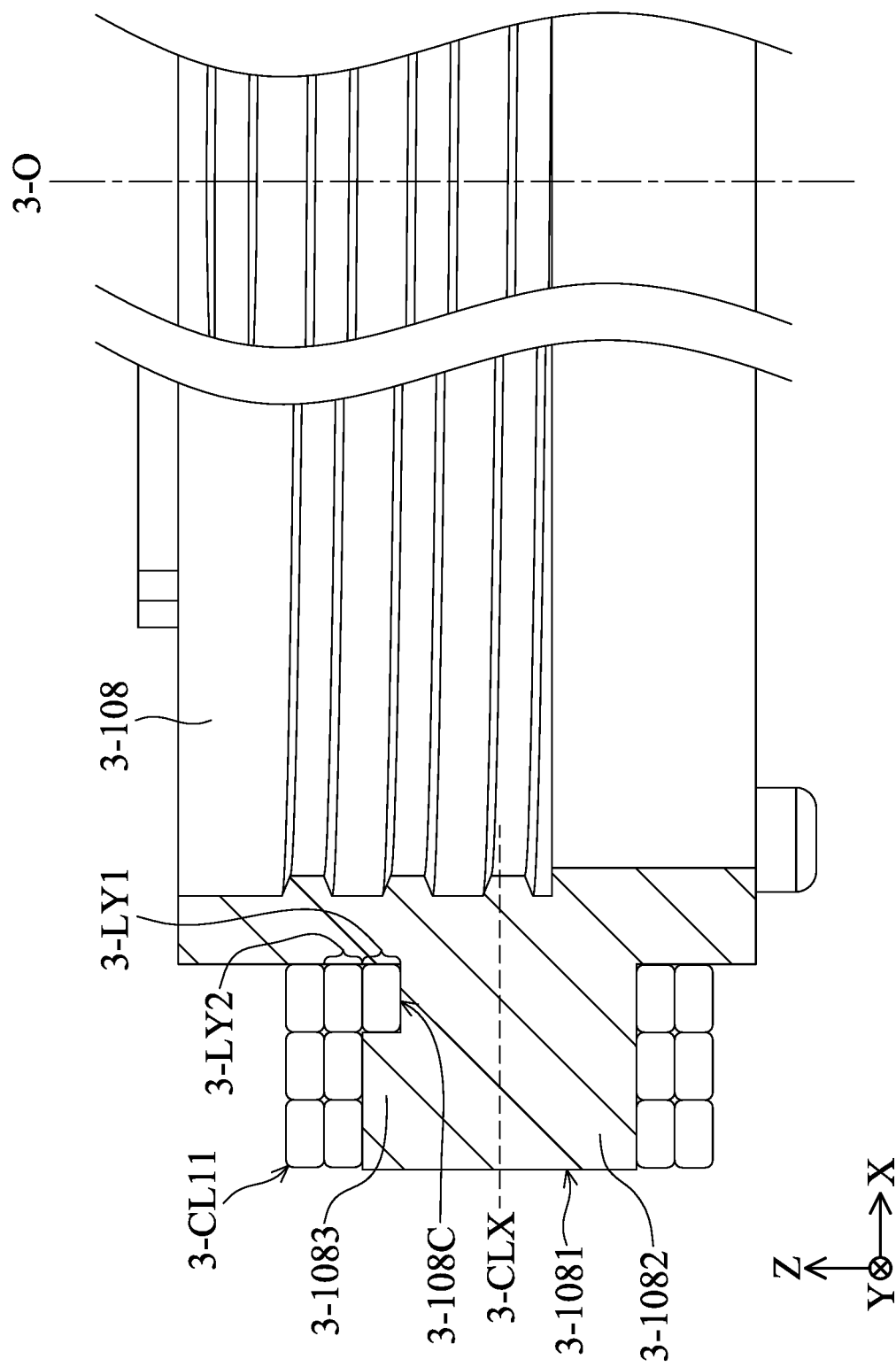
FIG. 39 is a cross-sectional view of the lens holder 3-108 and the first coil 3-CL11 according to another embodiment of the present disclosure.

Please refer to FIG. 39, which is a cross-sectional view of the lens holder 3-108 and the first coil 3-CL11 according to another embodiment of the present disclosure. As shown in FIG. 39, at least one positioning assembly 3-1081 can be disposed on the lens holder 3-108, and the first coil 3-CL11 is affixed to the positioning assembly 3-108. In this embodiment, the positioning assembly 3-1081 includes a first projection 3-1082, which extends along the winding axis 3-CLX. The positioning assembly 3-1081 may further include a second projection 3-1083, extending in a direction that is not parallel to the winding axis 3-CLX, for example, along the Z-axis. Specifically, the second projection 3-1083 protrudes from the first projection 3-1082.

The positioning assembly 3-1081 further has a groove 3-108C formed by the first projection 3-1082 and the second projection 3-1083. A part of the first coil 3-CL11 is located in the groove 3-108C. The first coil 3-CL11 further includes a first layer 3-LY1 and a second layer 3-LY2. The first layer 3-LY1 is closer to the winding axis 3-CLX than the second layer 3-LY2, and the first layer 3-LY1 is located in the groove 3-108C. Based on the structural configuration of this embodiment, the first coil 3-CL11 can be more accurately positioned on the positioning assembly 3-1081.

Figure 40:
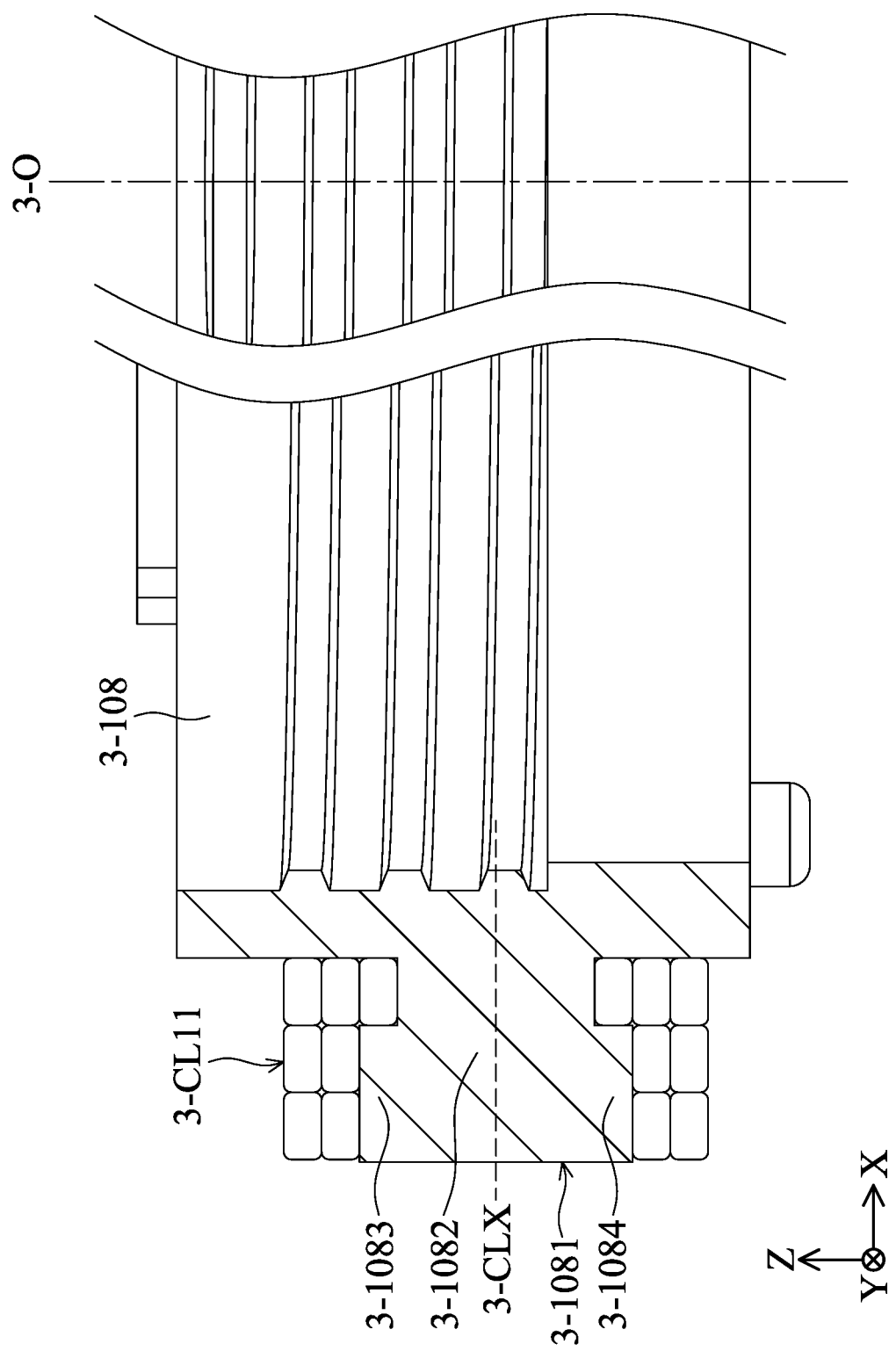
FIG. 40 is a cross-sectional view of the lens holder 3-108 and the first coil 3-CL11 according to another embodiment of the present disclosure.

Please refer to FIG. 40, which is a cross-sectional view of the lens holder 3-108 and the first coil 3-CL11 according to another embodiment of the present disclosure. This embodiment is similar to the previous embodiment. In this embodiment, the positioning assembly 3-1081 may further include a third projection 3-1084, extending in a direction that is not parallel to the winding axis 3-CLX, and the first projection 3-1082 and the third projection 3-1084 project out in different directions. In addition, the second projection 3-1083 is symmetrical to the third projection 3-1084. Based on the structural configuration of this embodiment, the first coil 3-CL11 can be positioned on the positioning assembly 3-1081 more stably.

Figure 41:
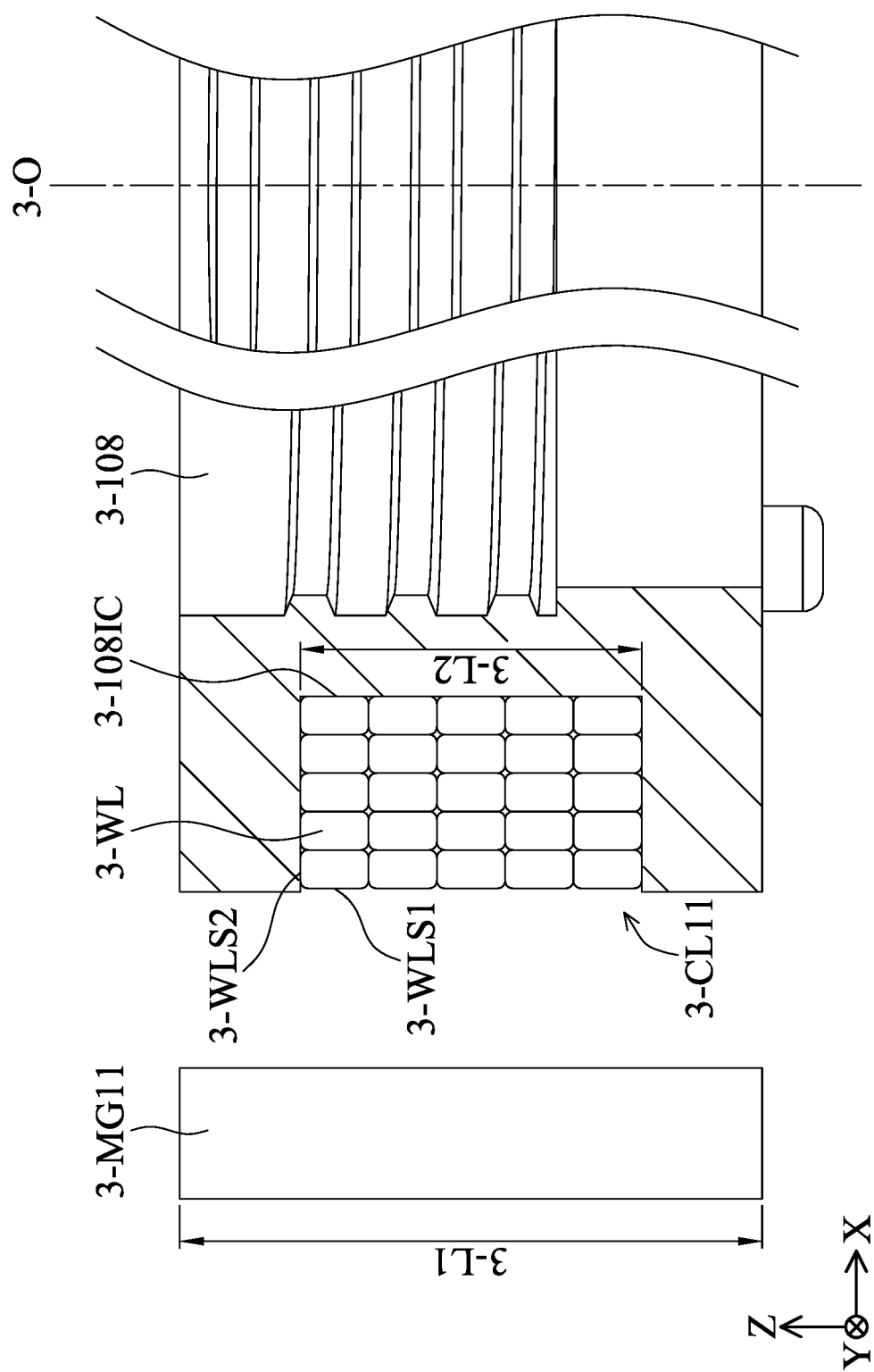
FIG. 41 is a cross-sectional view of the lens holder 3-108, the first coil 3-CL11, and the first magnet 3-MG11 according to another embodiment of the present disclosure.

Please refer to FIG. 41, which is a cross-sectional view of the lens holder 3-108, the first coil 3-CL11, and the first magnet 3-MG11 according to another embodiment of the present disclosure. The lens holder 3-108 may further include an inner groove 3-1081C, the first coil 3-CL11 is disposed in the inner groove 3-108IC, and the total cross-sectional area of the first coil 3-CL11 is at least 90% of the cross-sectional area of the inner groove 3-1081C. It is worth noting that in other embodiments, the inner groove 3-1081C and the first coil 3-CL11 may also be disposed at the fixed assembly 3-FA.

Similar to the previous embodiment, the first coil 3-CL11 is wound by the wire 3-WL. The wire 3-WL has a rectangular structure, the rectangular structure has two first sides 3-WLS1 and two second sides 3-WLS2, and the extending direction of the first side 3-WLS1 is different from the extending direction of the second side 3-WLS2. Furthermore, the first coil 3-CL11 has a plurality of turns, the first sides 3-WLS1 of the turns are close to each other, and the second sides 3-WLS2 of the turns are close to each other.

In this embodiment, the length of the first side 3-WLS1 is greater than the length of the second side 3-WLS2, and the first side 3-WLS1 of the outermost wire 3-WL faces the first magnet 3-MG11 (the first magnetic element). The first magnet 3-MG11 has a first length 3-L1, the first coil 3-CL11 has a second length 3-L2, the first length 3-L1 and the second length 3-L2 extend in the same direction (for example, in the optical axis 3-O), and the first length 3-L1 is greater than the second length 3-L2.

Based on the structural configuration of this embodiment, the size of the optical element driving mechanism 3-100 on the XY plane can be further reduced, thereby achieving the purpose of miniaturization.

Figure 42:
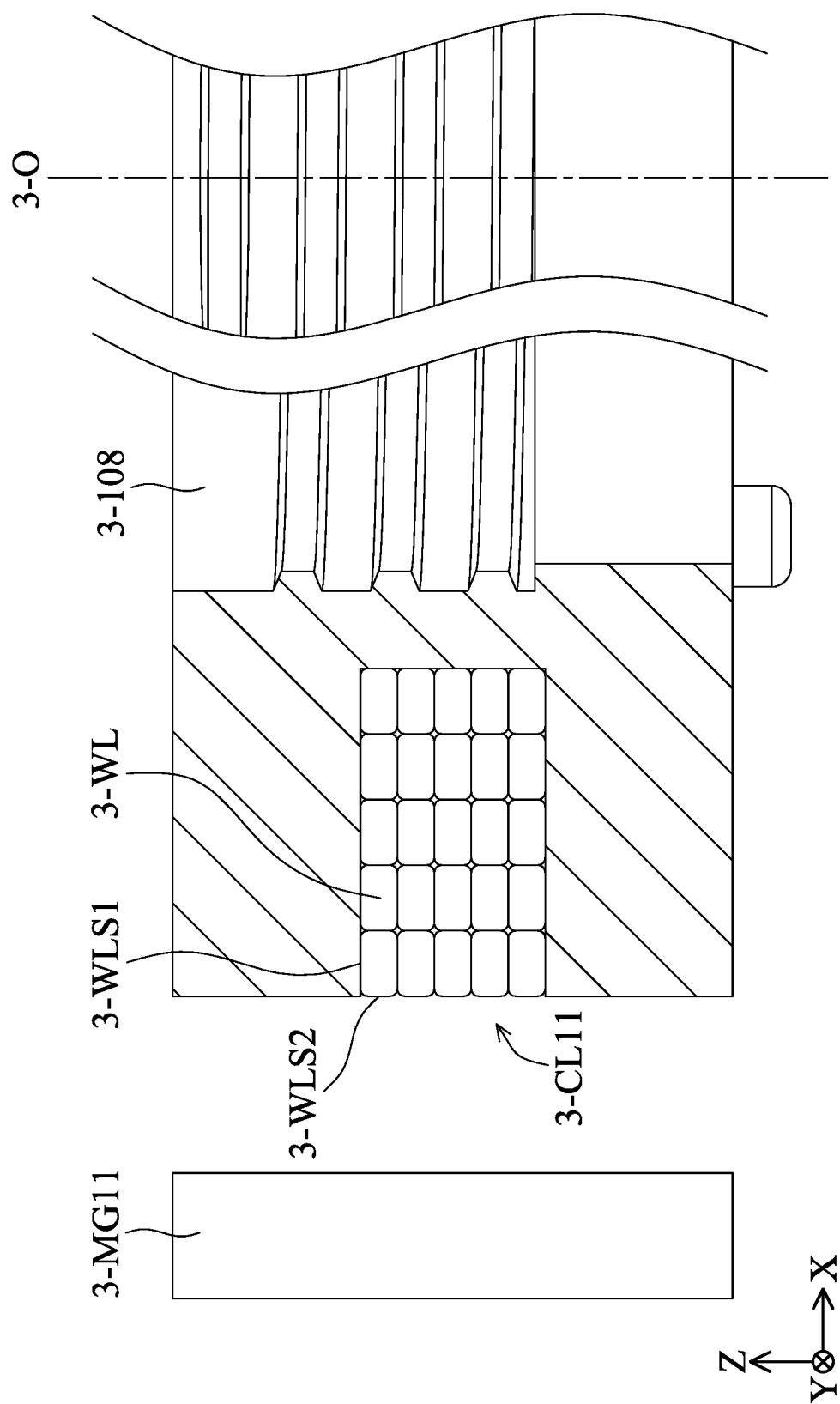
FIG. 42 is a schematic cross-sectional view of the lens holder 3-108, the first coil 3-CL11, and the first magnet 3-MG11 according to another embodiment of the present disclosure.

Please refer to FIG. 42, which is a schematic cross-sectional view of the lens holder 3-108, the first coil 3-CL11, and the first magnet 3-MG11 according to another embodiment of the present disclosure. This embodiment is similar to the previous embodiment. In this embodiment, the length of the first side 3-WLS1 of the wire 3-WL is greater than the length of the second side 3-WLS2, and the outermost second side 3-WLS2 faces the first magnet 3-MG11.

Based on the structural configuration of this embodiment, the height of the optical element driving mechanism 3-100 on the Z-axis can be further reduced, thereby achieving the purpose of miniaturization.

The present disclosure provides an optical element driving mechanism 3-100 having the lens holder 3-108, the first coil 3-CL11 and the second coil 3-CL12, and the first coil 3-CL11 and the second coil 3-CL12 are respectively disposed on the two positioning assemblies 3-1081 of the lens holder 3-108 by resistance welding or conductive glue, for example. The first coil 3-CL11 (and/or the second coil 3-CL12) may be a flat wire coil, and the cross section of the wire 3-WL of the first coil 3-CL11 may be rectangular.

Compared with a conventional round wire, the area occupied by the flat wire coil of the present disclosure can be reduced so that the size of the lens holder 3-108 can be reduced further to achieve the purpose of miniaturization. In addition, a flat wire coil achieves better driving efficiency than a round wire coil with the same number of turns.

The Fourth Embodiment Group.

Figure 43:
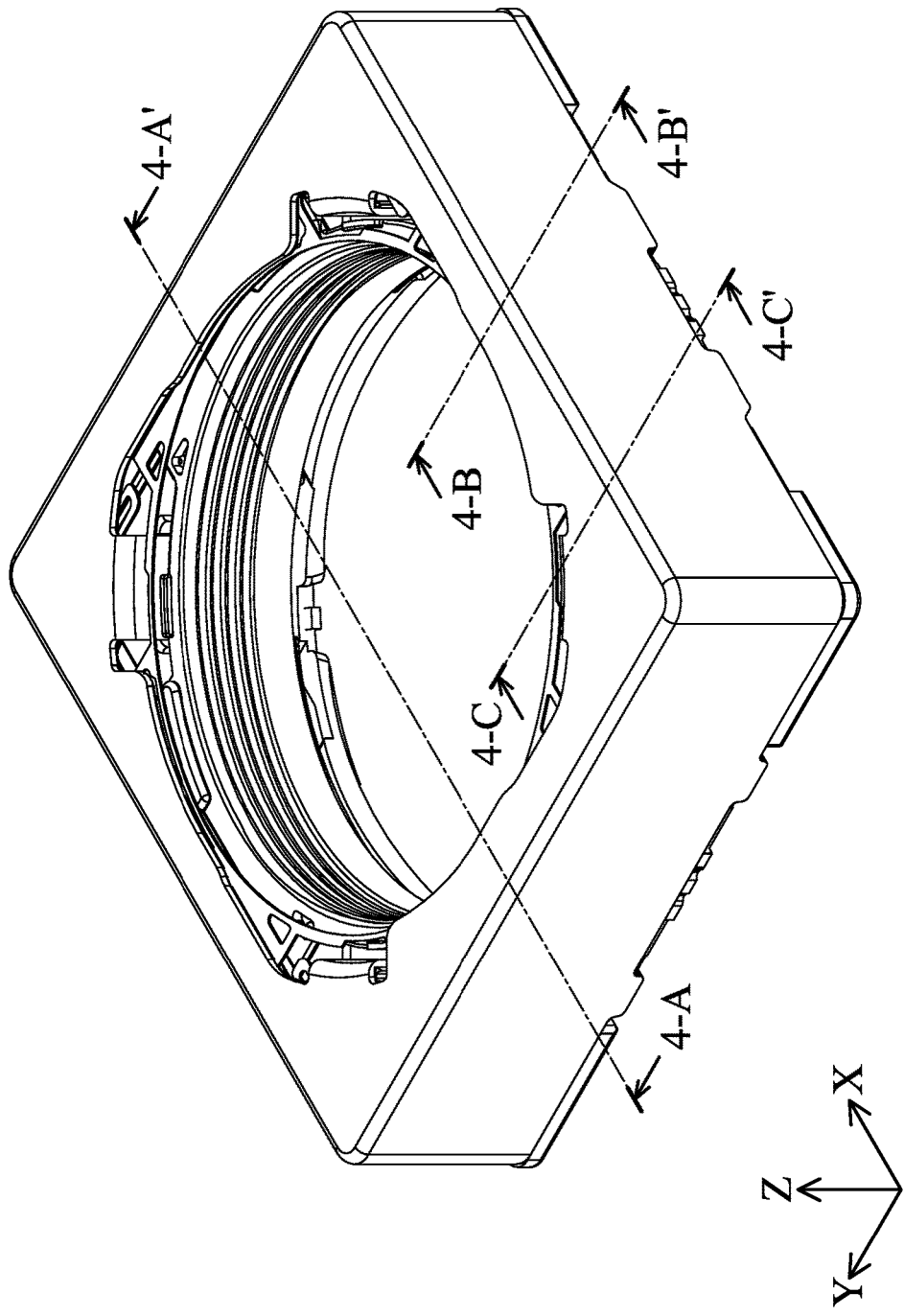
FIG. 43 is a schematic diagram of an optical element driving mechanism 4-100 according to an embodiment of the present disclosure.
Figure 44:
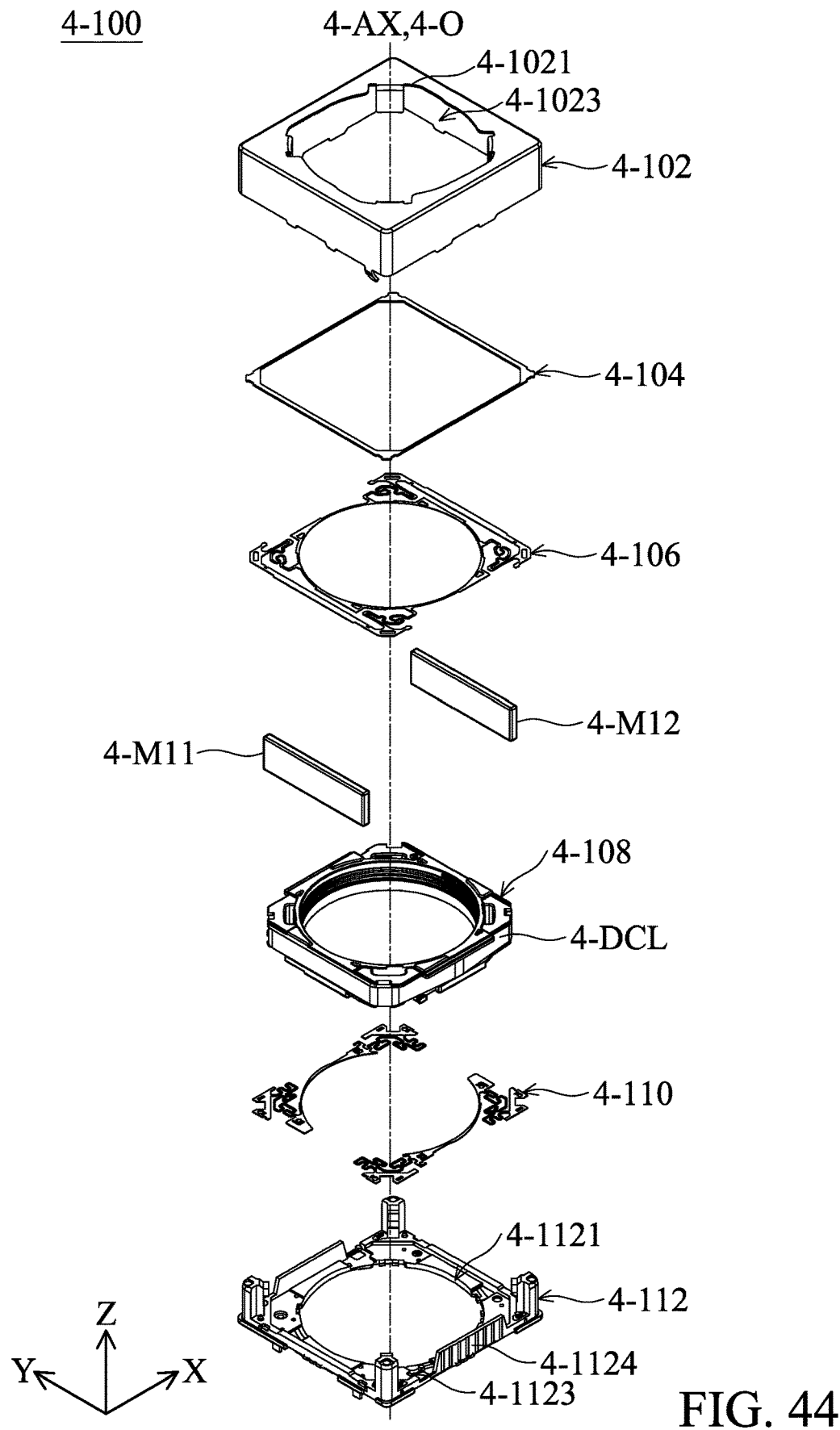
FIG. 44 is an exploded diagram of the optical element driving mechanism 4-100 according to an embodiment of the present disclosure.
Figure 45:
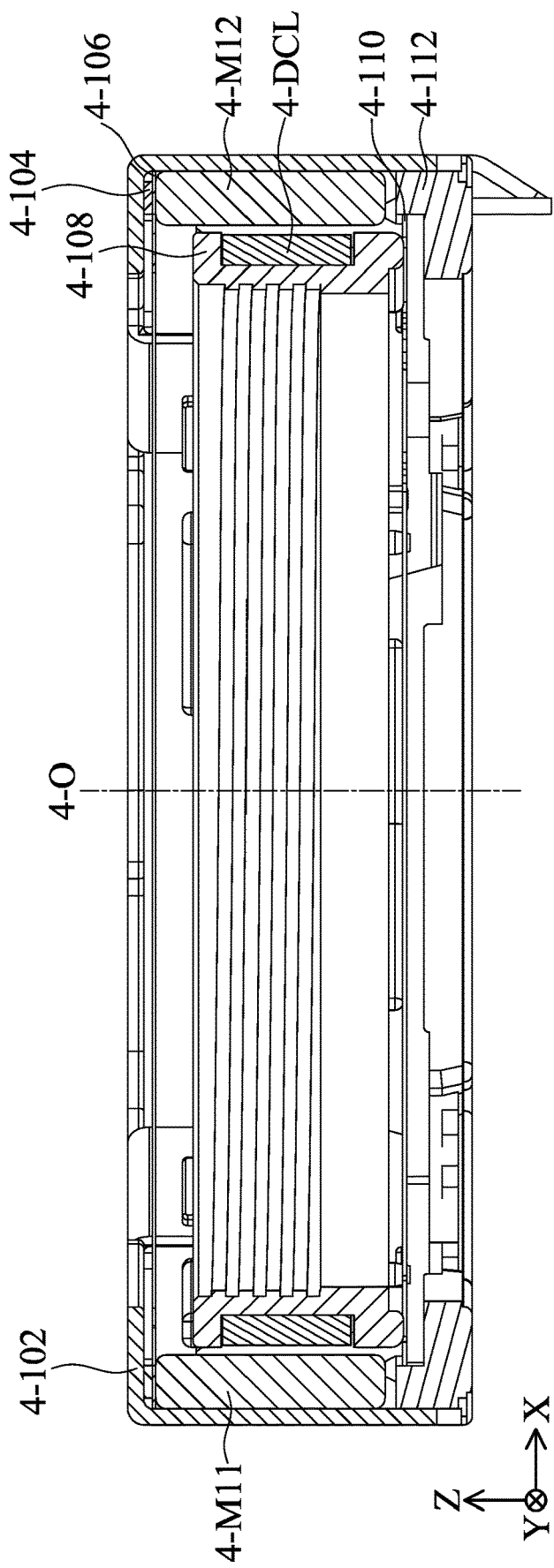
FIG. 45 is a cross-sectional view of the optical element driving mechanism 4-100 along line 4-A-4-A' in FIG. 45 according to an embodiment of the present disclosure.

Please refer to FIG. 43 to FIG. 45. FIG. 43 is a schematic diagram of an optical element driving mechanism 4-100 according to an embodiment of the present disclosure. FIG. 44 is an exploded diagram of the optical element driving mechanism 4-100 according to an embodiment of the present disclosure, and FIG. 45 is a cross-sectional view of the optical element driving mechanism 4-100 along line 4-A-4-A' in FIG. 45 according to an embodiment of the present disclosure. The optical element driving mechanism 4-100 can be an optical camera module configured to hold an optical element. The optical element driving mechanism 4-100 can be installed in various electronic devices or portable electronic devices, such as a smartphone, for allowing a user to perform the image capturing function. In this embodiment, the optical element driving mechanism 4-100 can be a voice coil motor (VCM) with an auto-focusing (AF) function, but it is not limited thereto. In other embodiments, the optical element driving mechanism 4-100 can also perform the functions of auto-focusing and optical image stabilization (OIS).

In the present embodiment, the optical element driving mechanism 4-100 can include a fixed assembly 4-FA, a movable assembly 4-MA, and a driving assembly 4-DA. The movable assembly 4-MA is movably connected to the fixed assembly 4-FA, and the movable assembly 4-MA is configured to hold the optical element (not shown in the figures). The driving assembly 4-DA is configured to drive the movable assembly 4-MA to move relative to the fixed assembly 4-FA.

In this embodiment, as shown in FIG. 44, the fixed assembly 4-FA includes a casing 4-102, a frame 4-104 and a base 4-112. The movable assembly 4-MA includes a lens holder 4-108 and the aforementioned optical element, and the lens holder 4-108 is configured to hold the optical element. A main axis 4-AX can be defined by the fixed assembly 4-FA, and an optical axis 4-O can be defined by the optical element. The main axis 4-AX may, for example, overlap the optical axis 4-O, but it is not limited thereto.

As shown in FIG. 44, the casing 4-102 has a hollow structure, and a casing opening 4-1021 is formed thereon, and a base opening 4-1121 is formed on the base 4-112. The center of the casing opening 4-1021 corresponds to the optical axis 4-O of the optical element, and the base opening 4-1121 corresponds to a photosensitive element (not shown) disposed under the base 4-112. The external light can enter the casing 4-102 from the casing opening 4-1021 to be received by the photosensitive element after passing through the optical element and the base opening 4-1121 so as to generate a digital image signal.

Furthermore, the casing 4-102 is disposed on the base 4-112 and may have an accommodating space 4-1023 is configured to accommodate the movable assembly 4-MA (including the aforementioned optical element and the lens holder 4-108) and the driving assembly 4-DA. The frame 4-104 is fixed to the casing 4-102 and disposed in the accommodating space 4-1023.

The movable assembly 4-MA may further include a first elastic member 4-106 and a second elastic member 4-110. The outer portion (the outer ring portion) of the first elastic member 4-106 is fixed to the frame 4-104, the outer portion (the outer ring portion) of the second elastic member 4-110 is fixed to the base 4-112, and the inner portions (the inner ring portions) of the first elastic member 4-106 and the second elastic member 4-110 are respectively connected to the upper and lower sides of the lens holder 4-108, so that the lens holder 4-108 can be suspended in the accommodating space 4-1023. That is, the movable assembly 4-MA is movably connected to the fixed assembly 4-FA via the first elastic member 4-106 and the second elastic member 4-110.

In this embodiment, the driving assembly 4-DA may include a first magnet 4-M11, a second magnet 4-M12, and a driving coil 4-DCL. The driving coil 4-DCL is disposed on the lens holder 4-108, and the first magnet 4-M11 and the second magnet 4-M12 are disposed on the inner wall surface of the casing 4-102 and respectively corresponding to the driving coil 4-DCL.

In this embodiment, the driving coil 4-DCL may be wound coils and be disposed on the lens holder 4-108, and a winding axis of the driving coil 4-DCL may be parallel to the optical axis 4-O. When the driving coil 4-DCL is provided with electricity, the driving coil 4-DCL acts with the first magnet 4-M11 and the second magnet 4-M12 to generate an electromagnetic force, so as to drive the lens holder 4-108 and the held optical element to move relative to the base 4-112 along the optical axis 4-O (the Z-axis).

Figure 46:
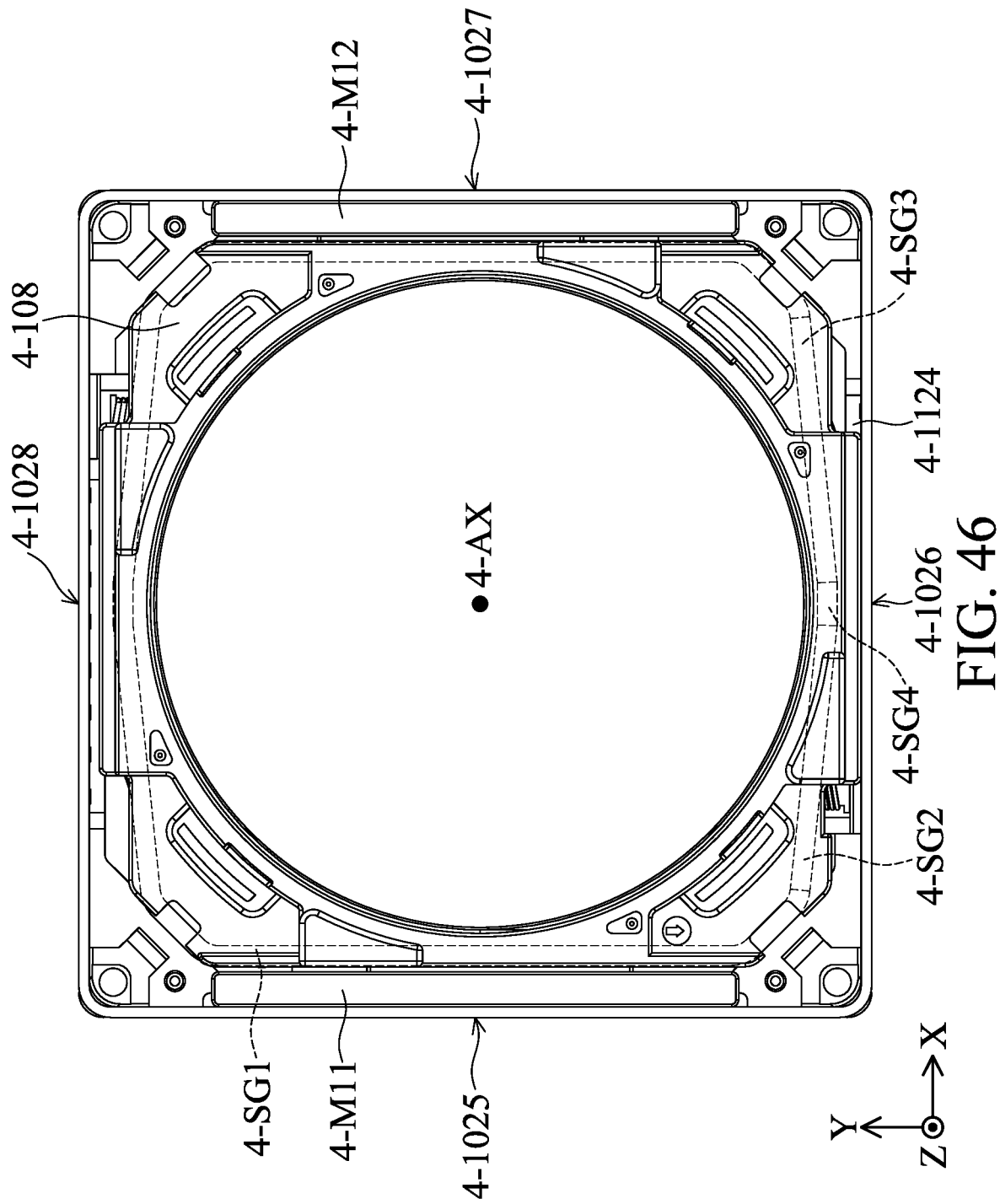
FIG. 46 is a top view of a partial structure of the optical element driving mechanism 4-100 according to an embodiment of the present disclosure.

Please refer to FIG. 46, which is a top view of a partial structure of the optical element driving mechanism 4-100 according to an embodiment of the present disclosure. When viewed along the main axis 4-AX, the fixed assembly 4-FA (such as the casing 4-102) may include a first side 4-1025, a second side 4-1026, a third side 4-1027, and a fourth side 4-1028. The first side 4-1025 extends in a first direction (the Y-axis), the second side 4-1026 extends in a second direction (the X-axis), the first side 4-1025 and the third side 4-1027 are respectively located on opposite sides of the lens holder 4-108 of the movable assembly 4-MA, and the second side 4-1026 and the fourth side 4-1028 are respectively located on opposite sides of the lens holder 4-108 of the movable assembly 4-MA.

Furthermore, as shown in FIG. 46, the driving coil 4-DCL is wound on the lens holder 4-108, and the winding axis of the driving coil 4-DCL can be parallel (or overlapping) to the main axis 4-AX. The driving coil 4-DCL includes a first segment 4-SG1, a second segment 4-SG2, a third segment 4-SG3, and a fourth segment 4-SG4. The first segment 4-SG1 is parallel to the first side 4-1025, the second segment 4-SG2 is not parallel to the first side 4-1025 and the second side 4-1026, the third segment 4-SG3 is not parallel to the first side 4-1025 and the second side 4-1022, the second segment 4-SG2 is connected to the third segment 4-SG3 via the fourth segment 4-SG4, and the fourth segment 4-SG4 is parallel to the second side 4-1026.

The first magnet M11 (the magnetic element) corresponds to the first segment 4-SG1, and the first magnet M11 has a long strip-shaped structure and extends in the first direction (the Y-axis). It is worth noting that, as shown in FIG. 46, the driving assembly 4-DA does not have a magnetic element corresponding to the second segment 4-SG2 and the third segment 4-SG3, and the driving assembly 4-DA does not have a magnetic element that corresponds to the fourth segment 4-SG4, either.

Figure 47:
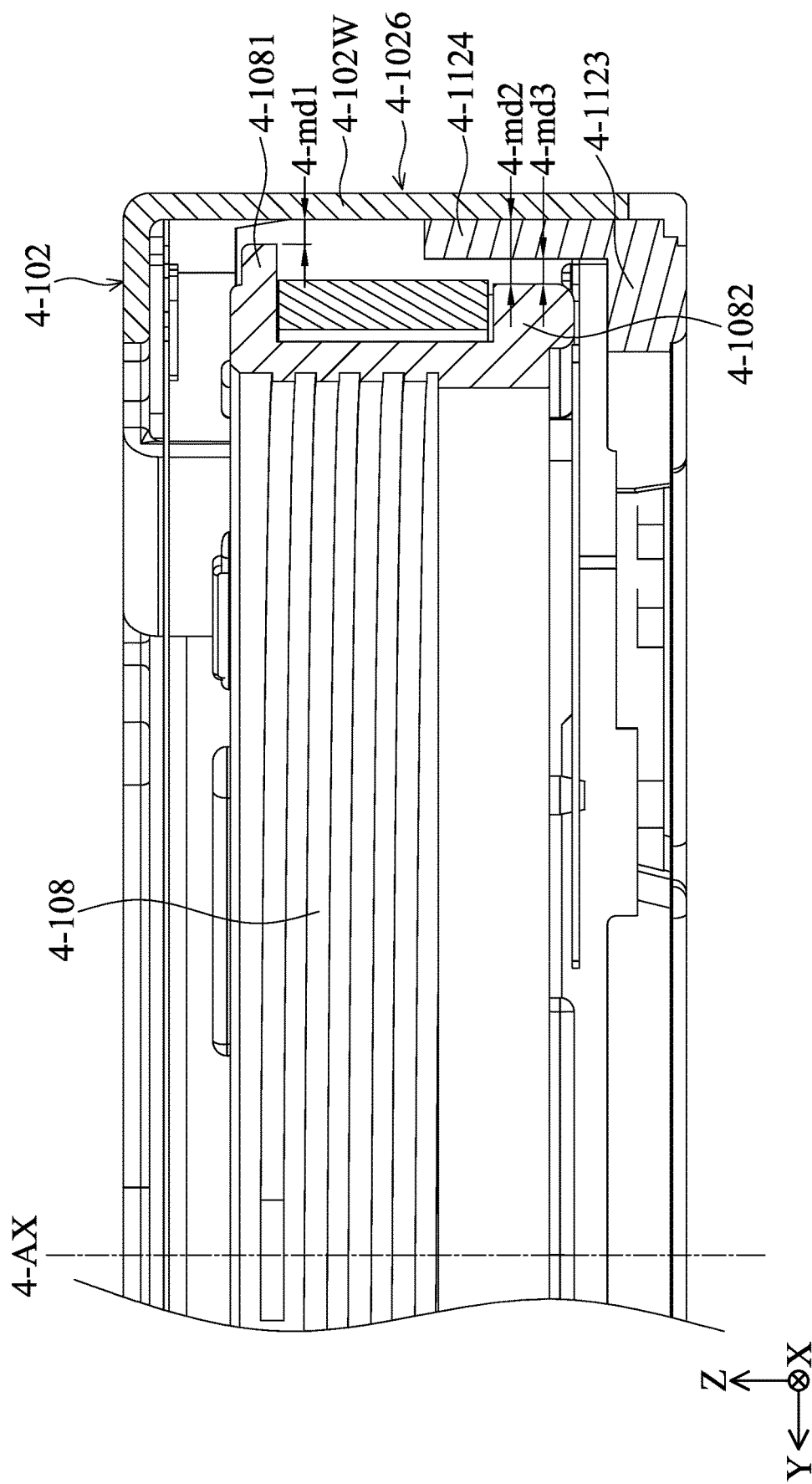
FIG. 47 is a cross-sectional view of the optical element driving mechanism 4-100 along the line 4-B-4-B' in FIG. 43 according to an embodiment of the present disclosure.

Please refer to FIG. 47, which is a cross-sectional view of the optical element driving mechanism 4-100 along the line 4-B-4-B' in FIG. 43 according to an embodiment of the present disclosure. The lens holder 4-108 may further include a first stopping element 4-1081 and a second stopping element 4-1082. When viewed along the main axis 4-AX, the first stopping element 4-1081 and the second stopping element 4-1082 are located on the second side 4-1026.

As shown in FIG. 47, in the main axis 4-AX, a shortest distance between the first stopping element 4-1081 and the second stopping element 4-1082 is not zero. That is, their positions in the Z-axis are different. When viewed along the main axis 4-AX, the first stopping element 4-1081 overlaps at least a part of the second stopping element 4-1082. Furthermore, a shortest distance 4-$md1$ between the first stopping element 4-1081 and the casing 4-102 of the fixed assembly 4-FA is different from a shortest distance 4-$md2$ between the second stopping element 4-1082 and the casing 4-102.

The base 4-112 includes a bottom plate 4-1123 and a base side wall 4-1124, and the base side wall 4-1124 protrudes from the edge of the bottom plate 4-1123 (FIG. 44).

When viewed along the main axis 4-AX, a casing side wall 4-102W of the casing 4-102 is located on the second side 4-1026 and corresponds to the base side wall 4-1124. When viewed in the first direction (the Y-axis), the first stopping element 4-1081 overlaps at least a part of the casing side wall 4-102W.

The first stopping element 4-1081, the second stopping element 4-1082, the casing side wall 4-102W, and the base side wall 4-1124 may be referred to as a stopping assembly, configured to limit the movement of the movable assembly 4-MA relative to the fixed assembly 4-FA within a range of motion. In addition, as shown in FIG. 47, the shortest distance 4-$md1$ between the first stopping element 4-1081 and the casing side wall 4-102W is substantially equal a shortest distance 4-$md3$ between the second stopping element 4-1082 and the base side wall 4-1124.

Figure 48:
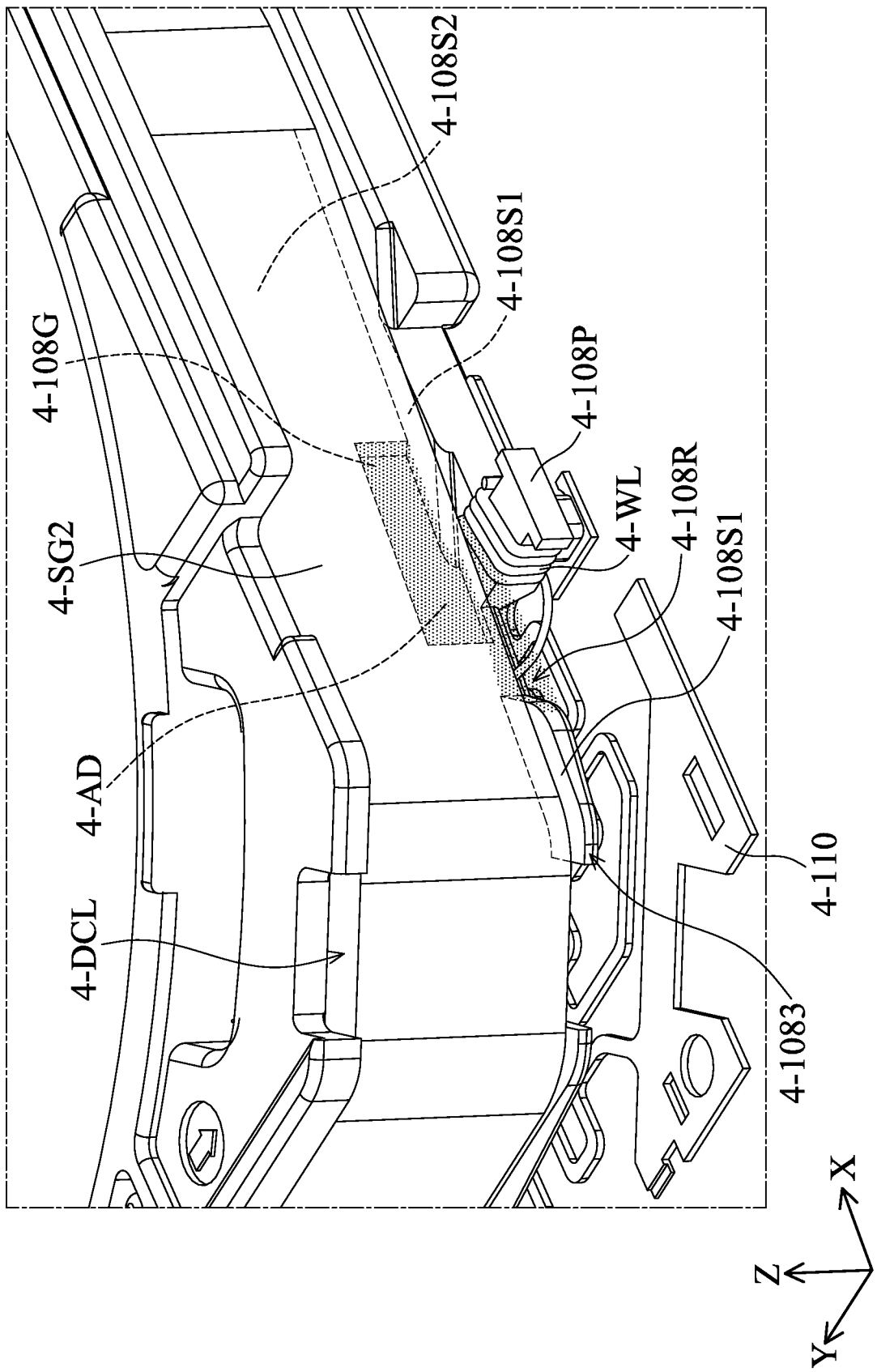
FIG. 48 is a partial structural diagram of the lens holder 4-108 and the driving coil 4-DCL according to an embodiment of the present disclosure.

Please refer to FIG. 48, which is a partial structural diagram of the lens holder 4-108 and the driving coil 4-DCL according to an embodiment of the present disclosure. The lens holder 4-108 of the movable assembly 4-MA may include two electrical connection portions 4-108P (only one is shown in FIG. 48), the driving coil 4-DCL is formed by a leading wire 4-WL, and a part of the leading wire 4-WL is disposed on the electrical connection portions 4-108P. Specifically, an initial end of the leading wire 4-WL is disposed on one of the electrical connection portions 4-108P, and a finished end of the leading wire 4-WL is disposed on the other electrical connection portion 4-108P.

The lens holder 4-108 of the movable assembly 4-MA further includes a fixed surface 4-108S1 and a receiving portion 4-108R. The fixed surface 4-108S1 faces the driving coil 4-DCL and is directly in contact with the driving coil 4-DCL. The receiving portion 4-108R is located on the fixed surface 4-108S1 and is formed from the fixed surface 4-108S1. The receiving portion 4-108R is configured to receive at least a part of the leading wire 4-WL, and the receiving portion 4-108R corresponds to the electrical connection portion 4-108P.

The optical element driving mechanism 4-100 may further include a first adhesive element 4-AD. The first adhesive element 4-AD may be, for example, glue, and the first adhesive element 4-AD is disposed in the receiving portion 4-108R. The first adhesive element 4-AD can directly contact the lens holder 4-108 of the movable assembly 4-MA, the leading wire 4-WL, the driving coil 4-DCL, and the second segment 4-SG2. In some embodiments of the present disclosure, the receiving portion 4-108R may be a concave structure or an opening structure.

The lens holder 4-108 of the movable assembly 4-MA further includes a support surface 4-108S2, which is not parallel to the fixed surface 4-108S1. The support surface 4-108S2 directly contacts the driving coil 4-DCL. Specifically, the support surface 4-108S2 directly contacts the second segment 4-SG2. As shown in FIG. 48, the lens holder 4-108 of the movable assembly 4-MA further includes a guiding structure 4-108G, which is disposed on the support surface 4-108S2. At least a part of the first adhesive element 4-AD is located in the guiding structure 4-108G. In this embodiment, the guiding structure 4-108G is adjacent to the receiving portion 4-108R. In some embodiments of the present disclosure, the guiding structure 4-108G may be a concave structure or an opening structure.

Figure 49:
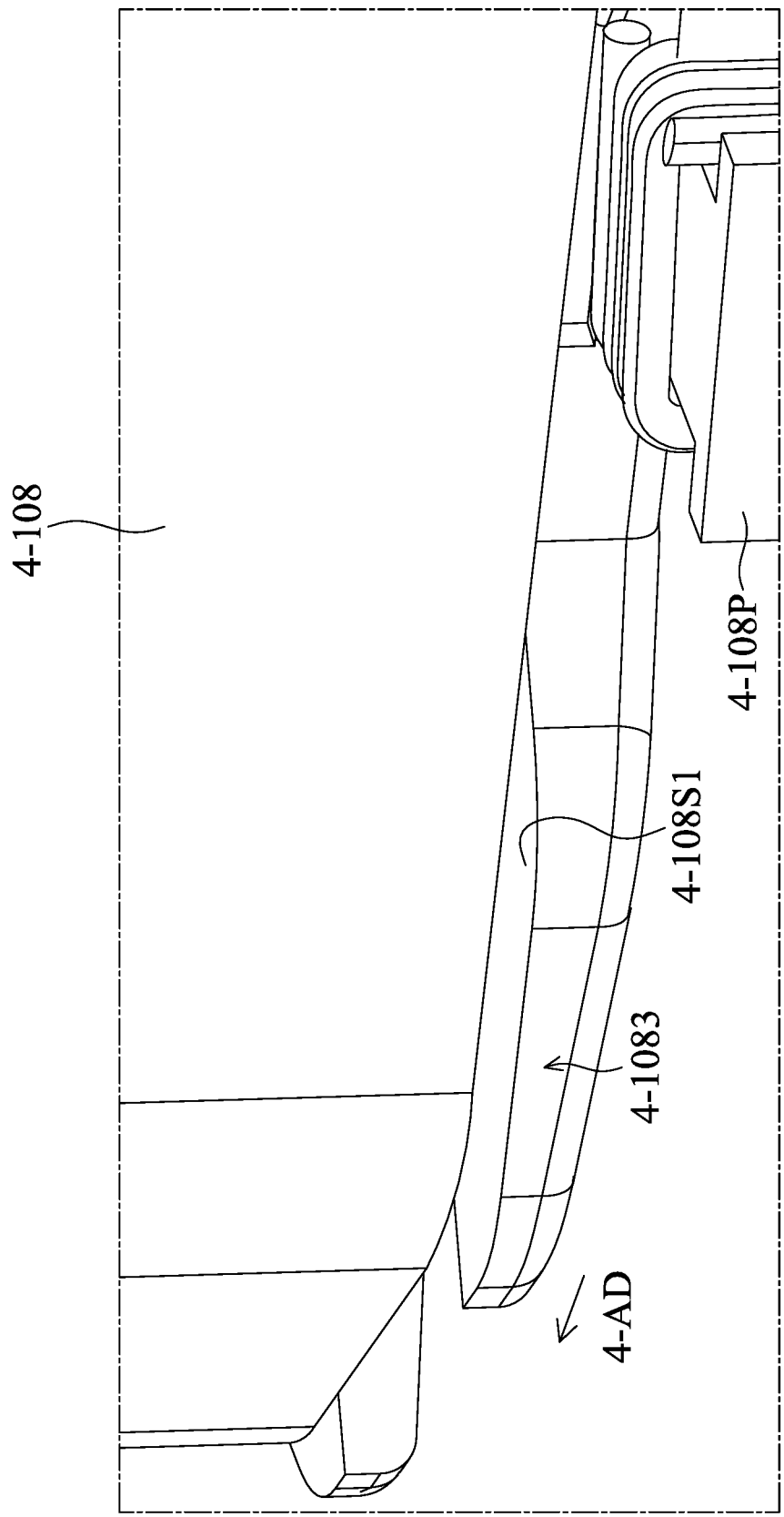
FIG. 49 is a partial structural diagram of the lens holder 4-108 and the driving coil 4-DCL in another view according to an embodiment of the present disclosure.

Please refer to FIG. 48 and FIG. 49. FIG. 49 is a partial structural diagram of the lens holder 4-108 and the driving coil 4-DCL in another view according to an embodiment of the present disclosure. The lens holder 4-108 of the movable assembly 4-MA further includes a skirt portion 4-1083, and a portion of the fixed surface 4-108S1 is located at the skirt portion 4-1083. In this embodiment, the skirt portion 4-1083 extends in a direction that is not parallel to the winding axis (the Z-axis) of the driving coil 4-DCL. Furthermore, as shown in FIG. 49, the skirt portion 4-1083 has a tapered structure, tapered in a direction 4-DR, and the direction 4-DR is not parallel to the winding axis (the Z-axis).

Figure 50:
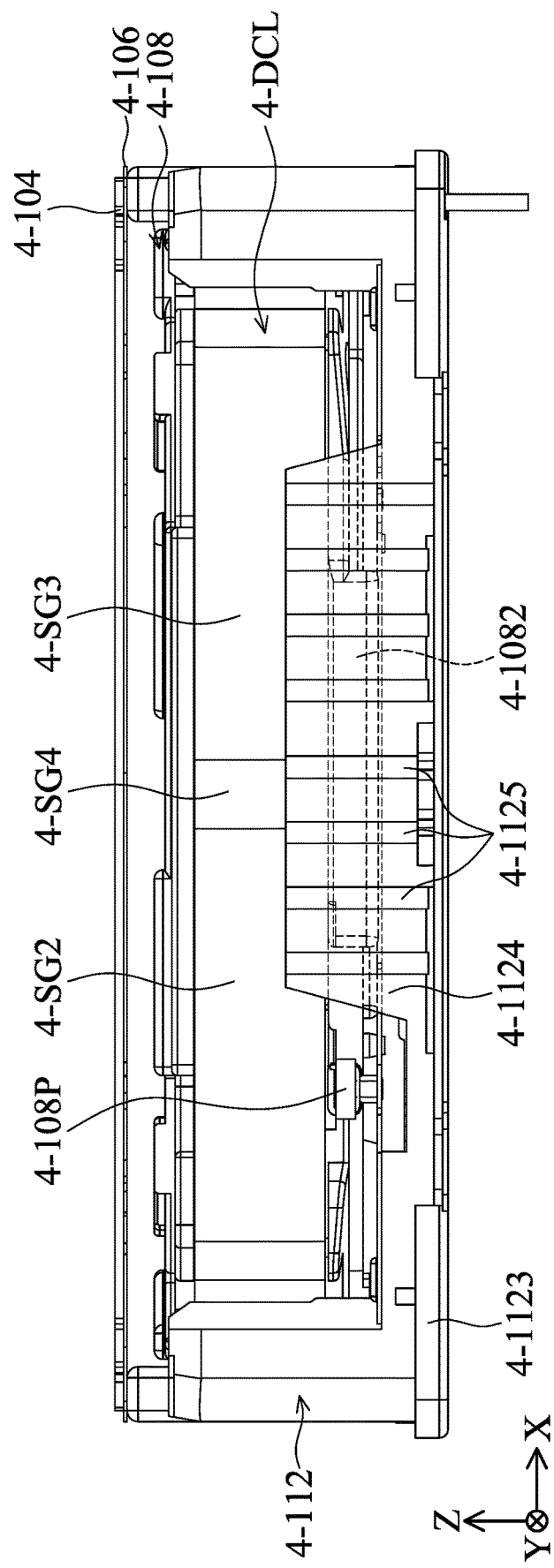
FIG. 50 is a front view of the optical element driving mechanism 4-100 after removing the casing 4-102 according to an embodiment of the present disclosure.

Please refer to FIG. 46 and FIG. 50. FIG. 50 is a front view of the optical element driving mechanism 4-100 after removing the casing 4-102 according to an embodiment of the present disclosure. In this embodiment, when viewed along the main axis 4-AX, the base side wall 4-1124 is located on the second side 4-1062, and the electrical connection portion 4-108P is located on the second side 4-1022.

Furthermore, as shown in FIG. 50, when viewed in the first direction (the Y-axis), the base side wall 4-1124 overlaps at least a portion of the third segment 4-SG3, the base side wall 4-1124 overlaps at least a portion of the second segment 4-SG2, the base side wall 4-1124 overlaps at least a portion of the fourth segment 4-SG4, the base side wall 4-1124 does not overlap the electrical connection portion 4-108P, and the base side wall 4-1124 overlaps at least a portion of the second stopping element 4-1082.

In this embodiment, the base 4-112 of the fixed assembly 4-FA further includes an adhesive strengthening structure 4-125, which is disposed on the base side wall 4-124. In other embodiments, the adhesive strengthening structure 4-125 can also be disposed on the casing side wall 4-102W. The adhesive strengthening structure 4-125 may be a plurality of trenches, and these trenches are parallel to each other.

Figure 51:
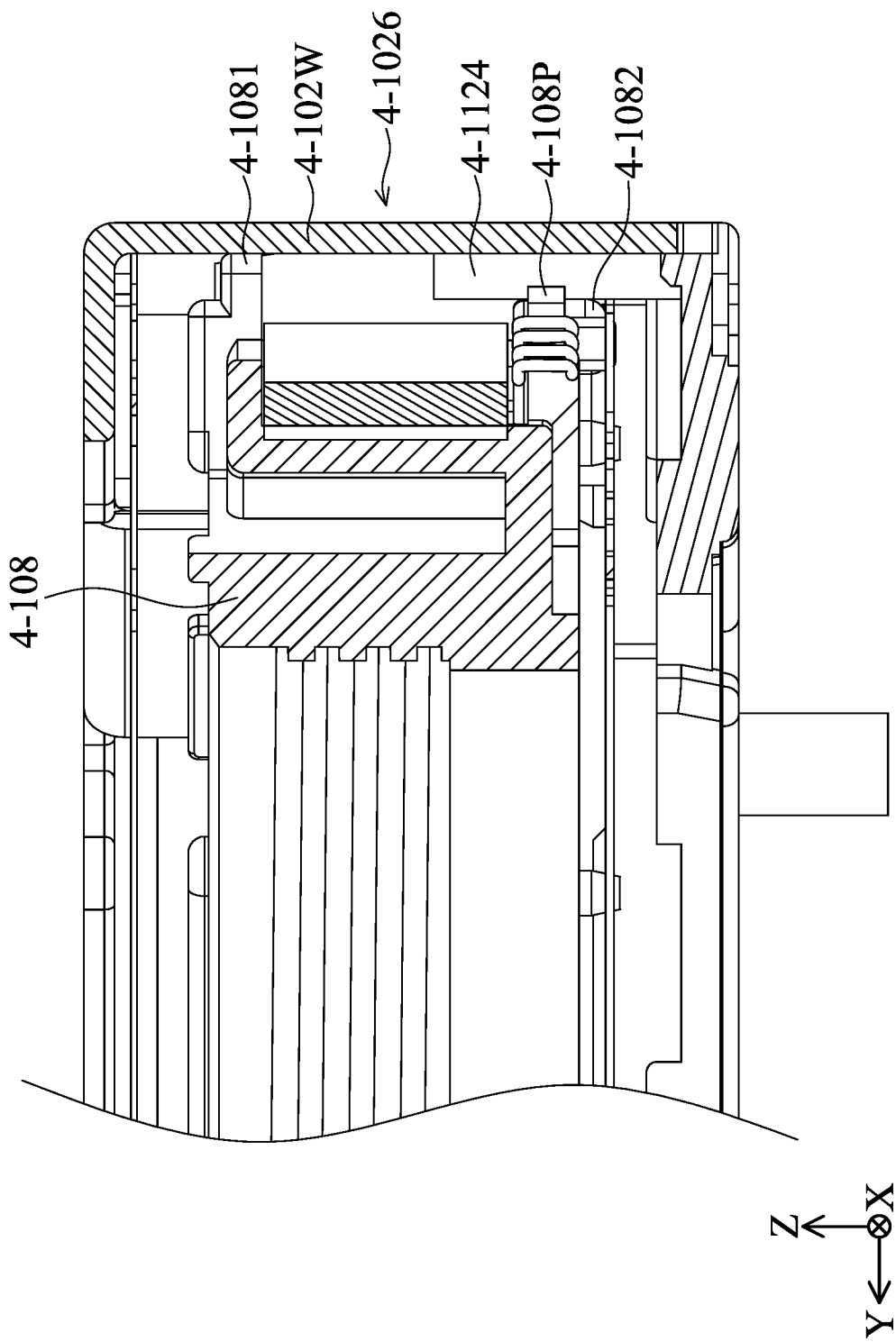
FIG. 51 is a cross-sectional view of the optical element driving mechanism 4-100 along the line 4-C-4-C' in FIG. 43 according to an embodiment of the present disclosure.

Please refer to FIG. 51, which is a cross-sectional view of the optical element driving mechanism 4-100 along the line 4-C-4-C' in FIG. 43 according to an embodiment of the present disclosure. In FIG. 51, when the lens holder 4-108 of the movable assembly 4-MA moves toward the second side 4-1026 to a limit position, the first stopping element 4-1081 is in contact with the casing side wall 4-102W, and the second stopping element 4-1082 is in contact with the base side wall 4-1124. When viewed in the second direction (the X-axis), the base side wall 4-1124 overlaps at least a part of the electrical connection portion 4-108P.

Figure 52:
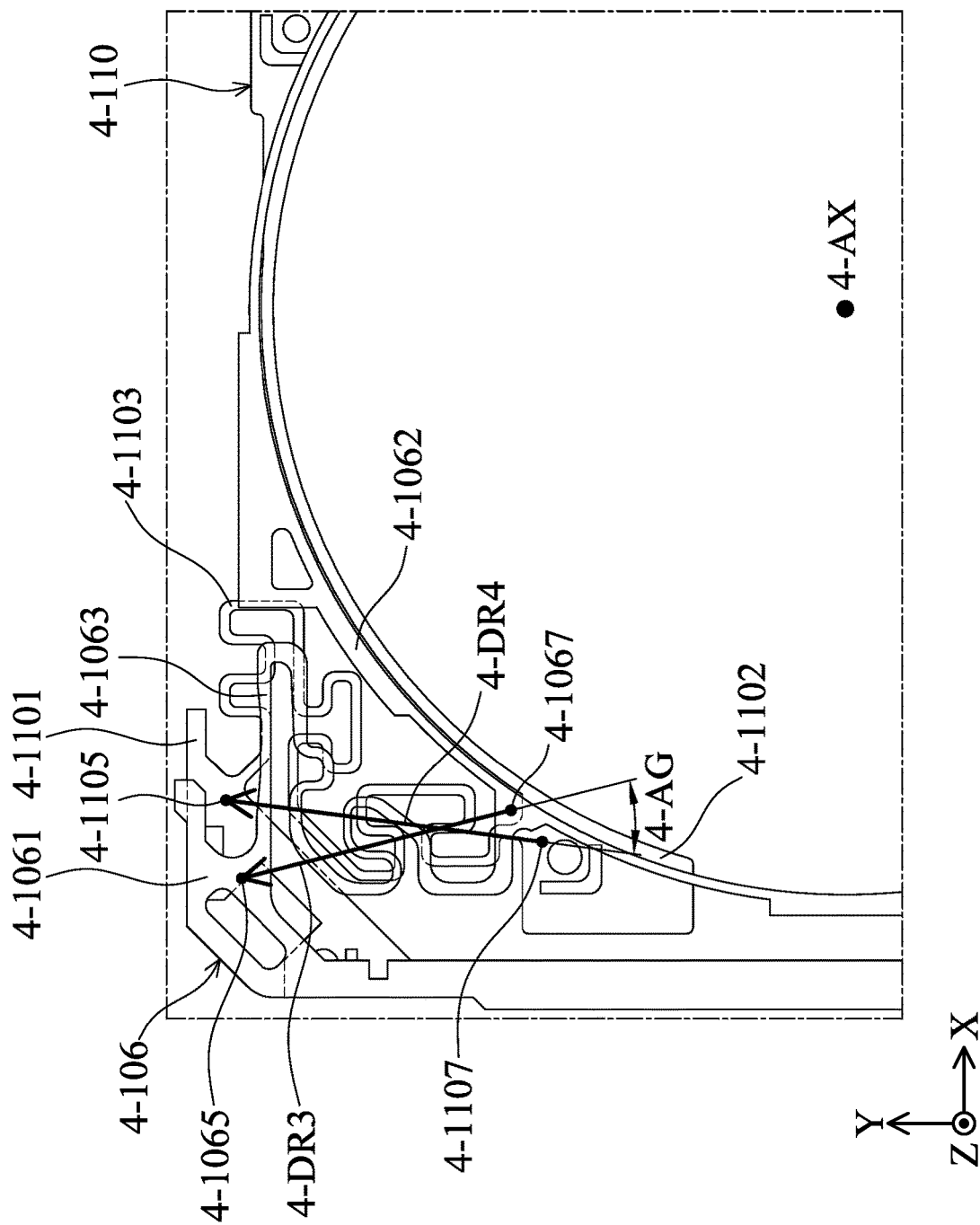
FIG. 52 is a top view of the first elastic member 4-106 and the second elastic member 4-110 according to an embodiment of the present disclosure.

Please refer to FIG. 52, which is a top view of the first elastic member 4-106 and the second elastic member 4-110 according to an embodiment of the present disclosure. The first elastic member 4-106 includes a first fixed part 4-1061, a first movable part 4-1062, and a first elastic portion 4-1063. The first fixed part 4-1061 is configured to be fixed to the fixed assembly 4-FA (such as the frame 4-104), the first movable part 4-1062 is configured to be fixed to the movable assembly 4-MA (such as lens holder 4-108), and the first movable part 4-1062 is movably connected to the first fixed part 4-1061 via the first elastic portion 4-1063.

The first elastic portion 4-1063 intersects the first fixed part 4-1061 at a first intersection 4-1065, and the first elastic portion 4-1063 intersects the first movable part 4-1062 at a second intersection 4-1067, the second intersection 4-1067 and the first intersection 4-1065 are arranged in sequence in a third direction 4-DR3.

Furthermore, the second elastic member 4-110 includes a second fixed part 4-1101, a second movable part 4-1102, and a second elastic portion 4-1103. The second fixed part 4-1101 is configured to be fixed to the fixed assembly 4-FA (such the base 4-112), the second movable part 4-1102 is configured to be fixed to the movable assembly 4-MA (such as the lens holder 4-108), and the second movable part 4-1102 is movably connected to the second fixed part 4-1101 via the second elastic portion 4-1103.

The second elastic portion 4-1103 intersects the second fixed part 4-1101 at a third intersection 4-1105, the second elastic portion 4-1103 intersects the second movable part 4-1102 at a fourth intersection 4-1107, and the fourth intersection 4-1107 and the third intersection 4-1105 are arranged in sequence in a fourth direction 4-DR4.

It is worth noting that an angle 4-AG between the third direction 4-DR3 and the fourth direction 4-DR4 is less than or equal to 90 degrees. In some embodiments of the present disclosure, when viewed along the main axis 4-AX, the first elastic portion 4-1063 overlaps at least a portion of the second elastic portion 4-1103. That is, the first elastic portion 4-1063 and the second elastic portion 4-1103 are disposed at the same corner.

The present disclosure provides an optical element driving mechanism 4-100, which has a miniaturized lens holder 4-108 capable of holding a larger lens, and a portion of each side of the lens holder 4-108 is reduced toward the inside so as to receive the leading wire 4-WL with a large diameter. Therefore, the design of the optical element driving mechanism 4-100 of the present disclosure can achieve the advantages of miniaturization, holding a larger lens, and high driving efficiency at the same time.

Furthermore, at least one base side wall 4-1124 is disposed on the base 4-112 of the present disclosure, and a plurality of adhesive strengthening structures 4-1125 are disposed on the base side wall 4-1124 to increase the adhesive strength between the base side wall 4-1124 and the casing side wall 4-102W. In addition, the electrical connection portion 4-108P of the lens holder 4-108 can serve as a bobbin of the driving coil 4-DCL, and the electrical connection portion 4-108P is staggered from the base side wall 4-1124, so that when the lens holder 4-108 moves, the electrical connection portion 4-108P does not collide with the base side wall 4-1124 and cause damage.

The Fifth Embodiment Group.

Figure 53:
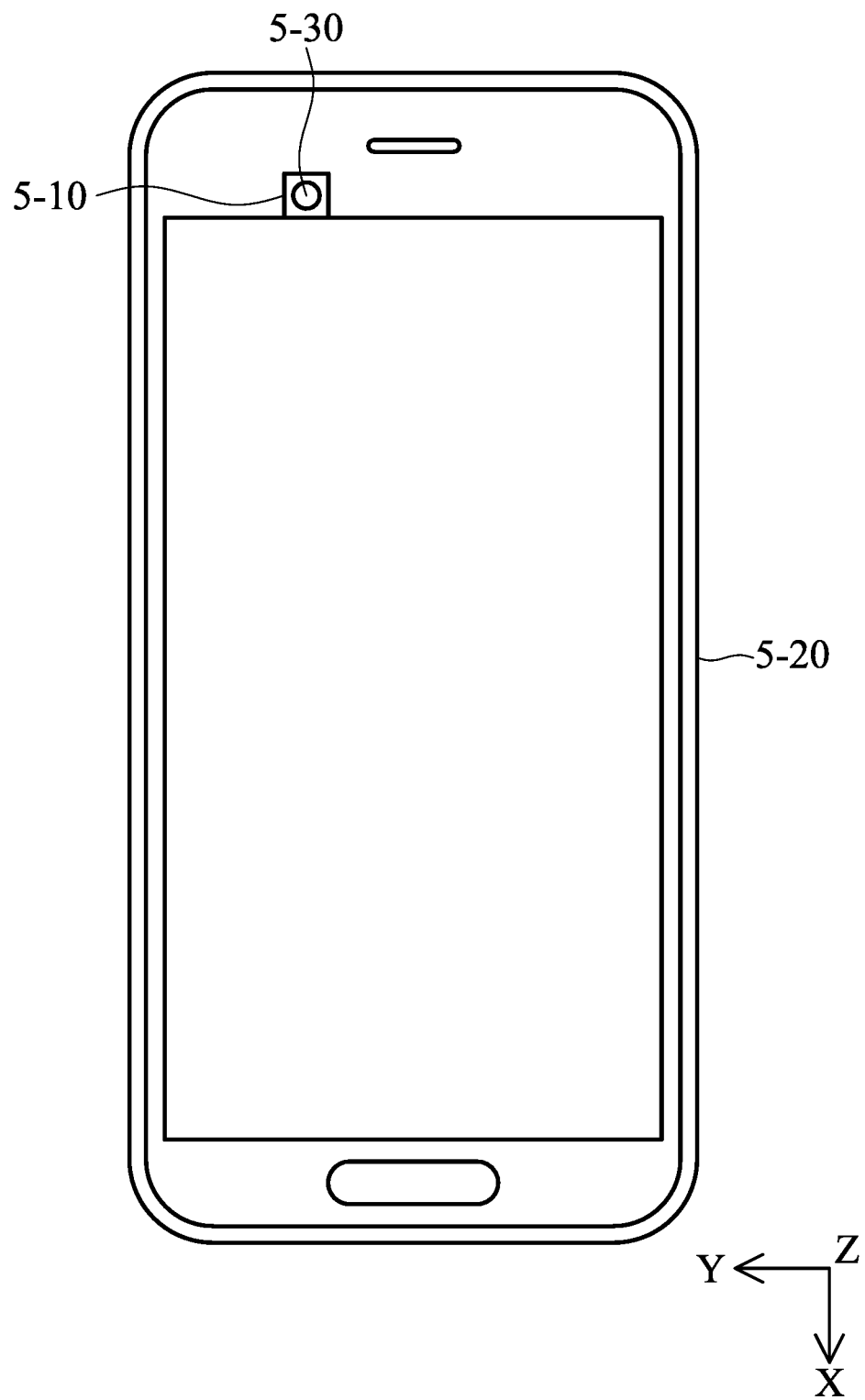
FIG. 53 is a schematic diagram of an electronic device according to an embodiment of the invention.

Referring to FIG. 53, in an embodiment of the invention, an optical member driving mechanism 5-10 can be disposed in an electronic device 5-20 and used to hold and drive an optical member 5-30, so that the optical member 5-30 can move relative to an image sensor (not shown) in the electronic device 5-20, and the purpose of focus adjustment can be achieved. For example, the electronic device 5-20 can be a digital camera or a smartphone having the function of capturing photographs or recording video, and the optical member 5-30 can be a lens.

Figure 54:
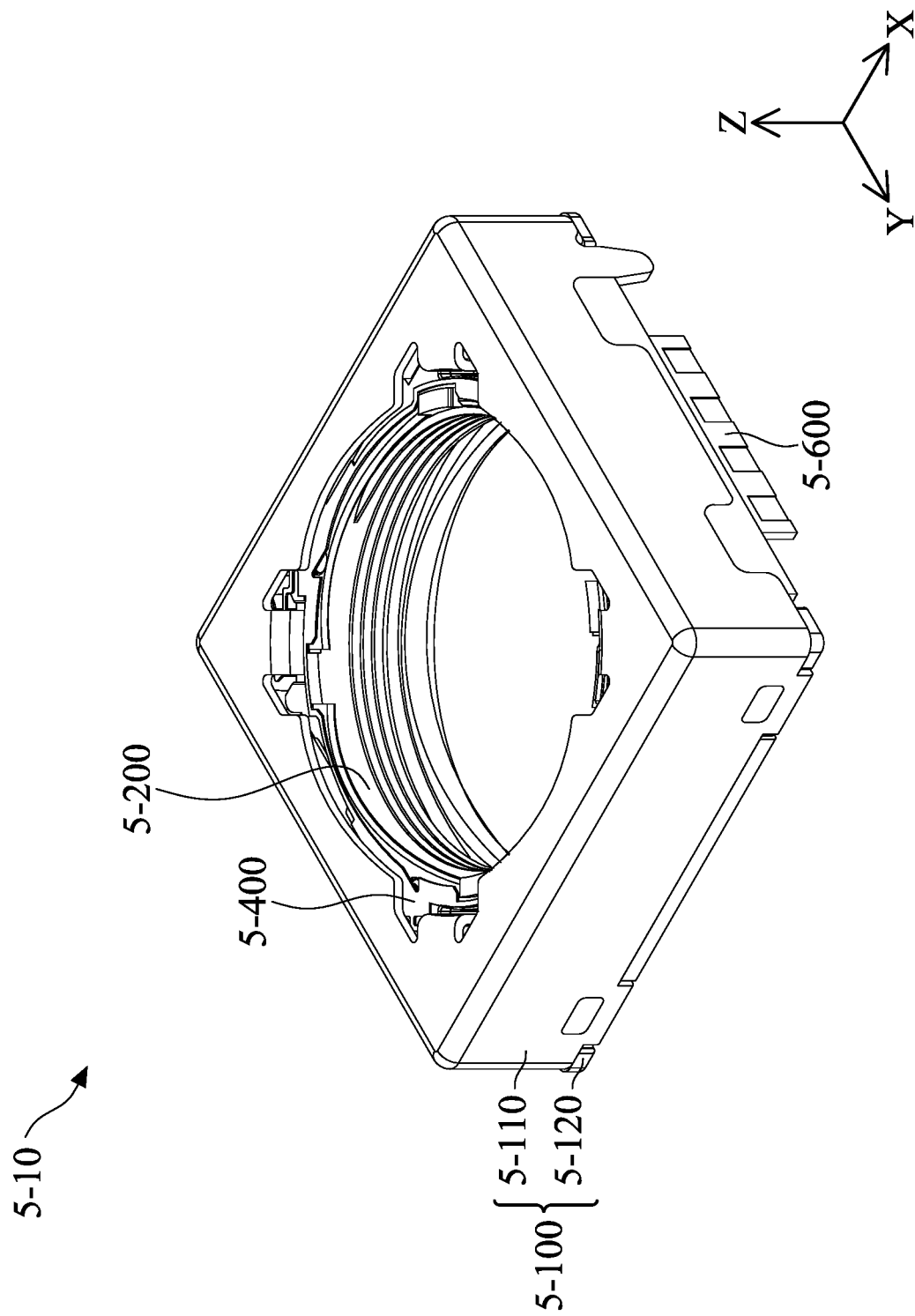
FIG. 54 is a schematic diagram of an optical member driving mechanism according to an embodiment of the invention.
Figure 55:
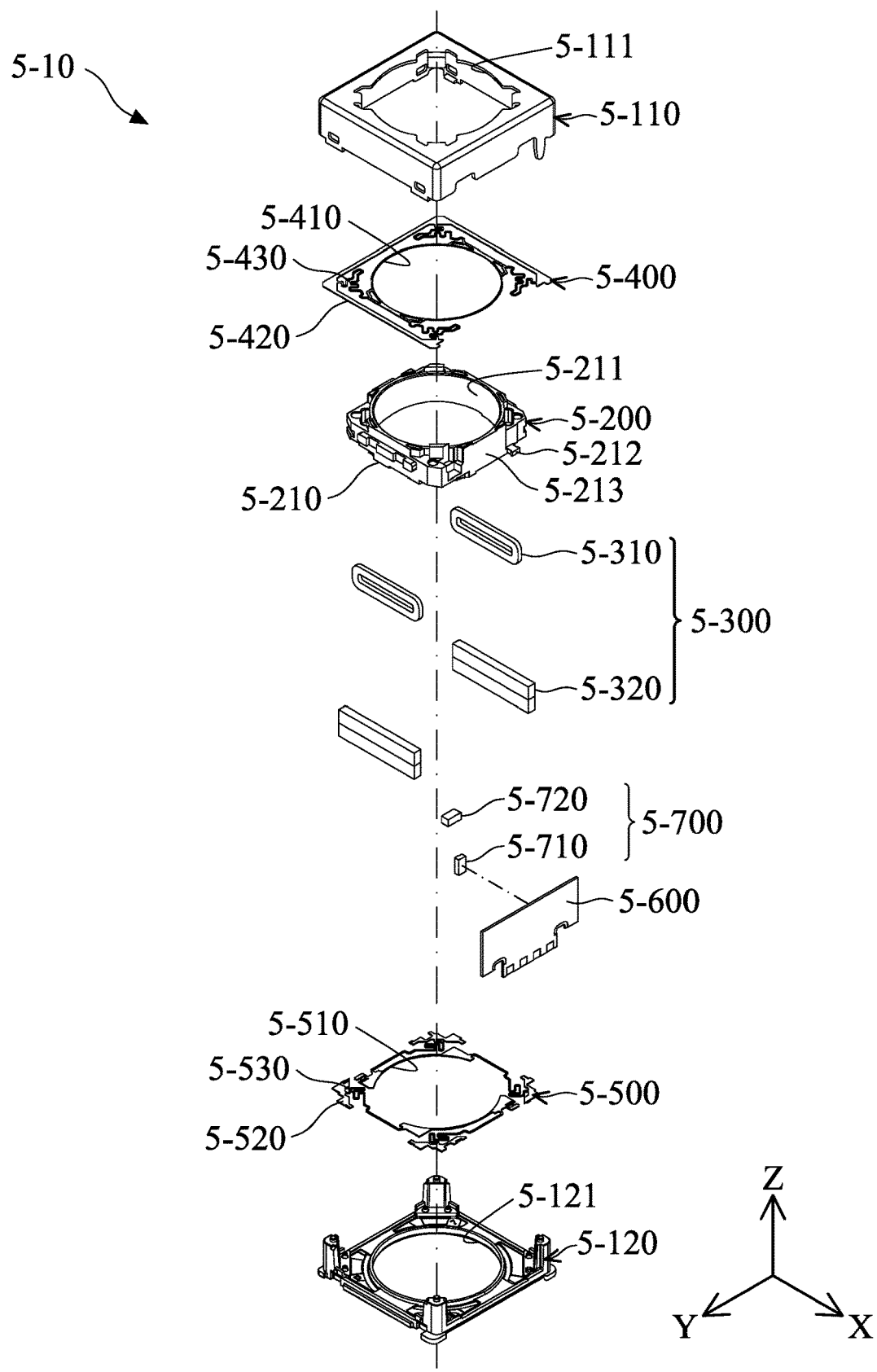
FIG. 55 is an exploded-view diagram of the optical member driving mechanism according to an embodiment of the invention.

FIG. 54 is a schematic diagram of the optical member driving mechanism 5-10 according to an embodiment of the invention, and FIG. 55 is an exploded-view diagram of the aforementioned optical member driving mechanism 5-10. As shown in FIG. 54 and FIG. 55, the optical member driving mechanism 5-10 primarily comprises a fixed portion 5-100, a movable portion 5-200, a driving assembly 5-300, two metal connecting members 5-400 and 5-500, a circuit board 5-600, and a position detecting module 5-700.

The fixed portion 5-100 includes a frame 5-110 and a base 5-120. The frame 5-110 has an optical hole 5-111, and the base 5-120 has an optical hole 5-121. The frame 5-110 and the base 5-120 can be assembled to form a hollow box by latching or adhering. When the optical member driving mechanism 5-10 is assembled, the movable portion 5-200, the driving assembly 5-300, the metal connecting members 5-400 and 5-500, the circuit board 5-600, and the position detecting module 5-700 can be accommodated in the hollow box, and the optical hole 5-111 corresponds to the optical hole 5-121.

The movable portion 5-200 includes a carrier 5-210 having an accommodating hole 5-211 and at least one winding pillar 5-212. The accommodating hole 5-211 is formed on the center of the carrier 5-210, and the position of the accommodating hole 5-211 is corresponded to that of the optical hole 5-111 in the frame 5-110 and the optical hole 5-121 in the base 5-120. Therefore, an external light can pass through the optical hole 5-111, the optical member 5-30, and the optical hole 5-121 in sequence, and then form an image on the image sensor in the electronic device 5-20. The winding pillar 5-212 is formed on an outer wall 5-213 of the carrier 5-210, and protrudes from the outer wall 5-213. For example, the winding pillar 5-212 can include a L-shaped structure or a T-shaped structure.

The driving assembly 5-300 includes at least one first electromagnetic driving member 5-310 and at least one second electromagnetic driving member 5-320. The first electromagnetic driving member 5-310 and the second electromagnetic driving member 5-320 are corresponded to each other, and affixed to the carrier 5-210 and the fixed portion 5-100 respectively. In this embodiment, the first electromagnetic driving member 5-310 is a coil, and the second electromagnetic driving member 5-320 is a magnetic member (such as a magnet). The electromagnetic effect between the first electromagnetic driving member 5-310 and the second electromagnetic driving member 5-320 can drive the carrier 5-210 and the optical member 5-30 disposed thereon to move relative to the fixed portion 5-100 along the Z-axis.

Specifically, when a current flows through the coil (the first electromagnetic driving member 5-310), an electromagnetic driving force is generated between the first electromagnetic driving member 5-310 and the second electromagnetic driving member 5-320. This electromagnetic force can push the carrier 5-210 to move along the Z-axis. Since the carrier 5-210 can move relative to the image sensor in the electronic device 5-20 along the Z-axis, the purpose of focus adjustment can be achieved.

Figure 56:
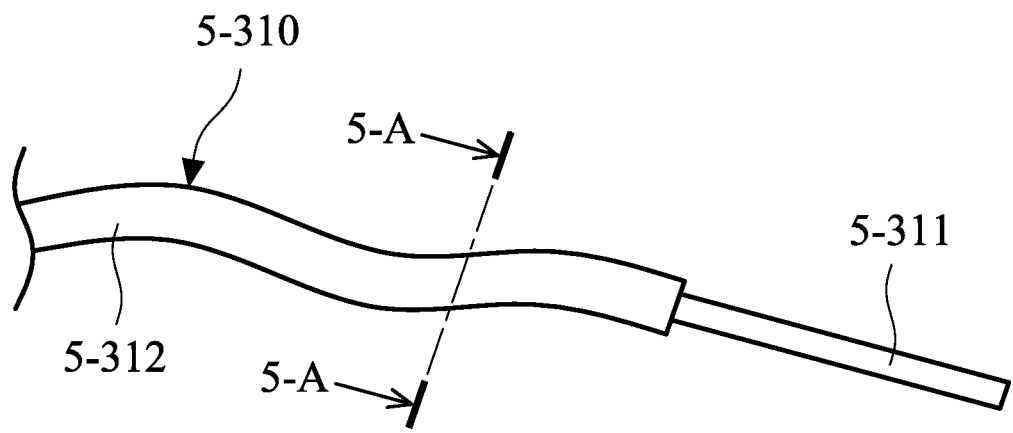
FIG. 56 is a partial schematic diagram of a first electromagnetic driving member according to an embodiment of the invention.
Figure 57:
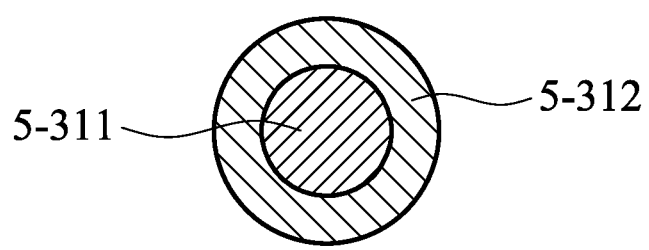
FIG. 57 is a cross-sectional view along line 5-A-5-A in FIG. 56.
Figure 58:
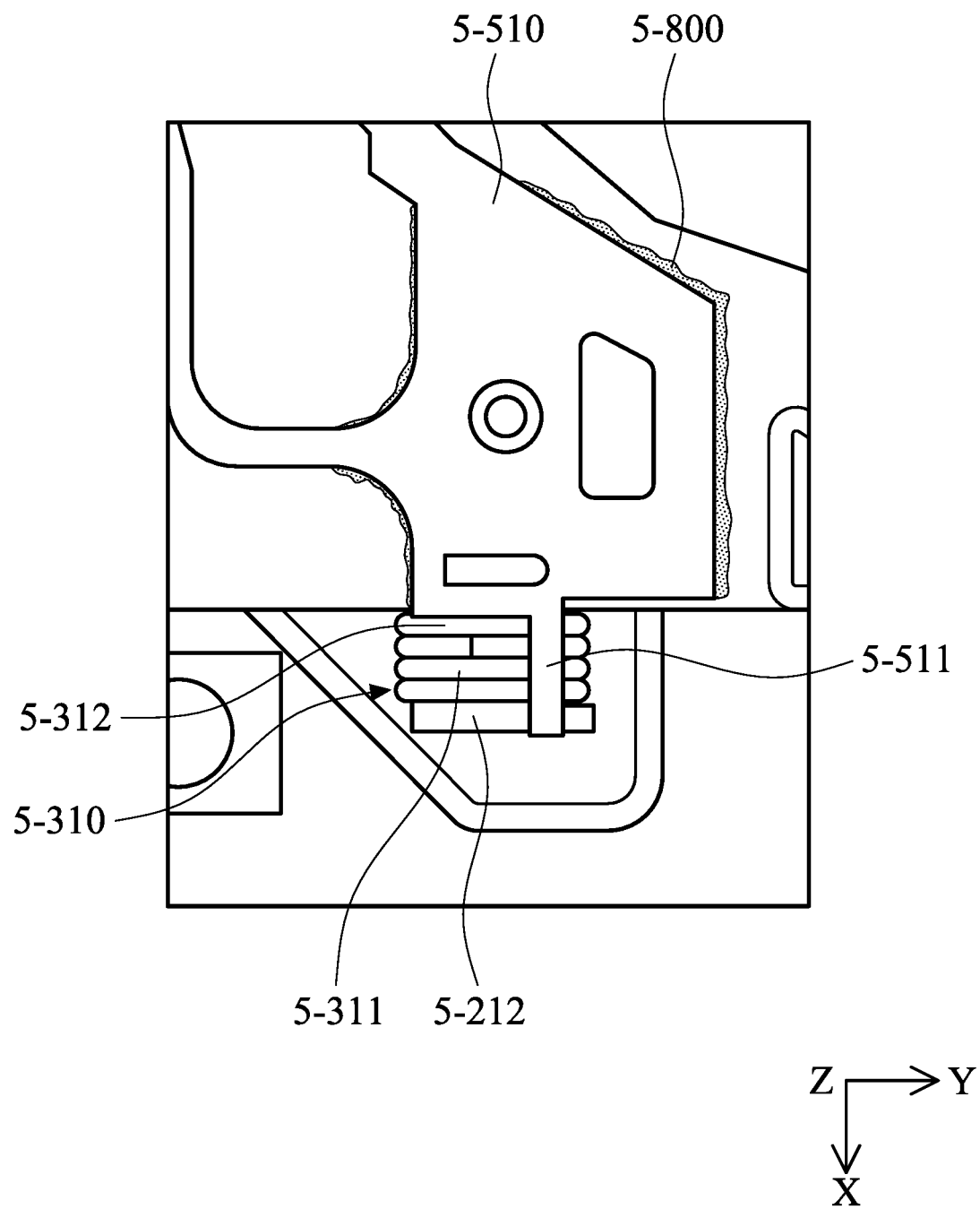
FIG. 58 is a schematic diagram of a metal connecting member and the first electromagnetic driving member according to an embodiment of the invention.

The first electromagnetic driving member 5-310 in this embodiment can be consisted by a lead winding around the carrier 5-210. Referring to FIG. 56 to FIG. 58, in detail, the lead includes a conductive portion 5-311 and an insulating portion 5-312. The conductive portion 311 is a continuous longitudinal conductor, and the insulating portion 5-312 is an insulating material surrounding the conductive portion 5-311. Moreover, at an end of the lead of the first electromagnetic driving member 5-310, a section that the conductive portion 5-311 is exposed and not covered by the insulating portion 5-312 is formed (as shown in FIG. 56), and this section can wind around the winding pillar 5-212 of the carrier 5-210 (as shown in FIG. 6).

Referring to FIG. 55, the metal connecting members 5-400 and 5-500 are respectively disposed on the opposite sides of the carrier 5-210. For example, the metal connecting member 5-400 is a sheet spring having a plate structure, including an inner section 5-410, an outer section 5-420, and at least one string section 5-430. The inner section 5-410 is affixed to the carrier 5-210. The outer section 5-420 is affixed to the fixed portion 5-100 (the frame 5-110 or the base 5-120). The string section 5-430 is disposed between the inner section 5-410 and the outer section 5-420, and connected thereto.

Similarly, the metal connecting member 5-400 can be a sheet spring having a plate structure, including an inner section 5-510, an outer section 5-520, and at least one string section 5-530. The inner section 5-510 is affixed to the carrier 5-210. The outer section 5-520 is affixed to the fixed portion 5-100 (the frame 5-110 or the base 5-120). The string section 5-530 is disposed between the inner section 5-510 and the outer section 5-520, and connected thereto. Therefore, the carrier 5-210 can be hung in the hollow box of the fixed portion 5-100 by the metal connecting members 5-400 and 5-500.

As shown in FIG. 58, the inner section 5-510 of the metal connecting member 5-500 can be affixed to the carrier 5-210 by an adhesive member 5-800 (such as a glue, and can include resin material). The inner section 5-510 further includes a protrusion 5-511 extending toward the outer section 5-520, and the position of the protrusion 5-511 corresponds to that of the winding pillar 5-212 of the carrier 5-210. As seen from the Z-axis, the overlapping area between the carrier 5-210 and the lead winding around the winding pillar 5-212 is called the winding region, the overlapping area between the metal connecting member 5-500 and the winding region is called the overlap region (it is substantially the same as the cross-sectional area of the protrusion 5-511), and the area of the winding region which does not overlap the metal connecting member 5-500 is called the non-overlap region. In this embodiment, the area of the overlap region that is projected onto the carrier 5-210 is less than the area of the non-overlap region that is projected onto the carrier 5-210.

Figure 59:
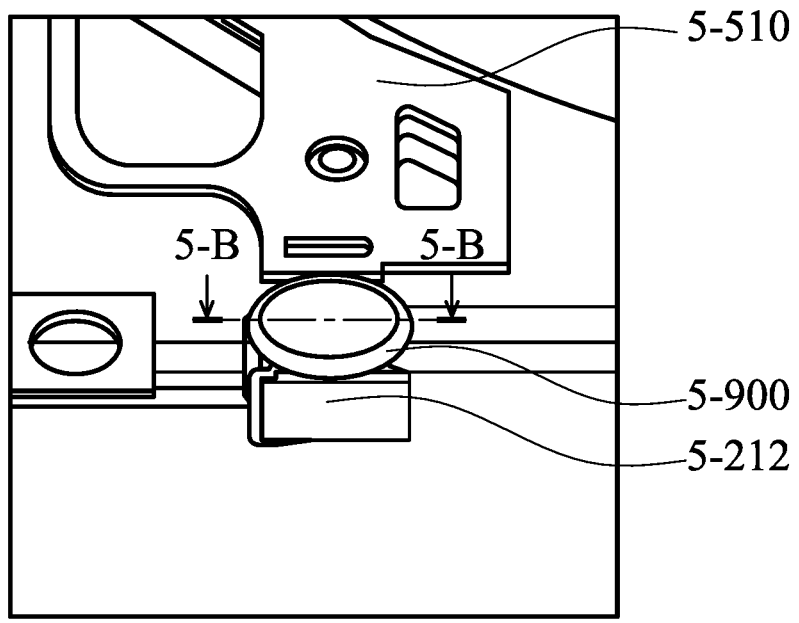
FIG. 59 is a schematic diagram representing the metal connecting member is electrically connected to the first electromagnetic driving member via an electrical connecting assembly according to an embodiment of the invention.
Figure 60:
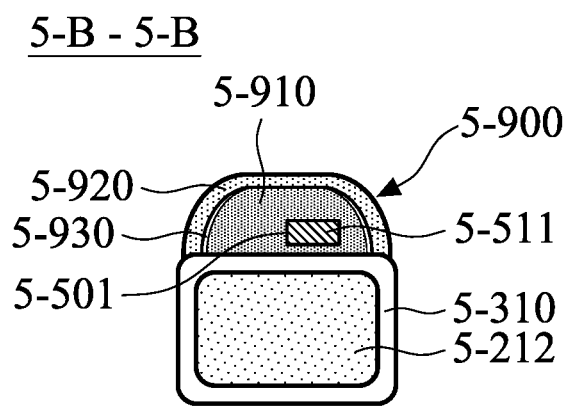
FIG. 60 is a cross-sectional view along line 5-B-5-B in FIG. 59.

Referring to FIG. 59 and FIG. 60, the user can use an electrical connecting assembly 5-900 to electrically connect the metal connecting member 5-500 to the first electromagnetic driving member 5-310.

The electrical connecting assembly 5-900 is disposed on the winding pillar 5-212 of the carrier 5-210, and includes a metal portion 5-910 and a non-metallic portion 5-920. For example, the metal portion 5-910 can include solder, conductive glue, copper slurry, or other suitable conductive material. The metal portion 5-910 covers and is in contact with the protrusion 5-511 of the metal connecting member 5-500, and covers and is in contact with at least a portion of the conductive portion 5-311. Therefore, the first electromagnetic driving member 310 and the metal connecting member 5-500 can be electrically connected to each other through the electrical connecting assembly 5-900. For example, the non-metallic portion 5-920 can include resin, rubber, or other suitable non-conductive material. The non-metallic portion 5-920 covers the metal portion 5-910, so as to restrict the range of the metal portion 5-910. In this embodiment, a gap 5-930 is formed between the metal portion 5-910 and the non-metallic portion 5-920, so as to confirm that a sufficient extension area can be provided to the metal portion 5-910 during the manufacturing process.

When the electrical connecting assembly 5-900 is disposed, the uncured metal portion 5-910 can be firstly disposed on the winding pillar 5-212 and contact the protrusion 5-511 and the conductive portion 5-311. Subsequently, the non-metallic portion 5-920 can be coated on the metal portion 5-910. In this embodiment, the non-metallic portion 5-920 is a double-curing glue, which can be cured by light and heat. Thus, the user can irradiate the non-metallic portion 5-920 by light (such as a UV light) after coating, so as to fix the appearance of the non-metallic portion 5-920.

Next, a heat can be applied to the electrical connecting assembly 5-900 to melt the metal portion 5-910, and the connecting area between the metal portion 5-910 and the protrusion 5-511 and the connecting area between the metal portion 5-910 and the conductive portion 5-311 can be increased. The cured non-metallic portion 5-920 can restrict the extension area of the metal portion 5-910, so that short-circuits caused by the metal portion 5-910 making contact with the other components in the optical member driving mechanism 5-10 or the electronic device 5-20 can be prevented. After the metal portion 5-910 is cured, the electrical connecting assembly 5-900 shown in FIG. 59 and FIG. 60 can be formed.

It should be noted that, the non-metallic portion 5-920 can include a material with high viscosity to restrict the appearance of the electrical connecting assembly 5-900. For example, the non-metallic portion 5-920 can include a dual-curing glue with viscosity range in 10000 cps-20000 cps. Furthermore, the melting point of the non-metal portion 5-920 is greater than that of the metal portion 5-910, so as to prevent the non-metallic portion 5-920 from melting when the heating the electrical connecting assembly 5-900.

In some embodiments, the user can heat the electrical connecting assembly 5-900 after the non-metallic portion 5-920 is coated, and the metal portion 5-910 and the non-metallic portion 5-920 can be cured simultaneously. The manufacturing steps and the manufacturing time of the optical member driving mechanism 5-10 can be reduced.

In this embodiment, the non-metallic portion 5-920 can also contact the lead and the carrier 5-210, and/or the lead and the adhesive member 5-800. Therefore, the lead can be simultaneously affixed to the carrier 5-210 when curing. In some embodiments, a portion of the conductive portion 5-311 covered by the insulating portion 5-312 winds around the winding pillar 5-212, so that the metal portion 5-910 of the electrical connecting assembly 5-900 can also contact the insulating portion 5-312 of the lead. The non-metallic portion 5-920 of the electrical connecting assembly 5-900 can contact the conductive portion 5-311 and the insulating portion 5-312.

In this embodiment, the electrical connecting assembly 5-900 and the carrier 5-210 are arranged along the Z-axis (a first direction), and the connecting surface 5-501 of the metal connecting member 5-500 parallel to the Z-axis is in contact with the electrical connecting assembly 5-900. The metal connecting member 5-500 having a plate structure is horizontally disposed relative to the carrier 5-210, so that the direction of the thickness of the metal connecting member 5-500 is parallel to the Z-axis. In some embodiments, the metal connecting member 5-500 is perpendicularly disposed relative to the carrier 5-210, so that the direction of the thickness of the metal connecting member 5-500 is perpendicular to the Z-axis.

Referring to FIG. 55, the circuit board 5-600 is disposed on the frame 5-110 of the fixed portion 5-100. The position detecting module 5-700 includes a sensor 5-710 and a sensing object 5-720, respectively disposed on the circuit board 5-600 and the carrier 5-210. The sensor 5-710 can determine the position of the movable portion 5-200 relative to the fixed portion 100 in the Z-axis by detecting the movement of the sensing object 5-720.

For example, the sensor 5-710 can be a Hall sensor, a magnetoresistance effect sensor (MR sensor), a giant magnetoresistance effect sensor (GMR sensor), a tunneling magnetoresistance effect sensor (TMR sensor), an optical encoder, or an infrared sensor. When the sensor 5-710 uses the hall sensor, the magnetoresistance effect sensor, the giant magnetoresistance effect sensor, or the tunneling magnetoresistance effect sensor, the sensing object 5-720 can be a magnet. When the sensor 5-710 uses the optical encoder or the infrared sensor, the sensing object 5-720 can be a reflector.

In summary, an optical member driving mechanism is provided, including a movable portion, a fixed portion, a driving assembly, and an electrical connecting assembly. The movable portion is connected to an optical member, and is movable relative to the fixed portion. The driving assembly is configured to drive the movable portion to move relative to the fixed portion. The electrical connecting assembly is electrically connected to the driving assembly.

The Sixth Embodiment Group.

Figure 61:
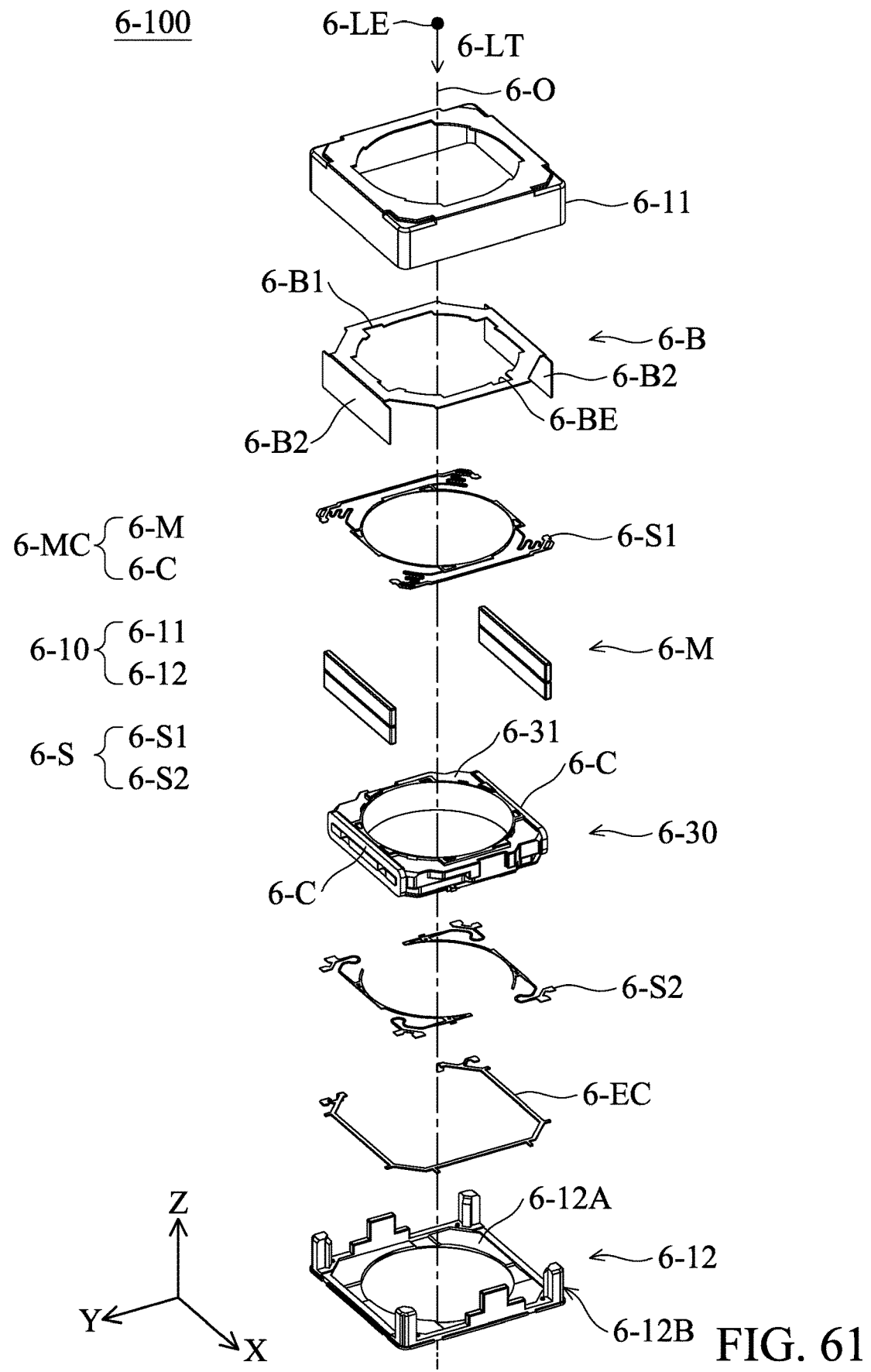
FIG. 61 is a schematic diagram of a driving mechanism for an optical element according to an embodiment of the present invention.
Figure 62:
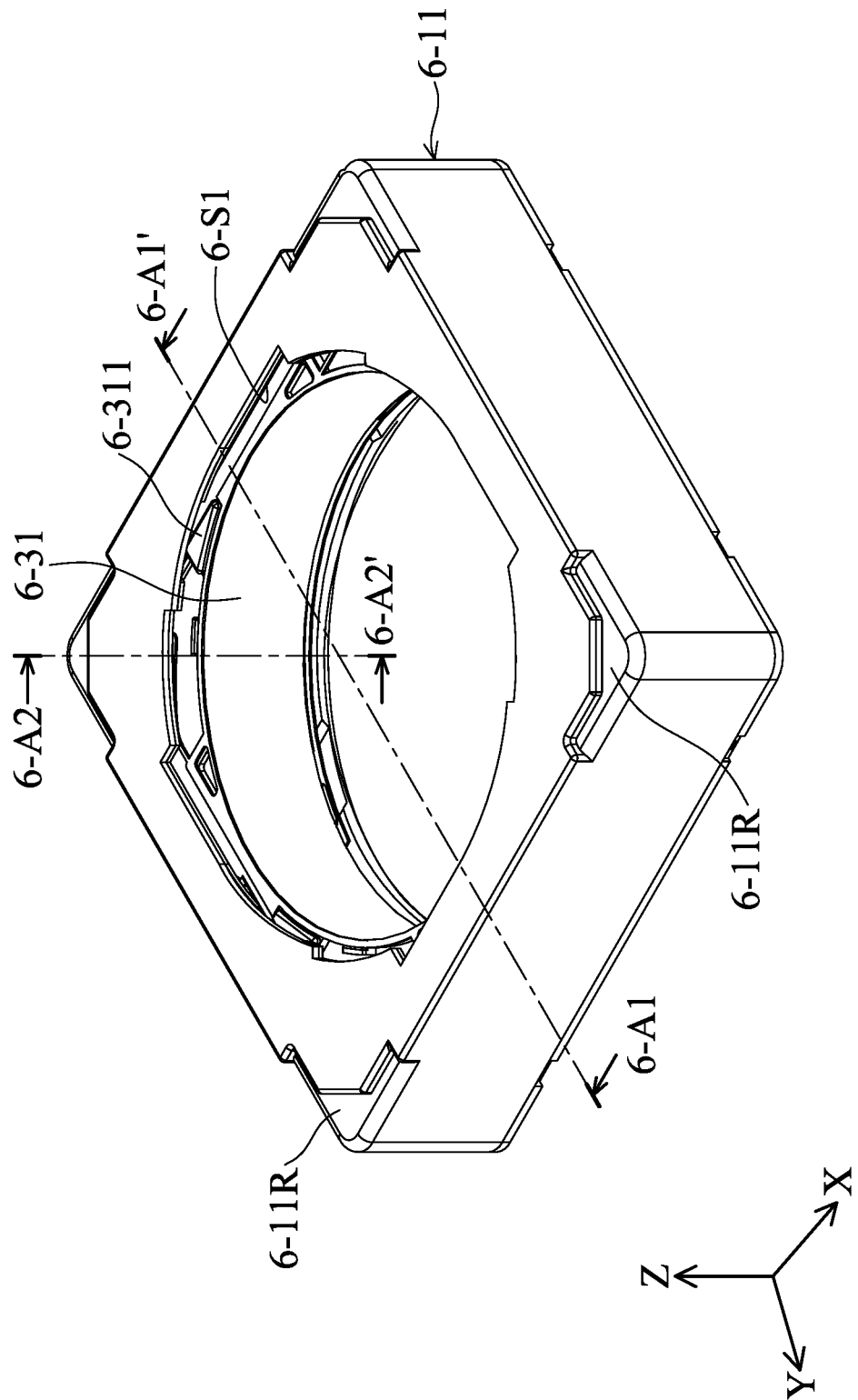
FIG. 62 is a schematic diagram of the driving mechanism in FIG. 61 after assembly.

Referring to FIGS. 61 and 62, FIG. 61 is a schematic view showing the driving mechanism for an optical element 6-100, and FIG. 62 is an exploded view of the driving mechanism 6-100. The driving mechanism for an optical element 6-100 can be used, for example, to drive and sustain an optical element (such as a lens or a lens assembly having a plurality of lenses), and can be disposed inside an electronic device (such as a camera, a tablet or a mobile phone). When light (incident light) from the outside (at the light incident end 6-LE) enters the driving mechanism for an optical element 6-100 along a light incident direction 6-LT, the light can pass through an optical element (e.g. disposed on the movable part 6-30) to an image sensor module (e.g. disposed on the fixed part 6-10) to obtain an image. Through the driving mechanism 6-100, the optical element and the image sensor can relatively move, thereby achieving optical zooming, auto-focus (AF) or optical image stabilization (OIS). The detailed structure of the aforementioned driving mechanism for an optical element 6-100 will be described below.

Figure 63:
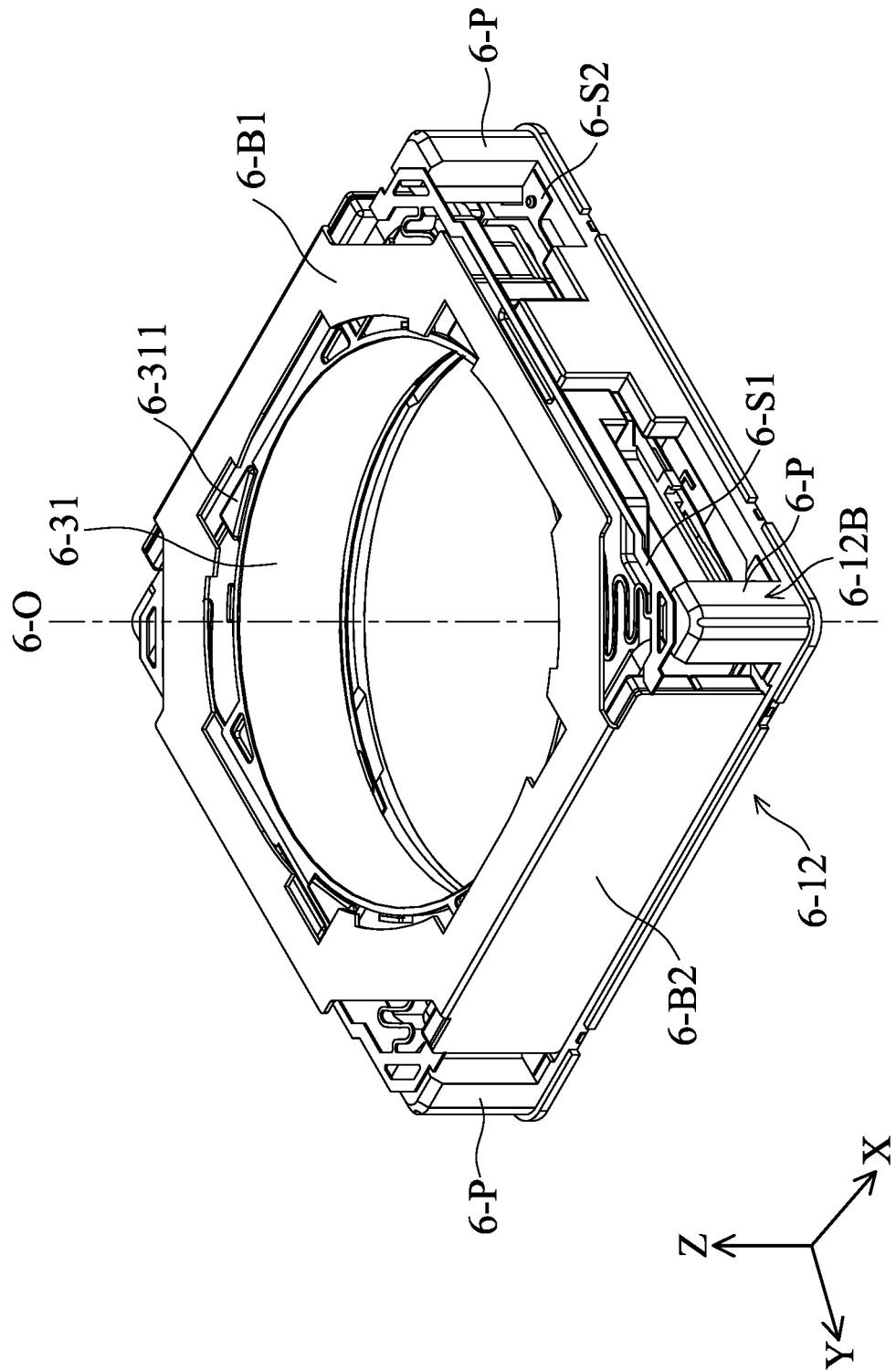
FIG. 63 is a schematic diagram of the driving mechanism in FIG. 62 which the housing is omitted.

Referring to FIGS. 1 and 63, wherein FIG. 63 is a schematic diagram of the driving mechanism 6-100 omitting the housing 6-11. The driving mechanism 6-100 comprises a fixed part 6-10, a movable part 6-30 and a driving assembly 6-MC. The fixed part 6-10 includes a housing 6-11 and a base 6-12 which are corresponding to each other, and they form an accommodating space for the movable part 6-30 and the driving assembly 6-MC to be disposed therein, and provide protection. The movable part 6-30 is disposed on the base 6-12, and includes a holder 6-31 which is configured to sustain the optical element. The drive assembly 6-MC is disposed on the movable part 6-30 and the fixed part 6-10, and is configured to drive the movable part 6-30 and the optical element to move relative to the fixed part 6-10, thereby adjusting the posture or position of the movable part 6-30 with the optical element, so that the purposes of optical zooming, auto-focus, or optical image stabilization can be achieved.

Regarding the driving assembly 6-MC, it may be an electromagnetic driving assembly, including a magnetic isolation element (or magnetic partition) 6-B, a driving coil 6-C and a driving magnetic element 6-M.

Figure 65:
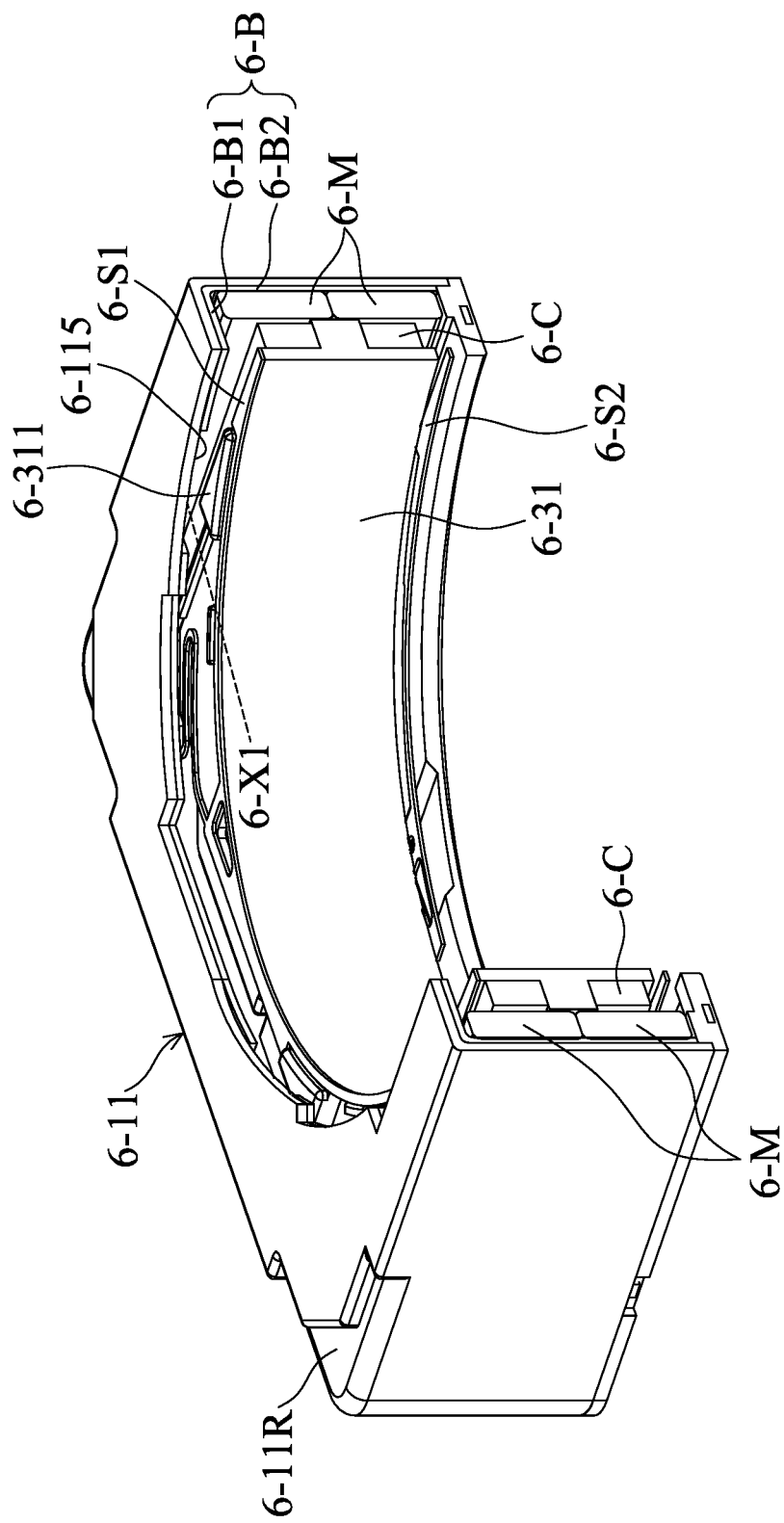
FIG. 65 is a perspective sectional view taken along line 6-A1-6-A1' in FIG. 62.
Figure 66:
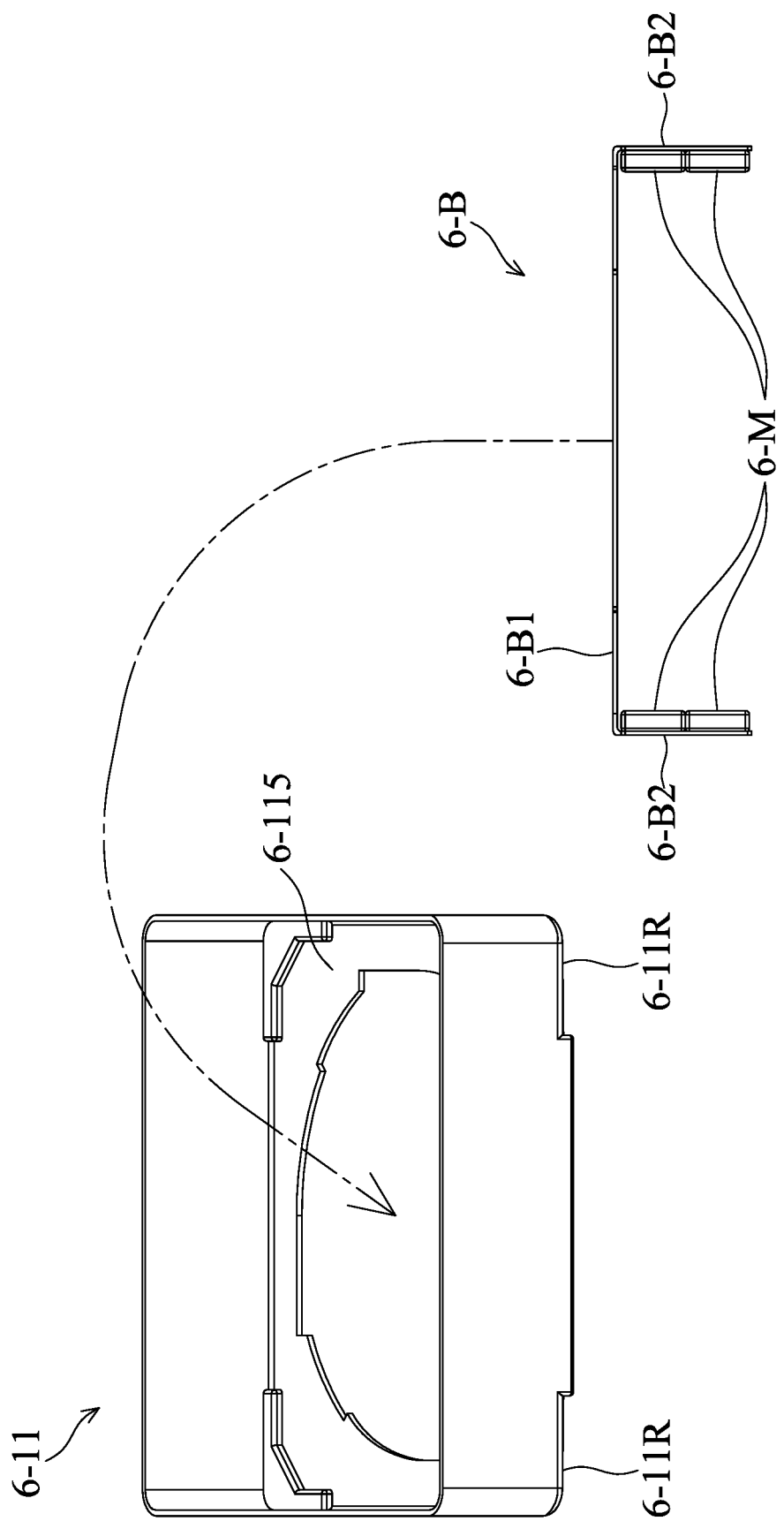
FIG. 66 is a schematic diagram of the housing and the magnetic isolation element presenting a C-shaped structure, and the driving magnetic element 6-M disposed thereon.

Referring to FIGS. 65-66, the magnetic isolation element 6-B is disposed on the inner surface 6-115 of the housing 6-11. In some embodiments, the magnetic isolation element 6-B is affixed to the inner surface 6-115. The driving coil 6-C and the driving magnetic element 6-M are respectively disposed on the movable part 6-30 and the magnetic isolation element 6-11. There is a gap between the driving magnetic element 6-M and the driving coil 6-C which correspond to each other.

When a driving signal is applied to the drive assembly 6-MC (for example, an external power supply applies current to the drive coil 6-C), a magnetic force is generated between the drive magnetic element 6-M and the drive coil 6-C, so that the movable part 6-30 can be driven to move relative to the fixed part 6-10. In this way, when the driving assembly 6-MC receives a driving signal, the driving assembly 6-MC drives the movable part 6-30 with the optical element to move along the optical axis 6-O of the optical element, or move in a plane that is perpendicular to the optical axis 6-O, so as to achieve optical image stabilization, autofocus or the effect of changing the focal length. In some embodiments, the optical axis 6-O also can be regarded as the optical axis of the driving mechanism 6-100.

It is worth noting that the aforementioned magnetic isolation element 6-B can also be used as a permeability element, located between the housing 6-11 and the driving magnetic element 6-M. By the magnetic isolation element 6-B, the magnetic force (between the driving magnetic element 6-M and the driving coil 6-C) can be enhanced in a predetermined direction, to enhance the magnetic thrust generated by the driving assembly 6-MC to move the movable part 6-30, and the magnetic interference can be reduced. Moreover, the overall mechanical strength of the fixed part 6-10 can be enhanced. In this way, compared with the traditional voice coil motor (VCM) device having a frame with a certain space provided for carrying magnets, since there is no longer a frame, this embodiment can greatly reduce the space occupied by the components, which is conducive to miniaturization. In addition, the aforementioned extension structure 6-PS also has an inclined surface 6-PS1 inclined with respect to the optical axis 6-O, or inclined with respect to the bottom surface of the base 12 or the top surface of the housing 11.

Referring to FIG. 65, regarding the position of the magnetic isolation element 6-B, when viewed along the optical axis 6-O direction, the magnetic isolation element 6-B at least partially overlaps the driving magnetic element 6-M. When viewed along a direction that is perpendicular to the optical axis 6-O, the magnetic isolation element 6-B is disposed between the housing 6-11 and the drive magnetic element 6-M.

Figure 64:
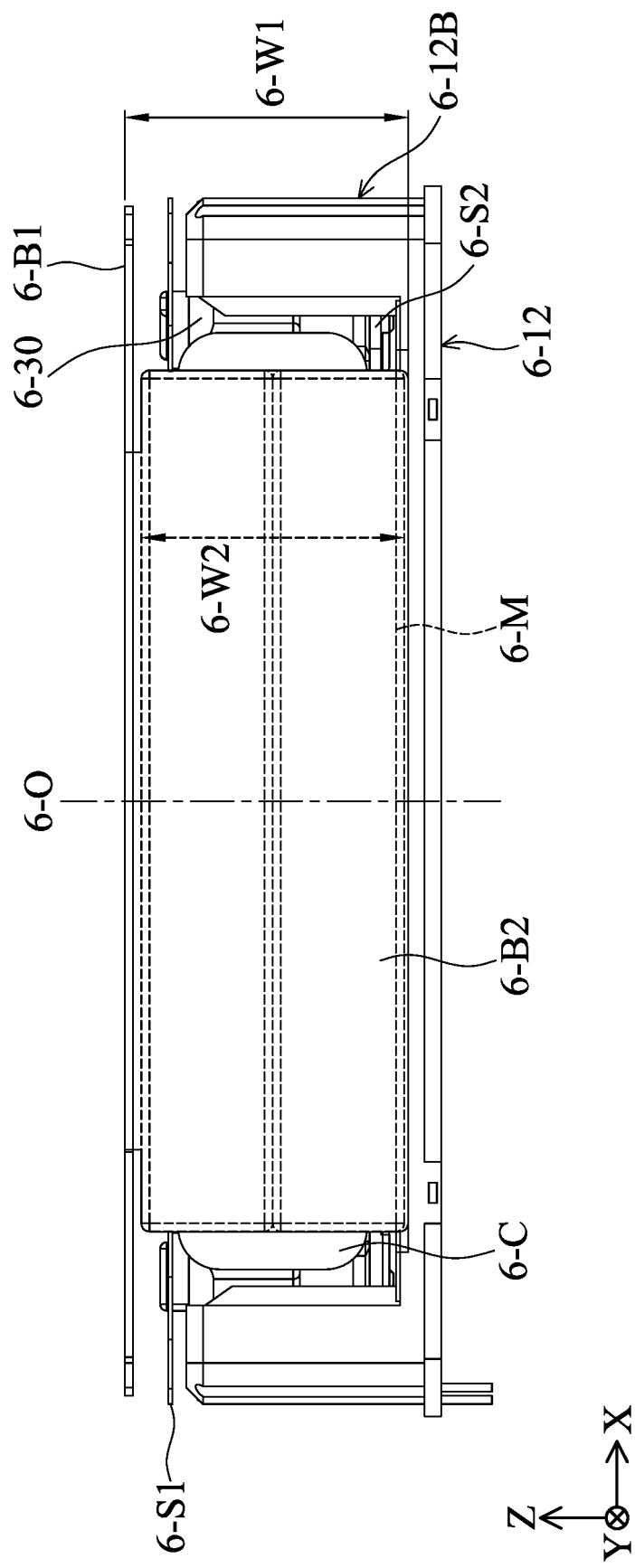
FIG. 64 is a side view of the driving mechanism in FIG. 63.

Referring to FIG. 66, regarding the details of the magnetic isolation element 6-B, viewed along the direction perpendicular to the optical axis 6-O, the magnetic isolation element 6-B presents a C-shaped structure, and the magnetic isolation element 6-B includes an upper partition 6-B1 and the two side partitions 6-B2 are connected via the upper partition 6-B1. In the optical axis 6-O direction, the upper partition 6-B1 is located between the driving magnetic element 6-M and the housing 6-11. The two side plates 6-B2 extend in the optical axis direction 6-O, and in this direction, such as the Z axis, the maximum width 6-W1 of the side partitions 6-B2 is larger than the maximum width 6-W2 of the driving magnetic element 6-M. As shown in FIG. 64, viewed along the direction of the perpendicular optical axis 6-O (the Y-axis), the two side partitions 6-B2 of the magnetic isolation element 6-B completely cover the driving magnetic element 6-M, and the two side partitions 6-B2 at least partially overlap the driving coil 6-C. Also viewed along the direction perpendicular to the optical axis 6-O, the two side partitions 6-B2 expose at least a portion of the driving coil 6-C.

In some embodiments, in some embodiments, the holder 6-31 of the movable part 6-30 may be provided with a position sensing element, which may be a position sensor, for example, may be a magnetoresistive sensor (MRS) or optical sensor. The position sensing element is used to sense the relative positional relationship between the movable part 6-30 and the fixed part 6-10, so that a control unit (not shown) can adjust the position between the two through the driving component 6-MC. In some embodiments, the aforementioned position sensing element belongs to an element of the driving assembly 6-MC.

Referring to FIGS. 61 and 63, the movable part 6-30 of the driving mechanism 6-100 in this embodiment further includes an elastic assembly 6-S, which connects the movable part 6-30 and the housing 6-11. The elastic assembly 6-S has a first elastic element 6-S1 and a second elastic element 6-S2, which can be used as a flexible leaf spring assembly. In some embodiments, the elastic elements 6-S1, 6-S2 are made of metal. The first and second elastic elements 6-S1, 6-S2 are respectively disposed on the upper and lower sides of the holder 6-31, or the holder 6-31 is sandwiched between the two. The elastic assembly 6-S movably connects the holder 6-31 and the fixed part 6-10 so that the holder 6-31 can move relative to the housing 6-11 and the base 6-12. In addition, before the driving signal is applied, the aforementioned elastic assembly 6-S allows the holder 6-31 to maintain an initial position relative to the fixed part 6-10. In some embodiments, the aforementioned elastic assembly 6-S may be regarded as a part of the movable part 6-30, which connects the holder 6-31 and the fixed part 6-10.

For details of the elastic assembly 6-S, the lower second elastic element 6-S2 is placed on the base 6-12, and can be positioned by a or a plurality of positioning posts of the base 6-12 to connect the holder 6-31 and base 6-12. In addition, a base body 6-12A of the base 6-12 is provided with a circuit member 6-EC, and the second elastic element 6-S2 is electrically connected to the circuit member 6-EC, so that the second elastic element 6-S2 is used for electrical conduction, being electrically connected to the driving coil 6-C.

Figure 67:
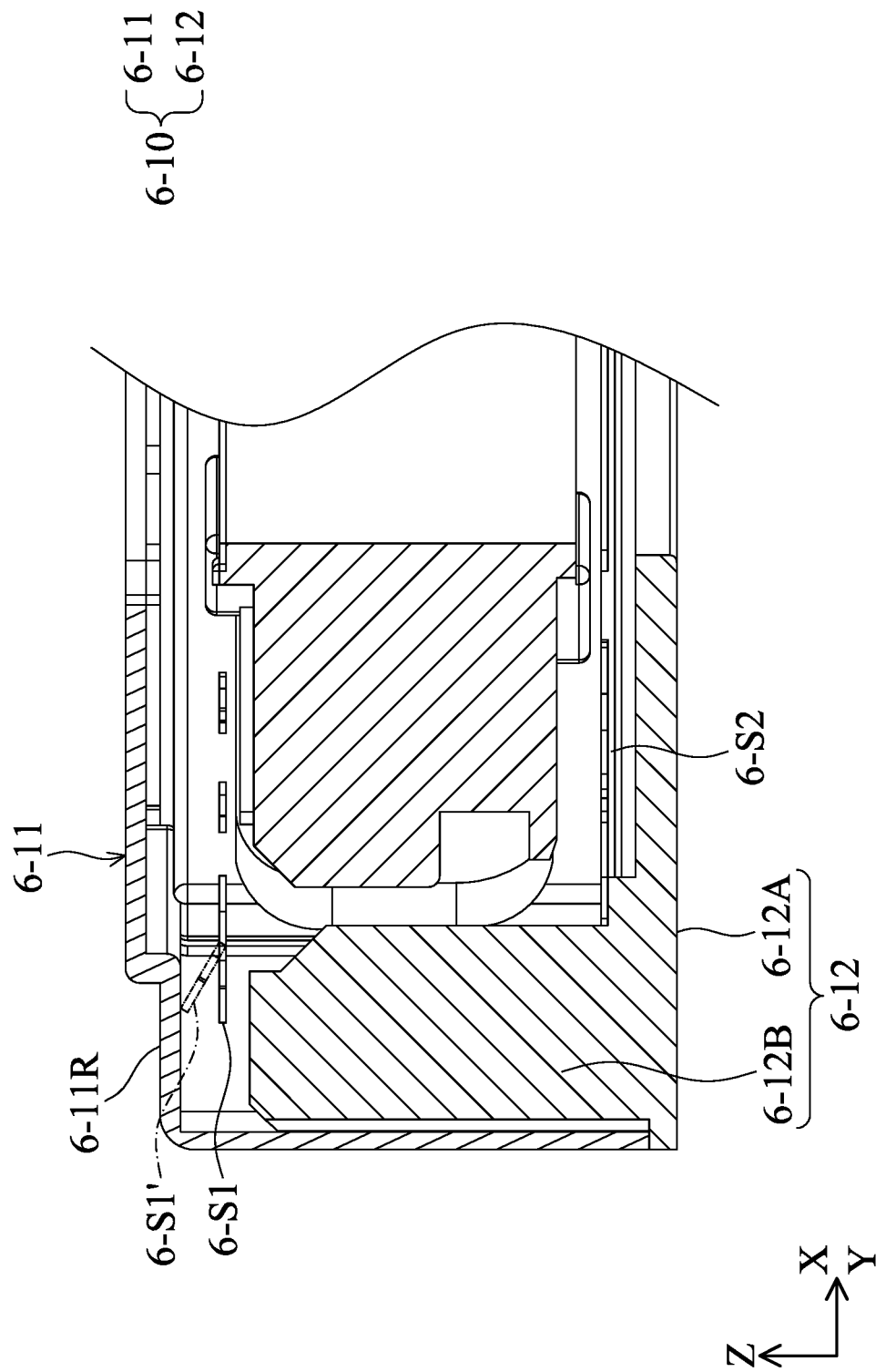
FIG. 67 is a partial sectional view taken along line 6-A2-6-A2' in FIG. 62.

For the first elastic element 6-S1 on the upper side, please refer to FIGS. 62, 63, and 67 together, wherein FIG. 67 is a cross section diagram along line 6-A2-6-A2' in FIG. 62. The first elastic element 6-S1 is located on the upper side of the holder 6-31 and connects the holder 6-31 and the housing 6-11. The housing 6-11 has a concave portion 6-11R recessed toward the first elastic element 6-S1, so that when the driving mechanism 6-100 is assembled, since the concave portion 6-11R is closer to the first elastic element 6-S1 than the topmost surface of the housing 6-11, this allows the first elastic element 6-S1 to be more easily assembled with the housing 6-11, for example, by applying adhesive, which can improve the convenience of assembly. It should be noted that when the first elastic element 6-S1 is to be bonded or joined to the concave portion 6-11R, the first elastic element 6-S1 can be bent to connect the housing 6-11, such as the bent first elastic element 6-S1' in FIG. 67. In this embodiment, viewed in a direction perpendicular to the optical axis 6-O, the concave portion 6-11R at least partially overlaps the magnetic isolation element 6-B; and the driving magnetic element 6-M is at least partially (such as the upper part of the driving magnetic element 6-M) located between the magnetic isolation element 6-B and the first elastic element 6-S1.

In other embodiments, the first elastic element 6-S1 may be affixed to the base 6-12 of the fixed part 6-10. For details, please refer to FIGS. 61 and 63. The base 6-12 includes a base body 6-12A and a protruding column portion 6-12B. The protruding column portion 6-12B is extending towards the housing 6-11, and is connected to the base body 6-12A and disposed around or at the corners of the base body 6-12A, In this embodiment, the protruding column portion 6-12B includes a plurality of (four) columns 6-P, whose long axis direction is parallel (including or substantially parallel, such as +5 or −5 degrees) to the optical axis 6-O. The ends or corners of the first elastic element 6-S1 are connected to the columns 6-P of the protruding column portion 6-12B. In this way, it is also possible to save installations such as a traditional rack frame for elastic elements, to facilitate miniaturization of the device.

Figure 68:
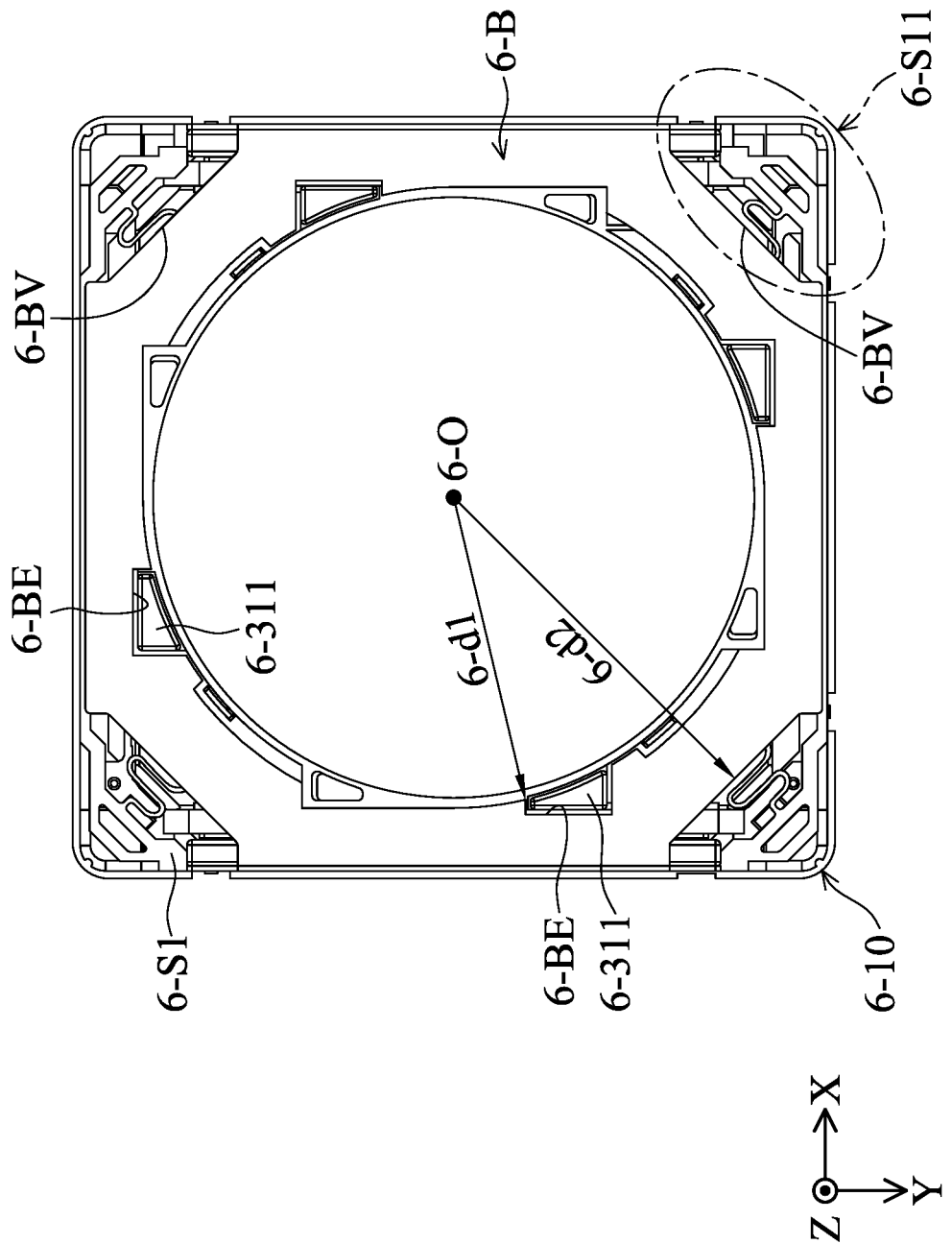
FIG. 68 is a top plan view of the driving mechanism in FIG. 62 (the housing being omitted).

FIG. 68 shows a schematic top plan view of the assembled driving mechanism 6-100 (omitted the housing 6-11 to show the internal structure) in FIG. 62. Viewed along the optical axis 6-O direction, each corner 6-S11 of the first elastic element 6-S1 is exposed by the magnetic isolation element 6-B, or the magnetic isolation element 6-B exposes the corners 6-S11 of the first elastic element 6-S1. The exposed corner 6-S11 of the first elastic element 6-S1 is connected to the housing 6-11. As shown in FIG. 67, the concave portion 6-11R of the housing 6-11 corresponding to the exposed corners 6-S11 of the first elastic element 6-11. Viewed in the optical axis 6-O direction, the concave portion 6-11R, the first elastic element 6-S1 and the protruding column portion 6-12B at least partially overlap.

Continuing to refer to FIG. 68, the aforementioned magnetic isolation element 6-B further has an inner notch 6-BE, and a limit portion 6-311 of the holder 6-31 of the movable part 6-30 is exposed to the inner notch 6 BE. When the movable part 6-30 is driven by the driving assembly 6-MC to move to a limit position 6-X1 (refer to FIG. 65) relative to the fixed part 6-10, the aforementioned limit portion 6-311 passes through the first elastic element 6-S1, and then passes through the inner notch 6-BE through the magnetic isolation element 6-B and contacts the housing 6-11 to be limited. In this way, through the inner notch 6-BE, the limit portion 6-311 of the movable part 6-30 can pass through the magnetic isolation element 6-B and be directly in contact with the housing 6-11, so that the moving stroke of the movable part 6-30 can be increased, and the focusing, zooming, or automatic compensation ability of the driving mechanism 6-100 can be improved.

As can be seen from the top view of FIG. 68, the magnetic isolation element 6-B has a dodge portion 6-BV. It can be considered that the magnetic isolation element 6-B, which was originally substantially quadrangular, has a missing corner at each of its original corner areas, and this is the dodge portion 6-BV. In the optical axis 6-O direction, the first elastic element 6-S1 is exposed to the dodge portion 6-BV. Viewed in the direction of the optical axis 6-O, the first elastic element 6-S1 protrudes from the dodge portion 6-BV of the magnetic isolation element 6-B, and the shortest distance 6-$d$1 between the aforementioned inner notch 6-BE and the optical axis 6-O is smaller than the shortest distance 6-$d$2 between the dodge portion 6-BV and the optical axis 6-O.

Figure 69:
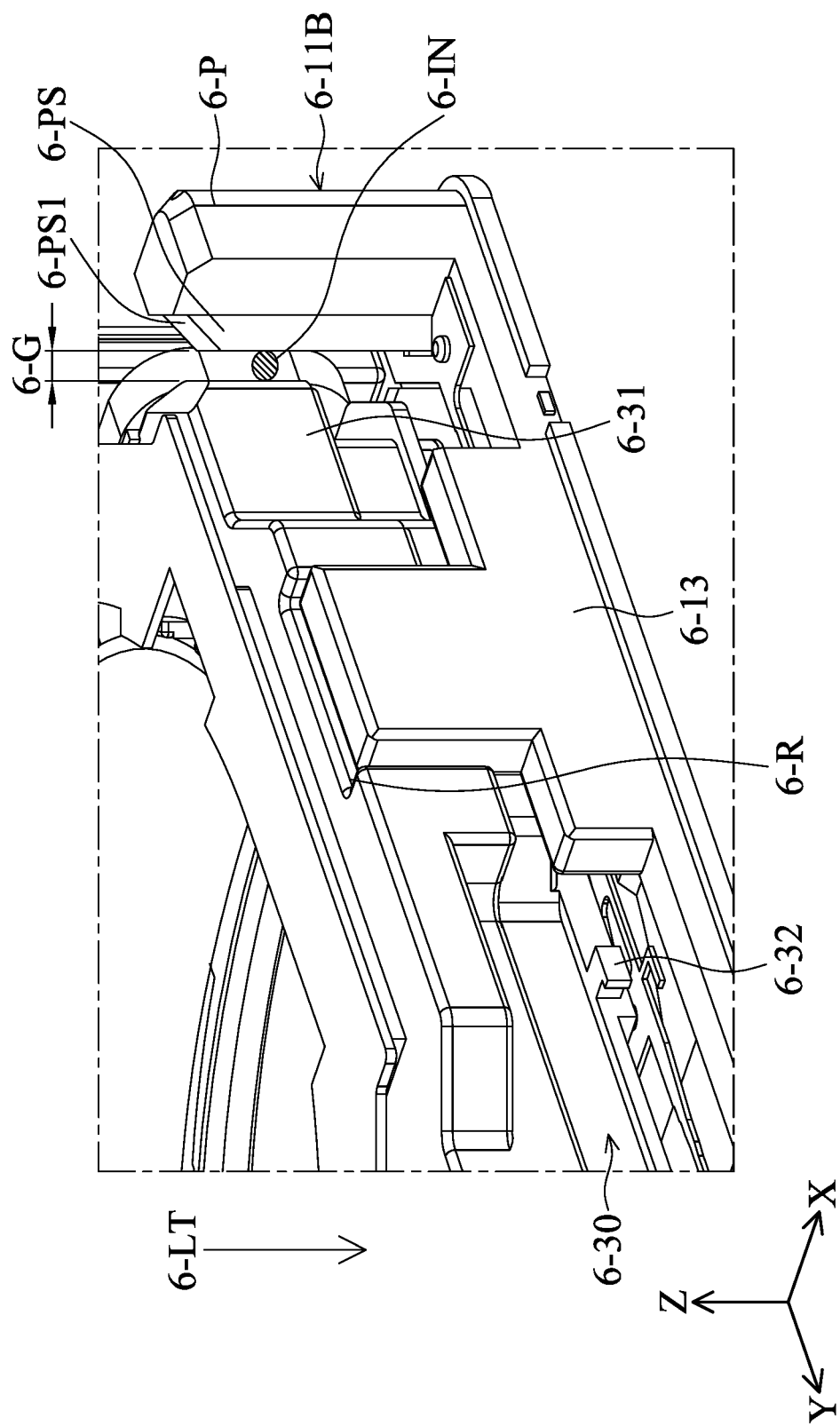
FIG. 69 is a partial schematic diagram of a plurality of the driving mechanism, wherein the housing and the first elastic element are omitted.

Referring to FIG. 69, which is a schematic diagram showing a partial driving mechanism 6-100, and to clearly see the internal structure, the housing 6-11 and the first elastic element 6-S1 are omitted. The driving mechanism 6-100 further includes a winding post 6-32, which is disposed on the movable part 6-30 for the lead wire of the driving coil 6-C to wind. Specifically, the winding post 6-32 is disposed on the holder 6-31, and extends or protrudes in a direction perpendicular to the optical axis 6-O. Viewed from the light incident direction 6-LT of the driving mechanism 6-100, the winding post 6-32 is shielded by the magnetic isolation element 6-B (as shown in FIG. 68, the post 6-32 cannot be seen). In addition, when viewed from the light incident direction 6-LT, the winding post 6-32 is also at least partially shielded by the movable part 6-30, and in this embodiment, the winding post 6-32 is completely covered by the movable part 6-30. In some embodiments, the winding post 6-32 is a part of the movable part 6-30, viewed from the incident direction 6-LT, which is completely shielded by the holder 6-31.

In some embodiments, the driving mechanism 6-100 further includes a shock-absorbing element 6-IN, disposed between the movable part 6-30 and the fixed part 3-10. In detail, the shock-absorbing element 6-IN is disposed between the protruding column portion 6-12B and the movable part 6-30, wherein the column 6-P of the protruding column portion 6-12B has an extension structure 6-PS extending toward (horizontal direction) the movable part 6-30, and the shock-absorbing element 6-IN connects the extension structure 6-PS with the holder 6-31. The shock-absorbing element 6-IN is disposed in the gap 6-G between the extension structure 6-PS and the holder 6-31. In the optical axis 6-O direction, the maximum length of the protruding column portion 6-12B is greater than the maximum length of the extension structure 6-PS. In addition, the aforementioned extension structure 6-PS also has an inclined surface 6-PS1 inclined with respect to the optical axis 6-O, or inclined with respect to the bottom surface of the base 12 or the top surface of the housing 11.

Continuing to refer to FIG. 69, the driving mechanism 6-100 further includes a limit structure 6-13, and the movable part 6-30 has a groove 6-R which is located at the side of the movable part that is not parallel to the side where the driving magnetic element 6-M is placed. The limiting structure 6-13 and the groove 6-R are matched with each other, thereby limiting the movement of the movable part 6-30 along the direction perpendicular to the optical axis O. In this embodiment, the limit structure 6-13 is located between the plurality of columns 6-P of the protruding column portion 6-12B of the fixed part 6-10, and the limit structure 6-13 is accommodated in the groove 6-R. Viewed along the optical axis 6-O direction, the thickness of the limit structure 6-13 in a direction perpendicular to the optical axis 6-O (such as the X-axis) is greater than the thickness of the groove 6-R in a direction perpendicular to the optical axis 6-O. It can further ensure that the movement of the movable part 6-30 is restricted and the stability of the device is improved. It should be noted that, in this embodiment, there are two limit structures 6-13 located on both sides of the movable part 6-30 (different from the side where the driving magnetic element 6-M is placed), corresponding to the two grooves 6-R. In other embodiments, only one limiting structure 6-13 and the corresponding groove 6-R can effectively limit the movement of the movable part 6-30. In some embodiments, the limiting structure 6-13 belongs to the fixed part 6-10.

In summary, an embodiment of the present invention provides a driving mechanism for an optical element, including a fixed part, a movable part and a driving assembly. The movable part is configured to connect the optical element to the optical axis. The movable part is movable relative to the fixed part. The driving assembly is configured to drive the movable part to move relative to the fixed part. In some embodiments, the driving assembly includes a magnetic isolation element, a driving coil, and a driving magnetic element. The driving coil is arranged in the movable part, and the magnetic isolation element and the driving magnetic element are disposed on the fixed part. The magnetic isolation element is affixed to the fixed part, and viewed in a direction perpendicular to the optical axis, the magnetic isolation element and the driving magnetic element at least partially overlap. Viewed in the direction of the optical axis, the magnetic isolation element and the driving magnetic element at least partially overlap. The fixed part includes a housing, and the magnetic isolation element is disposed between the housing and the driving magnetic element.

The embodiment of the present invention has at least one of the following advantages or effects. By providing a driving assembly, the movable part can be driven to move relative to the fixed part, thereby achieving the functions of optical zoom, focusing and optical compensation. In addition, in some embodiments, the driving assembly includes a magnetic isolation element, which is disposed outside the magnetic element and can be used as a carrier plate for carrying the magnetic element. In this way, not only can the magnetic thrust of the magnetic element be concentrated in a predetermined direction to improve the movement of the movable part, the magnetic isolation element can also prevent or reduce magnetic interference, and, since the magnetic isolation element is used as the carrier plate of the magnetic element, compared with the conventional voice coil motor provided with a rack frame as a carrier for the magnetic element, the driving mechanism without the frame also relatively saves the space used by the element, which is beneficial to miniaturization. In some embodiments, the limit part of the movable part directly passes through the magnetic isolation element and directly contacts the housing of the fixed part, which can greatly increase the stroke distance and improve the optical performance, such as optical zoom, focusing and optical compensation, and more detailed and precise.

It should be noted that the features (such as structures, elements and so on) of the various embodiments can be combined and used as long as they do not violate or conflict the scope of the disclosure.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical member driving mechanism, comprising:
   a movable portion, connected to an optical member;
   a fixed portion, wherein the movable portion is movable relative to the fixed portion;
   a driving assembly, driving the movable portion to move relative to the fixed portion; and
   an electrical connecting assembly, electrically connected to the driving assembly
      wherein the movable portion comprises a carrier, and the driving assembly comprises a lead,
      wherein the electrical connecting assembly is disposed on the carrier, the lead is electrically connected to the electrical connecting assembly and has a conductive portion and an insulating portion, and
      wherein the electrical connecting assembly comprises:
         a metal portion, having a metal material; and
         a non-metallic portion, disposed on the metal portion and having a resin material.

2. The optical member driving mechanism as claimed in claim 1, wherein the optical member driving mechanism further comprises a metal connecting member, electrically connected to the electrical connecting assembly.

3. The optical member driving mechanism as claimed in claim 1, wherein the optical member driving mechanism further comprises a metal connecting member, and the electrical connecting assembly is in direct contact with the lead and the metal connecting member.

4. The optical member driving mechanism as claimed in claim 1, wherein the electrical connecting assembly further comprises:
   a gap, formed between the metal portion and the non-metal portion.

5. The optical member driving mechanism as claimed in claim 4, wherein the optical member driving mechanism further comprises a metal connecting member, and the non-metallic portion is in direct contact with the metal connecting member;
   the non-metallic portion is in direct contact with the lead;
   the non-metallic portion is in direct contact with the carrier;
   the non-metallic portion is in direct contact with the metal portion;
   the non-metallic portion is in direct contact with the insulating portion;
   the non-metallic portion is in direct contact with the conductive portion;
   the non-metallic portion covers the metal portion;
   the non-metallic portion covers at least a portion of the metal connecting member;
   the non-metallic portion covers at least a portion of the lead;
   the metal portion is in direct contact with the metal connecting member;
   the metal portion is in direct contact with the lead;
   the metal portion is in direct contact with the insulating portion;
   the metal portion is in direct contact with the conductive portion;
   the metal portion covers at least a portion of the conductive portion;
   the metal portion covers at least a portion of the metal connecting member;
   the melting point of the metal portion is less than the melting point of the non-metal portion;
   at least a portion of the gap is disposed between the carrier and the non-metallic portion.

6. The optical member driving mechanism as claimed in claim 4, wherein the optical member driving mechanism further comprises a metal connecting member and an adhesive member, and the adhesive member has a resin material and is in direct contact with the metal connecting member;
   the adhesive member is in direct contact with the movable portion or the fixed portion;
   the non-metallic portion is in direct contact with the adhesive member.

7. The optical member driving mechanism as claimed in claim 1, wherein the optical member driving mechanism further comprises a metal connecting member having a connecting surface, and the electrical connecting assembly is in contact with the connecting surface;
   the connecting surface and the carrier are arranged in a first direction, and the first direction is parallel to the connecting surface;
   as seen from the first direction, the overlapping area between the lead and the carrier is called a winding region;
   as seen from the first direction, the overlapping area between the metal connecting member and the winding region is called an overlap region;
   as seen from the first direction, the area of the winding region which does not overlap the metal connecting member is called a non-overlap region;
   as seen from the first direction, the area of the overlap region that is projected onto the carrier is less than the area of the non-overlap region that is projected onto the carrier.

8. The optical member driving mechanism as claimed in claim 7, wherein the metal connecting member has a plate structure, and the direction of the thickness of the metal connecting member is parallel to the first direction.

9. The optical member driving mechanism as claimed in claim 7, wherein the metal connecting member has a plate structure, and the direction of the thickness of the metal connecting member is perpendicular to the first direction.

* * * * *